US011808861B2

(12) United States Patent
Dai et al.

(10) Patent No.: US 11,808,861 B2
(45) Date of Patent: *Nov. 7, 2023

(54) ADAPTIVE ESTIMATION OF GNSS SATELLITE BIASES

(71) Applicant: Deere & Company, Moline, IL (US)

(72) Inventors: Liwen Dai, Torrance, CA (US); Yiqun Chen, Culver City, CA (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/448,390

(22) Filed: Sep. 22, 2021

(65) Prior Publication Data
US 2022/0252732 A1    Aug. 11, 2022

Related U.S. Application Data

(60) Provisional application No. 63/143,921, filed on Jan. 31, 2021, provisional application No. 63/201,612, filed on May 6, 2021.

(51) Int. Cl.
*G01S 19/07* (2010.01)
*G01S 19/41* (2010.01)
(Continued)

(52) U.S. Cl.
CPC ............ *G01S 19/071* (2019.08); *G01S 19/07* (2013.01); *G01S 19/41* (2013.01); *G01S 19/04* (2013.01); *G01S 19/44* (2013.01)

(58) Field of Classification Search
CPC ........ G01S 19/071; G01S 19/07; G01S 19/04; G01S 19/41; G01S 19/44; G01S 19/32
(Continued)

(56) References Cited

U.S. PATENT DOCUMENTS

| | | |
|---|---|---|
| 5,757,646 A | 5/1998 | Talbot et al. |
| 5,828,336 A | 10/1998 | Yunck et al. |

(Continued)

FOREIGN PATENT DOCUMENTS

| | | |
|---|---|---|
| EP | 2759849 A1 | 7/2014 |
| WO | WO 2011100680 A2 | 8/2011 |
| WO | WO 2012151006 A1 | 11/2012 |

OTHER PUBLICATIONS

Fei Ye et al., An Improved Single-Epoch GNSS/INS Positioning Method for Urban Canyon Environment Based on Real-Time DISB Estimation, IEEE Access, dated Dec. 31, 2020, pp. 227566-227578, vol. 8, 2020.

(Continued)

*Primary Examiner* — Chuong P Nguyen

(57) ABSTRACT

A first pair of a wide-lane (WL), zero-difference (ZD) bias filter and corresponding supplemental WL bias predictive filter determines the time-variant wide-lane bias for a corresponding satellite based on adaptive estimation responsive to tuned dynamic noise provided by the supplemental wide-lane bias predictive filter for each satellite. A second pair of narrow-lane (NL), zero-difference (ZD) bias filter and corresponding NL bias filter/code-phase bias filter determines the time-variant narrow-lane bias (e.g., refraction corrected (NL) code-phase bias) for a corresponding satellite based on adaptive estimation on adaptive estimation responsive to tuned dynamic noise within a narrow-lane bias/code-phase bias filter for each satellite. The electronic data processor of a data processing center is configured to provide a correction signal comprising the wide-lane ambiguities, the time-variant wide-lane bias and the narrow-lane ambiguities and the time-variant narrow lane bias.

24 Claims, 25 Drawing Sheets

(51) Int. Cl.
*G01S 19/44* (2010.01)
*G01S 19/04* (2010.01)

(58) Field of Classification Search
USPC ............. 342/357.44, 357.24, 357.27, 357.41
See application file for complete search history.

(56) References Cited

U.S. PATENT DOCUMENTS

| | | | |
|---|---|---|---|
| 5,841,026 A | 11/1998 | Kirk et al. | |
| 5,916,300 A | 6/1999 | Kirk et al. | |
| 6,104,338 A | 8/2000 | Krasner | |
| 6,300,899 B1 | 10/2001 | King | |
| 6,799,116 B2 | 9/2004 | Robbins | |
| 7,119,741 B2 | 10/2006 | Sharpe et al. | |
| 7,471,239 B1 | 12/2008 | Huang | |
| 7,961,143 B2* | 6/2011 | Dai | G01S 19/44 342/357.27 |
| 8,368,590 B2 | 2/2013 | Vollath et al. | |
| 8,368,591 B2 | 2/2013 | Talbot et al. | |
| 8,451,168 B2* | 5/2013 | Henkel | G01S 19/32 342/357.44 |
| 8,456,353 B2* | 6/2013 | Dai | G01S 19/41 342/357.24 |
| 8,542,146 B2 | 9/2013 | Vollath | |
| 8,587,475 B2* | 11/2013 | Leandro | G01S 19/40 342/357.27 |
| 8,659,474 B2* | 2/2014 | Dai | G01S 19/44 342/357.44 |
| 8,773,303 B2 | 7/2014 | Doucet et al. | |
| 9,057,780 B2 | 6/2015 | Bar-Sever et al. | |
| 9,128,176 B2 | 9/2015 | Seeger | |
| 9,146,319 B2 | 9/2015 | Leandro | |
| 9,201,147 B2* | 12/2015 | Chen | G01S 19/073 |
| 10,191,157 B2 | 1/2019 | Dai et al. | |
| 10,338,232 B2 | 7/2019 | Zhang et al. | |
| 10,386,496 B2 | 8/2019 | Dai et al. | |
| 10,393,882 B2* | 8/2019 | Dai | G01S 19/44 |
| 10,422,884 B2* | 9/2019 | Gao | G01S 5/145 |
| 10,422,885 B2 | 9/2019 | Dai et al. | |
| 10,564,293 B2 | 2/2020 | Zhang et al. | |
| 10,564,294 B2* | 2/2020 | Dai | G01S 19/071 |
| 11,150,352 B2 | 10/2021 | Kuntz et al. | |
| 11,175,414 B2* | 11/2021 | Zeitzew | G01S 19/43 |
| 2008/0074319 A1 | 3/2008 | Han et al. | |
| 2009/0096667 A1 | 4/2009 | Shoarinejad | |
| 2011/0187590 A1 | 8/2011 | Leandro | |
| 2012/0154215 A1 | 6/2012 | Vollath et al. | |
| 2012/0162007 A1 | 6/2012 | Leandro et al. | |
| 2012/0176271 A1 | 7/2012 | Dai et al. | |
| 2012/0182181 A1 | 7/2012 | Dai et al. | |
| 2016/0377730 A1 | 12/2016 | Drescher et al. | |
| 2017/0269222 A1 | 9/2017 | Dai et al. | |
| 2017/0269224 A1 | 9/2017 | Zhang et al. | |
| 2017/0269226 A1 | 9/2017 | Dai et al. | |
| 2017/0269231 A1 | 9/2017 | Dai et al. | |
| 2020/0081131 A1 | 3/2020 | Kuntz et al. | |
| 2021/0286089 A1* | 9/2021 | Dai | G01S 19/073 |

OTHER PUBLICATIONS

Patrick Henkel et al., Estimation of satellite position, clock and phase bias corrections, Journal of Geodesy (2018) 92, dated May 2, 2018, pp. 1199-1217.

Haojun Li et al., Investigation and Validation of the Time-Varying Characteristic for the GPS Differential Code Bias, dated Feb. 19, 2019, pp. 1-13, Remote Sens. 2019, 11, 428; doi:10.3390/r511040428.

Hongyang Ma et al., Assessing the Performance of Multi-GNSS PPP-RTK in the Local Area, dated Oct. 13, 2020, pp. 1-19, Remote Sens. 2020, 12, 3343; doi:10.3390/rs12203343.

Chassagne, Olivier. "The Future of Satellite Navigation, One-Centimeter Accuracy with PPP", GNSS Forum, pp. 1-54, Mar.-Apr. 2012 [online] [retrieved on Aug. 31, 2016]. Retrieved from the Internet: <URL:http://www.insidegnss_?m/auto/marapr12-Chassagne.pdf>.

Choy, Suelynn."GNSS Precise Point Positioning: A Fad or the Future of Satellite Navigation and Positioning?" recture slides [online].School of Mathematical and Geospatial Sciences Royal Melbourne Institute of Technology University, Australia, 2014 [retrieved on Aug. 31, 2016]. Retrieved from the Internet: <URL:http://www.fig.net/resources/Proceedings/fig_proceedings/fig2014/ppt/TS05A/Choy.pdf>.

Murfin, Tony. "Hexagon's Acquisition of Veripos: Why Did This Go Down?" GPS World [online], Apr. 16, 2014 retrieved on Aug. 31, 2016]. Retrieved from the Internet: <URL:http:J/gpsworld.com/hexagons- acquisition-of-veripos- Why did-this-go-down/>.

Murfin, Tony. "Look, No Base-Station!—Precise Point Positioning (PPP)." GPS World [online], Mar. 20, 2013 retrieved Aug. 31, 2016]. Retrieved from the Internet: <URL:http://gpsworld.com/look-no-base- station-precise-point- positioning-ppp/>.

Laurichesse, Denis. "Innovation: Carrier-Phase Ambiguity Resolution, Handling the Biases for Improved Triple-Frequency PPP Convergence." GPS World, Apr. 3, 2015 [online], [retrieved Aug. 31, 2016]. Retrieved from the Internet: <URL:http://gpsworld.com/innovation-carrier-phase-ambiguity-resolution/>.

Dixon, Kevin. "StarFire: A Global SBAS for Sub-Decimeter Precise Point Positioning." NavCom Technology Inc., ION GNSS 19th International Technical Meeting of the Satellite Division [online], Sep. 26-29, 2006 [retrieved on Aug. 31, 2016]. Retrieved from the Internet: <URL:http://www.gdgps.net/system-desc/papers/starfire.pdf>.

Shi, Junbo and Gao, Yang. "A Comparison of Three PPP Integer Ambiguity Resolution Methods." GPS Solutions 18.4 [online], 2013, pp. 519-528 [retrieved on Aug. 31, 2016]. Retrieved from the Internet: <URL:http://link.springer.com/article/10.1007/s10291-013-0348-2>.

Leandro, R., et al. "RTX Positioning: The Next Generation of cm-accurate Real-Time GNSS Positioning." Trimble Terrasat GmbH [online brochure], Sep. 2012 [retrieved on Aug. 31, 2016]. Retrieved from the Internet: <URL:https://www.trimble.com/positioning-services/pdf/WhitePaper_RTX.pdf>.

Goode, Matthew. "New Developments In Precise Offshore Positioning." Ocean Business / Offshore Survey [online presentation], Apr. 15-16, 2015, Southampton, United Kingdom [retrieved on Aug. 31, 2016]. Retrieved from the Internet: <URL:http://www.oceanbusiness.com/wp-content/uploads/2015/04/1410_MatthewGoode.pdf>.

Ott, Lee. "Use of Four GNSS Systems in Operational Precise Point Positioning Service." Furgo Satellite Positioning [online presentation], 2015 [retrieved on Aug. 31, 2016]. Retrieved from the Internet: <URL:http://www.gps.gov/cgsic/meetings/2015/ott.pdf>.

Toor, Pieter. "Munich Satellite Navigation Summit 2014." Veripos, Ltd. [online presentation], Mar. 26, 2014 [retrieved on Aug. 31, 2016]. Retrieved from the Internet: <URL:URL:http://www.terrastar.net/files/docs/Munich_Summit_2014 _-_ PPP_Session _-_ Pieter_ Toor _-_ VERIPOS.pdf>.

Jokinen, Altti Samuli. "Enhanced Ambiguity Resolution and Integrity Monitoring Methods for Precise Point Positioning." Centre for Transport Studies, Department of Civil and Environmental Engineering, Imperial College London [online thesis], Aug. 2014 [retrieved on Aug. 31, 2016]. Retrieved from the Internet: <URL:https://spiral.imperial.ac.uk/bitstream/10044/1/24806/1/Jokinen-A-2014-PhD-Thesis.pdf>.

"Real-time Service." International GNSS Service [online article], 2015 [retrieved on Aug. 31, 2016]. Retrieved from the Internet: <URL:http://www.igs.org/rts>.

"Introducing the IGS Real-Time Service (RTS)." International GNSS Service [online], 2015 [retrieved on Aug. 31, 2016]. Retrieved from the Internet <URL:ftp://igs.org/pub/resource/pubs/IGS_Real_Time_Service-131031.pdf>.

Duman, Angie, et al. "PPP: IGS Announces The Launch Of RTS-IGS." xyHt [online], Apr. 20, 2015 [retrieved on Aug. 31, 2016]. Retrieved from the Internet: <URL:http://www.xyht.com/professional-surveyor-archives/ppp-igs-announces-the-launch-of-rts-igs/>.

(56) References Cited

OTHER PUBLICATIONS

Laurichesse, D.; Mercier, F.; and Berthias, J. P. "Real-time PPP with Undifferenced Integer Ambiguity Resolution, Experimental Results." Proceedings of the ION GNSS [online] Sep. 21-24, 2010 [retrieved on Aug. 31, 2016]. Retrieved from the Internet <URL:http://www.ppp-wizard.net/Articles/laurichesse_ion_gnss_2010_bdp.pdf>.

Blewitt, Geoffrey. "Carrier Phase Ambiguity Resolution for the Global Positioning System Applied to Geodetic Baselines up to 2000 km." Journal of Geophysical Research [online], vol. 94, No. B8, p. 10187-10203, Aug. 10, 1989 [retrieved on Aug. 31, 2016]. Retrieved from the Internet: <URL:http://www.colorado.edu/ASEN/asen6090/blewitt.pdf#page=1&zoom=auto,-154,811>.

Banville, Simon. "Ambiguity Resolution." BlackDot GNSS [online], Apr. 25, 2015 [retrieved on Sep. 6, 2016]. Retrieved from the Internet <URL:http://www.blackdotgnss.com/2015/04/25/ambiguity- resolution/>.

Teunissen, P.J.G. "Towards a Unified Theory of GNSS Ambiguity Resolution." Journal of Global Positioning Systems [online], vol. 2, No. 1, pp. 1-12, 2003 [retrieved on Sep. 6, 2016]. Retrieved from the Internet <URL:http://citeseerx.ist.psu.edu/viewdoc/download?doi=10.1.1.454.4430&rep=rep1&type=pdf>.

Teunissen, P.J.G. "Least-Squares Estimation of the Integer GPS Ambiguities." International Association of Geodesy General Meeting, Section IV: Theory and methodology, Beijing, China, 1993 [online] retrieved on Sep. 6, 2016]. Retrieved from the Internet: <URL:http://citeseerx.ist.psu.edu/viewdoc/download?doi=10.1.1.475.9393&rep=rep1&type=pdf>.

"Hemisphere GNSS Debuts Atlas GNSS Correction Service." GPS World Staff. GPS World [online], Jun. 15, 2015 [retrieved on Sep. 9, 2016]. Retrieved from the Internet: <URL:http://gpsworld.com/hemisphere-gnss-debuts-atlas-gnss-correction-service/>.

Teunissen, P.J.G. "GNSS Ambiguity Bootstrapping: Theory and Application." Proceedings of International Symposium on Kinematic Systems in Geodesy, Geomatics and Navigation [online], pp. 246-254, Jun. 2001 [retrieved on Nov. 16, 2016]. Retrieved from the Internet <URL:http://www.ucalgary.ca/engo_webdocs/SpecialPublications/KIS%2001/PDF/0503.PDF>.

Teunissen, P.J.G. "Theory of Integer Equivariant Estimation with Application to GNSS." Journal of Geodesy [online], vol. 77, No. 7-8, pp. 402-410, 2003 [retrieved on Nov. 16, 2016]. Retrieved from the Internet <URL:http://link.springer.com/article/10.1007/s00190-003-0344-3>.

Wen, Zhibo, et al. "Best Integer Equivariant Estimation for Precise Point Positioning." Institute for Communications and Navigation 2012 Proceedings [online], pp. 279-282, Sep. 12-14, 2012 [retrieved on Sep. 6, 2016]. Retrieved from the Internet <URL:http://ieeexplore.ieee.org/xpls/abs_all.jsp?arnumber=6338525&tag=1>.

Shi, J., Gao, Y. "A Fast Integer Ambiguity Resolution Method for PPP." Proceedings of the ION GNSS [online], Nashville, TN, pp. 3728-3734, Sep. 17-21, 2012 [retrieved on Nov. 16, 2016]. Retrieved from the Internet <URL: https://www.ion.org/publications/abstract.cfm?articleID=10548>.

Teunissen, P.J.G. "The Least-squares Ambiguity Decorrelation Adjustment: A Method for Fast GPS Integer Ambiguity Estimation." Journal of Geodesy [online], vol. 70, No. 1-2 pp. 65-82, 1995 [retrieved on Nov. 16, 2016]. Retrieved from the Internet <URL:http://link.springer.com/article/10.1007/BF00863419>.

De Jonge, P. and Tiberius, C. "The LAMBDA Method for Integer Ambiguity Estimation: Implementation Aspects." Publications of the Delft Computing Centre [online], LGR-Series No. 12, pp. 1-47, Aug. 1996 [retrieved on Sep. 6, 2016]. Retrieved from the Internet <URL:http://www.citg.tudelft.nl/fileadmin/Faculteit/CiTG/Over_de_faculteit/Afdelingen/Afdeling_Geoscience_and_Remote_Sensing/pubs/lgr12.pdf>.

Chang, X. W., Yang, X. and Zhou, T. "MLAMBDA: A Modified LAMBDA Method for Integer Least-squares Estimation." Journal of Geodesy [online], vol. 79, No. 9, pp. 552-565, Dec. 2005 [retrieved on Sep. 6, 2016]. Retrieved from the Internet <URL:http://www.cs.mcgill.ca/~chang/pub/MLAMBDA.pdf>.

Baroni, Leandro and Kuga, Helio K. "Evaluation of Two Integer Ambiguity Resolution Methods for Real Time GPS Positioning." WSEAS Transactions on Systems 8.3, pp. 323-333, Mar. 2009 [retrieved on Sep. 6, 2016]. Retrieved from the Internet <URL:https://www.researchgate.net/profile/Helio_Kuga/publication/41146341_Evaluation_of_Two_Integer_Ambiguity_Resolution_Methods_for_Real_Time_GPS_Positioning/links/543687fe0cf2bf1f1f2bd8d1.pdf>.

Verhagen, Sandra. "The GNSS Integer Ambiguities: Estimation and Validation." Delft Institute of Earth Observation and Space Systems, Delft University of Technology, Jan. 31, 2005 [retrieved on Sep. 6, 2016]. Retrieved from the Internet <URL:http://repository.tudelft.nl/islandora/object/uuid:07c6f2be-3a70-42aa-97b3-894a5770454d/?collection=research>.

Lin, P. and Zhang, X. "Precise Point Positioning With Partial Ambiguity Fixing." Sensors [online journal], vol. 15, No. 6, pp. 13627-13643, Jun. 10, 2015 [retrieved on Sep. 6, 2016]. Retrieved from the Internet :<URL:http://www.mdpi.com/1424-8220/15/6/13627/htm>.

Verhagen, Sandra, et al. "GNSS Ambiguity Resolution: Which Subset to Fix?" IGNSS Symposium 2011, International Global Navigation Satellite Systems Society, University of New South Wales, Sydney, Australia, Nov. 15-17, 2011 [retrieved on Sep. 6, 2016]. Retrieved from the Internet :<URL:http://repository.tudelft.nl/islandora/object/uuid:075deb5b-5253-4daf-97be-f7126519612b/?collection=research>.

Pan, L., Cai, C., Santerre, R. and Zhu, J. "Combined GPS/GLONASS Precise Point Positioning with Fixed GPS Ambiguities." Sensors [online journal], vol. 14, No. 9, pp. 17530-17547, Sep. 18, 2014 [retrieved on Sep. 6, 2016]. Retrieved from the Internet: <URL:http://www.mdpi.com/1424-8220/14/9/17530/htm>. <DOI:10.3390/s140917530>.

Gratton, L., Joerger, M. and Pervan, B. "Carrier Phase Relative RAIM Algorithms and Protection Level Derivation." Journal of Navigation [online], vol. 63, No. 2, pp. 215-231, Apr. 1, 2010 [retrieved on Sep. 6, 2016]. Retrieved from the Internet: <URL:https://www.cambridge.org/core/journals/journal-of- navigation/article/div-classtitlecarrier-phase-relative-raim-algorithms-and-protection-level- derivationdiv/AEA4489E97E3C131EBD3E2184B3F0DD7><DOI:10.1017/S0373463309990403>.

"Trimble XFill RTK." Trimble Navigation Limited [online white paper], Sep. 2012 [retrieved on Sep. 6, 2016]. Retrieved from the Internet: < URL: http://trl.trimble.com/docushare/dsweb/Get/Document-630776/022543-551_Trimble%20xFill%20White%20Paper_1012_sec.pdf>.

NovAtelCORRECT. NovAtel Inc. [online brochure], Nov. 2015 [retrieved on Sep. 6, 2016]. Retrieved from the Internet: <URL: http://www.novatel.com/assets/Documents/Papers/NovAtelCORRECT-Brochure.pdf>.

Reußner, N. and Wanniger, L. "GLONASS Inter-frequency Code Biases and PPP Carrier-Phase Ambiguity Resolution." Geodetic Institute, Technische Universität Dresden, IGS Workshop, Jul. 2012 [retrieved Aug. 31, 2016]. Retrieved from the Internet: <URL:https://tu-dresden.de/bu/umwelt/geo/gi/gg/ressourcen/dateien/veroeffentlichungen/igs2012.pdf?lang=en>.

Sleewagen, J., et al. "Digital versus Analog: Demystifying GLONASS Inter-Frequency Carrier Phase Biases." Inside GNSS [online], May/Jun. 2012 [retrieved Aug. 31, 2016]. Retrieved from the Internet :<URL:http://www.insidegnss.com/auto/mayjune12-Sleewaegen.pdf>.

Carcanague, S., et al. "Finding the Right Algorithm Low-Cost, Single-Frequency GPS/GLONASS RTK for Road Users." Inside GNSS [online], vol. 8 No. 6, pp. 70-80, Nov./Dec. 2013 [retrieved Aug. 31, 2016]. Retrieved from the Internet :<URL:http://www.insidegnss.com/auto/novdec13-WP.pdf>.

Wang, J. and Feng, Y. "Reliability of Partial Ambiguity Fixing with Multiple GNSS Constellations." Journal of Geodesy [online], vol. 87, No. 1, pp. 1-14, Jun. 12, 2012 [retrieved Aug. 31, 2016]. Retrieved from the Internet :<URL:http://link.springer.com/article/10.1007/s00190-012-0573-4> <DOI:10.1007/s00190-012-0573-4>.

(56) References Cited

OTHER PUBLICATIONS

PPPserve. "Network based GNSS Phase Biases to enhance PPP Applications—A new Service Level of GNSS Reference Station Providers." PPPserve Final Report. Feb. 2014. pp. 1-86. (Year: 2014).

* cited by examiner

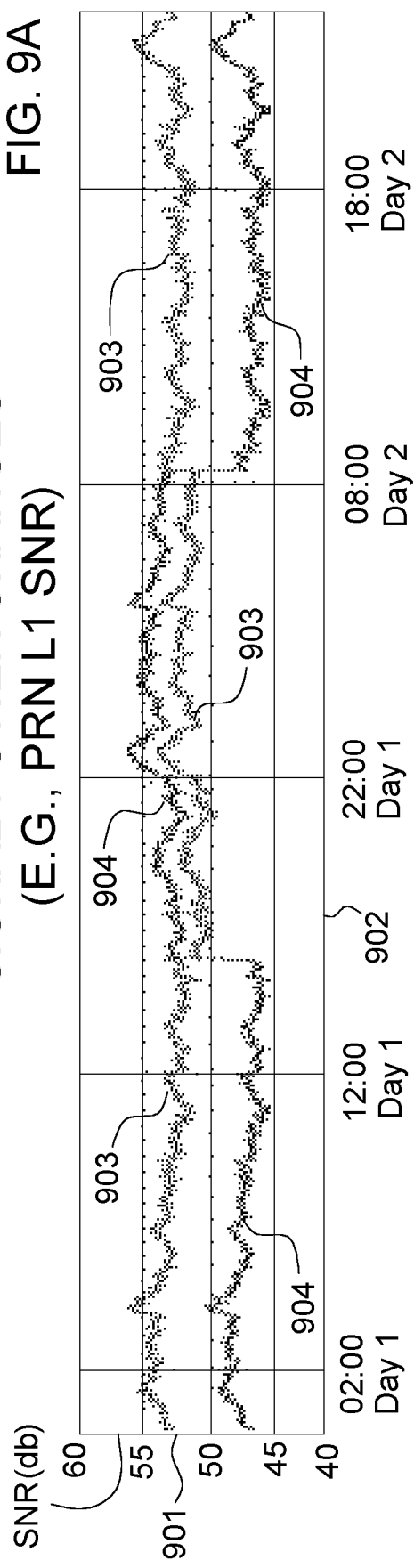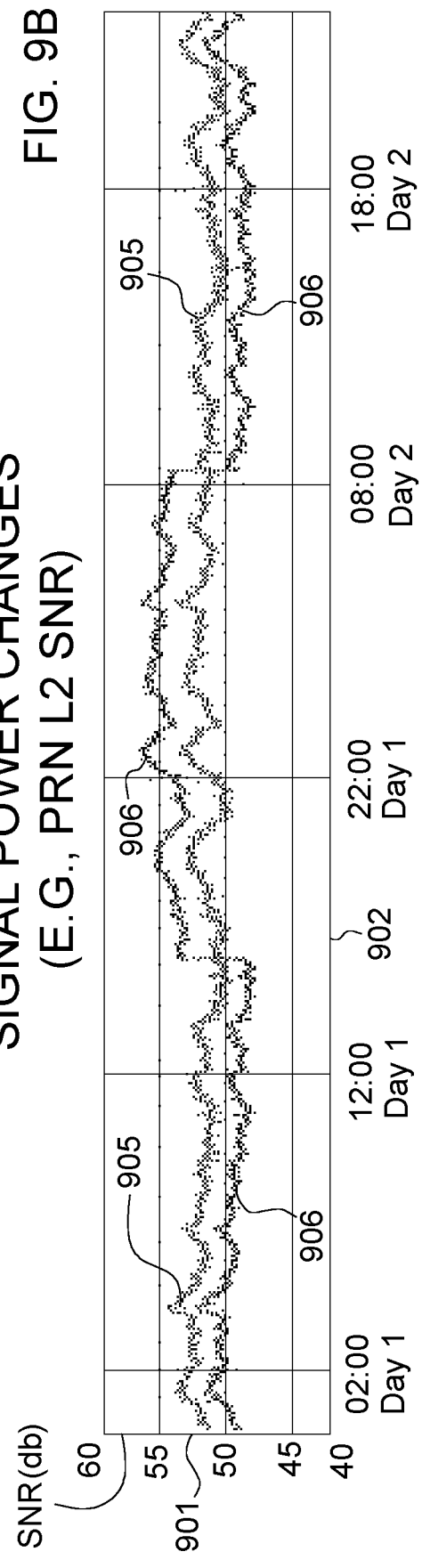

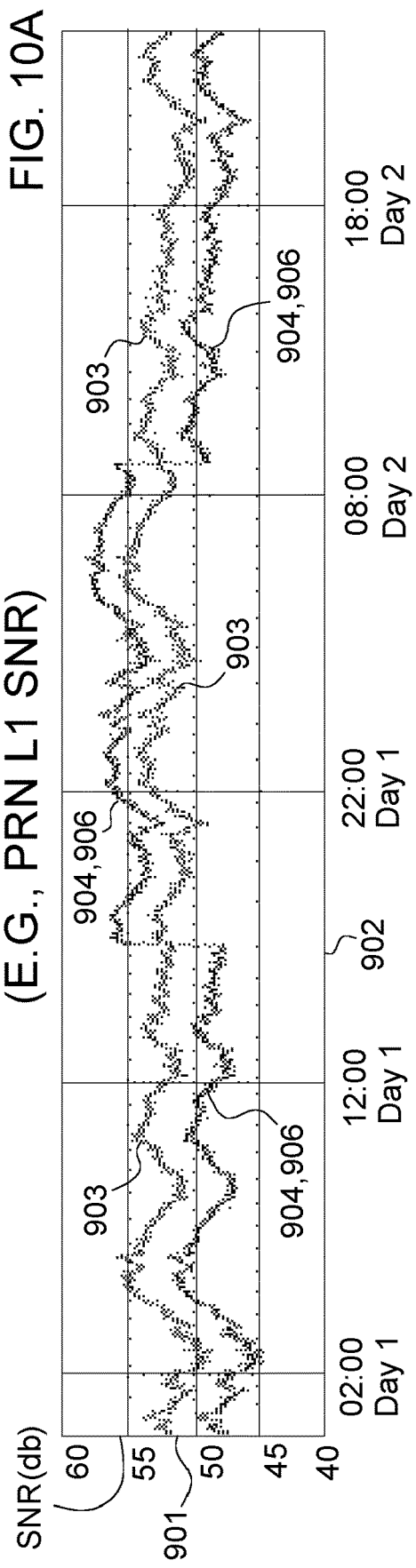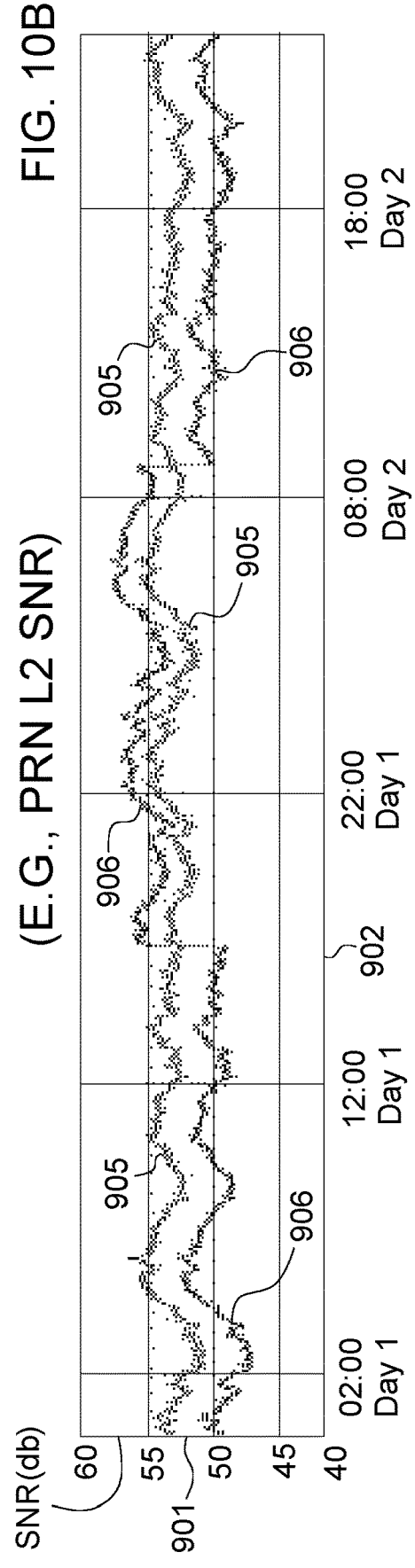

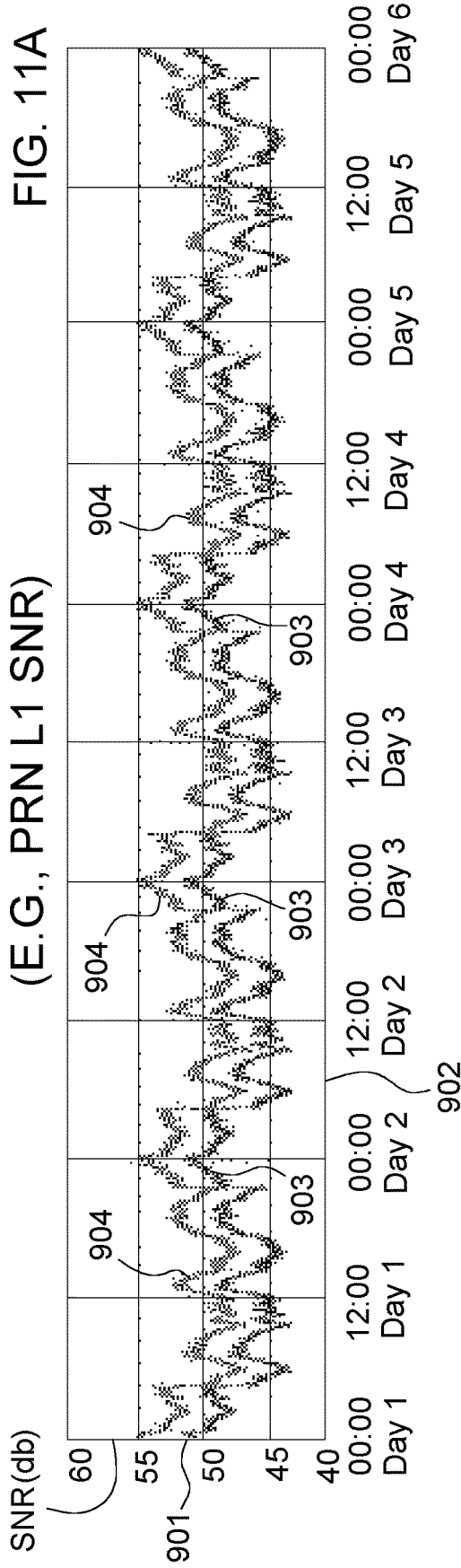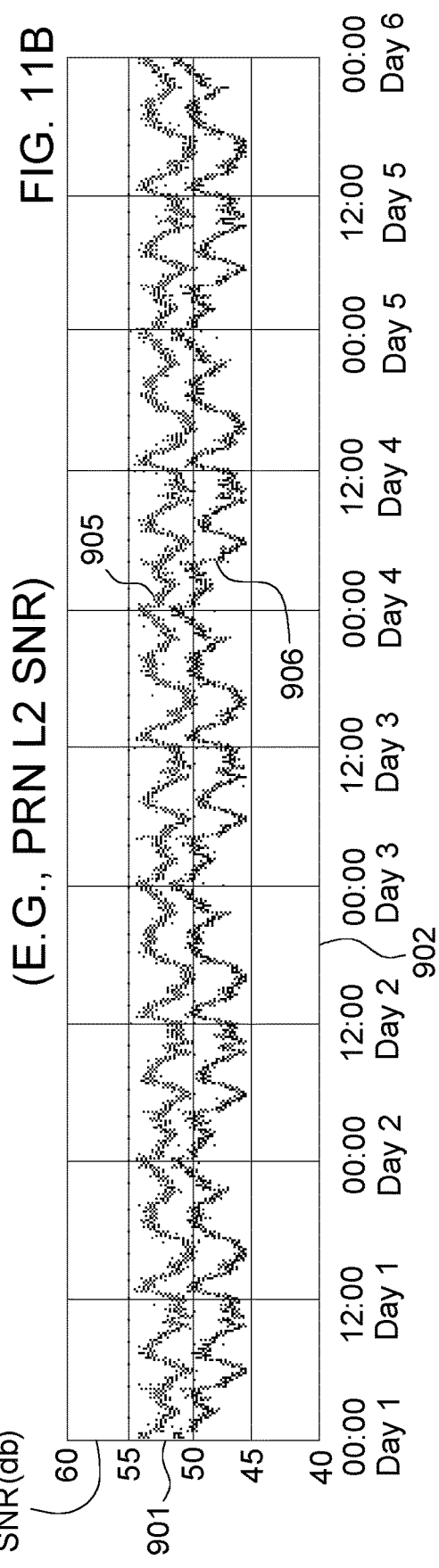

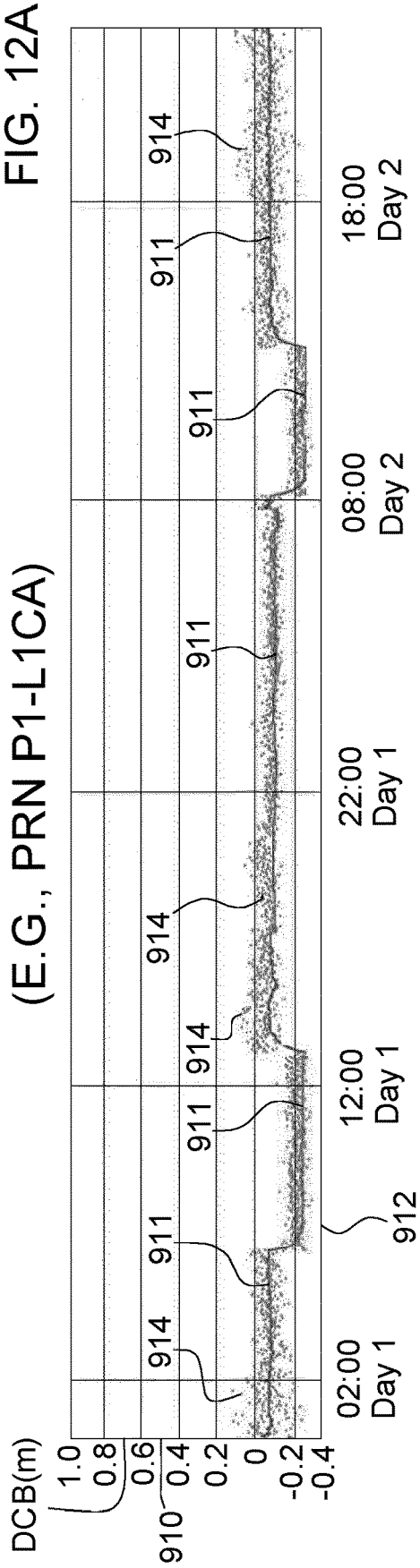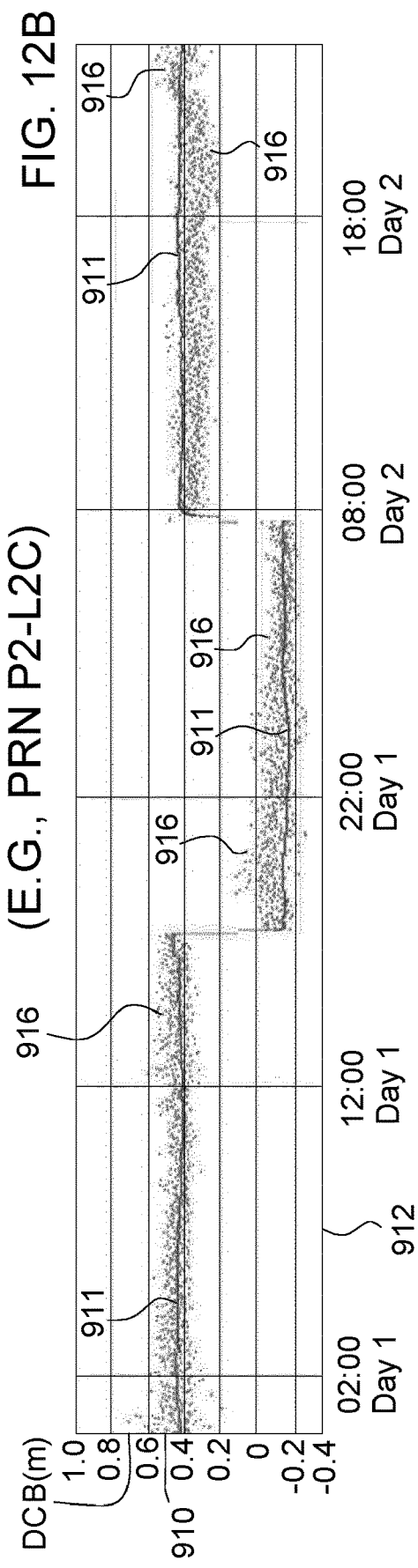

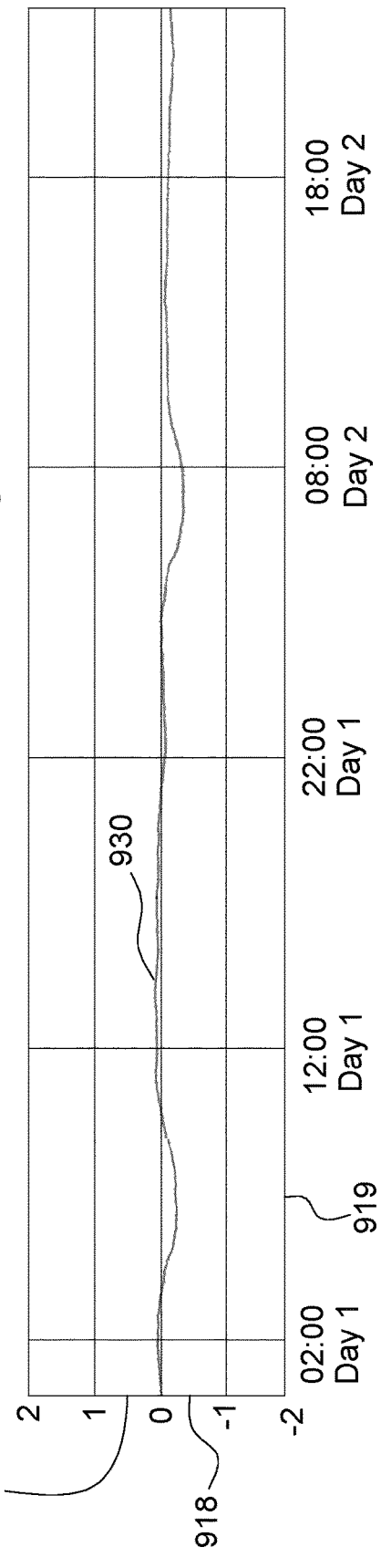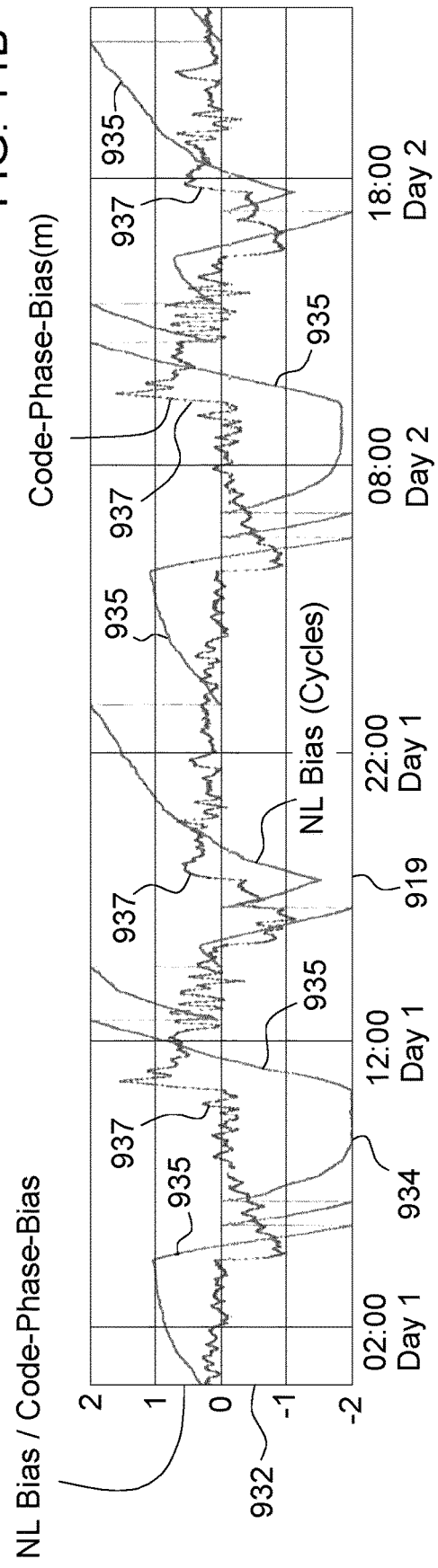

S821 — DETERMINE WIDE-LANE, FIXED AMBIGUITIES AND CORRESPONDING A TIME-VARIANT WIDE-LANE BIAS FOR A CORRESPONDING SATELLITE BASED ON ADAPTIVE ESTIMATION RESPONSIVE TO TUNED DYNAMIC NOISE WITHIN A SUPPLEMENTAL WIDE-LANE BIAS PREDICTIVE FILTER FOR EACH SATELLITE: (A) WHERE A WIDE-LANE ZERO DIFFERENCE FILTER PROVIDES WIDE-LANE RESIDUALS TO THE SUPPLEMENTAL WIDE-LANE BIAS PREDICTIVE FILTER FOR A GIVEN SATELLITE; AND (B) WHERE THE SUPPLEMENTAL WIDE-LANE BIAS PREDICTIVE FILTER PROVIDES THE TUNED DYNAMIC NOISE (E.G., REFINED, TUNED DYNAMIC NOISE) BASED ON THE PROVIDED WIDE-LANE RESIDUALS FOR THE RESPECTIVE SATELLITE TO THE WIDE-LANE ZERO DIFFERENCE FILTER FOR THE GIVEN SATELLITE.

S822 — DETERMINE NARROW-LANE, FIXED AMBIGUITIES, A SATELLITE SLOW CLOCK SOLUTION AND A TIME-VARIANT NARROW-LANE BIAS FOR A CORRESPONDING SATELLITE BASED ON ADAPTIVE ESTIMATION RESPONSIVE TO TUNED DYNAMIC NOISE WITHIN A NARROW-LANE BIAS/CODE-PHASE BIAS FILTER FOR EACH SATELLITE.

S824 — PROVIDE A CORRECTION SIGNAL COMPRISING THE WIDE-LANE AMBIGUITIES, THE TIME-VARIANT WIDE-LANE BIAS AND THE NARROW-LANE AMBIGUITIES AND THE TIME-VARIANT NARROW LANE BIAS.

ADAPTIVE ESTIMATION OF GNSS SATELLITE BIASES

RELATED APPLICATION

This document (including the drawings) claims priority and the benefit of the filing date based on U.S. provisional application No. 63/143,921, filed Jan. 31, 2021, and U.S. provisional application No. 63/201,612, filed May 6, 2021, under 35 U.S.C. § 119 (e), where the provisional application is hereby incorporated by reference herein.

FIELD OF DISCLOSURE

This disclosure relates to adaptive estimation of GNSS satellite biases.

BACKGROUND

In certain prior art, some GNSS satellites are susceptible to significant code and/or phase biases changes during transient time periods because of changes in satellite transmit power, changes in satellite transmit power allocation between or among encoded components (e.g., pseudo-random noise code components and/or coarse-acquisition code components), temperature change, or switching of redundant transmitters, different antennas or different hardware signal paths within one or more satellites within any GNSS constellation of satellites. Accordingly, there is need to improve the accuracy and timeliness of code and phase biases in correction signals that are provided wirelessly to rover or mobile GNSS receivers.

SUMMARY

According to one embodiment, a method or system for providing a global satellite differential correction signal comprises an electronic data processor of a data processing center that is configured to determine wide-lane, fixed ambiguities and a corresponding time-variant wide-lane bias for a corresponding satellite. A first pair of a wide-lane (WL), zero-difference (ZD) bias filter and a corresponding supplemental WL bias predictive filter determines the time-variant wide-lane bias for a corresponding satellite based on adaptive estimation responsive to tuned dynamic noise provided by the supplemental wide-lane bias predictive filter for each satellite. The electronic data processor of a data processing center is configured to determine narrow-lane, fixed ambiguities, a satellite slow clock solution and a time-variant narrow-lane bias for a corresponding satellite. A second pair of a narrow-lane (NL), zero-difference (ZD) bias filter and a corresponding NL bias filter/code-phase bias filter determines the time-variant narrow-lane bias (e.g., refraction corrected (NL) code-phase bias) for a corresponding satellite based on adaptive estimation on adaptive estimation responsive to tuned dynamic noise within a narrow-lane bias/code-phase bias filter for each satellite. The electronic data processor of a data processing center is configured to provide a correction signal comprising the wide-lane ambiguities, the time-variant wide-lane bias and the narrow-lane ambiguities and the time-variant narrow lane bias.

In accordance with another aspect of the disclosure, to tune properly the dynamic noise for both satellite wide-lane and narrow lane bias, the first pair and second pair of filters for each satellite are developed to support adaptive estimation of satellite wide-lane bias and narrow lane bias, respectively. When satellite refraction-corrected code bias is significant, the code-phase bias can be integrated into correction signals (e.g., StarFire™ correction signals) in a timely manner through wireless channels (e.g., satellite L-band communications) or internet-capable wireless channels for civilian operations (e.g., in real-time or timely basis for control of heavy-equipment, agricultural, construction, or industrial equipment/vehicles).

BRIEF DESCRIPTION OF THE DRAWINGS

FIG. 9A is an illustrative chart comparing a relative signal-to-noise ratio versus time for a satellite that transmits an L1 signal (e.g., L1 P(Y) signal encoded with pseudo-random noise code (PN) and L1 CA (coarse-acquisition code)), where the correction signal can be applied to address such transitory changes in bias.

FIG. 9B is an illustrative chart comparing a relative signal-to-noise ratio versus time for a satellite that transmits an L2 signal (e.g., L2 P(Y) encoded with PN and L2C signal), where the correction signal can be applied to address such transitory changes in bias.

FIG. 10A is an illustrative chart comparing a relative signal-to-noise ratio versus time for a satellite that transmits an L1 signal (e.g., L1 P(Y) or L2 P(Y) signal encoded with PN and the L1CA encoded with the course-acquisition code), where the correction signal can be applied to address such transitory changes in bias.

FIG. 10B is chart comparing a relative signal-to-noise ratio versus time for a satellite that transmits the L2 signal (e.g., P(Y) encoded with PN and the L2C signal), where the correction signal can be applied to address such transitory changes in bias.

FIG. 11A is an illustrative chart comparing a relative signal-to-noise ratio versus time for a satellite that transmits an L1 signal (e.g., L1 (P(Y) or L2 P(Y) signal encoded with PN and the L1CA encoded with the course-acquisition code), where the correction signal can be applied to address such transitory changes in bias.

FIG. 11B is an illustrative chart comparing a relative signal-to-noise ratio versus time for a satellite that transmits the L2 signal (e.g., L2 P(Y) encoded with PN and the L2C signal), where the correction signal can be applied to address such transitory changes in bias.

FIG. 12A is an illustrative chart that shows the differential code bias for the P1 signal versus L1CA signal associated with changes in power of the carrier or encoded portions of the respective signals.

FIG. 12B is an illustrative chart that shows the differential code bias for the P2 signal versus L2C signal associated with changes in power of the carrier or encoded portions of the respective signals.

FIG. 14A illustrates the NL bias versus time for NL filtering system that is operating in the first NL filtering mode.

FIG. 14B illustrates the NL bias versus time and the code-phase bias versus time for the NL filtering system that is operating in the second NL filtering mode.

FIG. 17 is a flow chart of a third illustrative embodiment of a method for providing a global satellite differential correction signal, consistent with or in conjunction with any of the block diagrams referenced in the above drawings of this disclosure.

Like reference numbers in any set of two or more drawings indicate like features, methods, steps or elements.

DETAILED DESCRIPTION

Figure 1A:
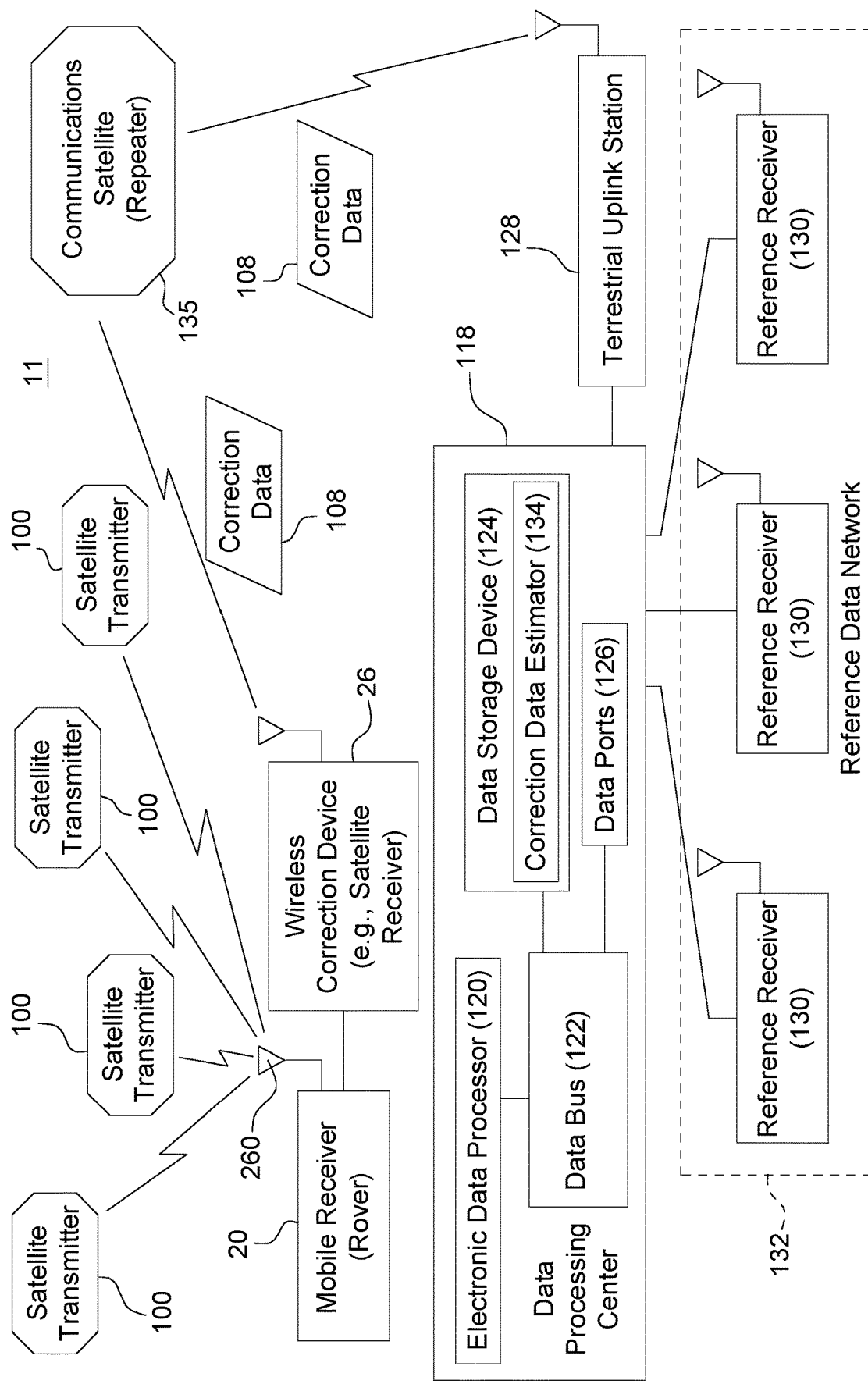
FIG. 1A is a block diagram of one embodiment of a navigation satellite receiver system for determination of precise position, where the navigation satellite receiver can obtain correction data from a communications satellite.

Global Navigation Satellite System (GNSS) receivers can be evaluated based on positioning accuracy, reliability, and duration of pull-in time to achieve the target positioning accuracy. Presently, GNSS receivers may use up to four global GNSSs, such as GPS (US), GLONASS (Russia), Galileo (EU) and BeiDou (China). Additionally, there are two regional systems, called QZSS (Japan) and IRNSS or NavIC (India).

A correction signal generation system processes observations of different received signals from multiple GNSSs to generate a GNSS correction signal for distribution to GNSS receivers. The correction signal generation system accounts for error sources in the correction signal generation (e.g., globally valid correction signal), including hardware and software biases, to provide accurate and reliable results. Both satellite transmitter biases and GNSS receiver biases occur because of imperfections and/or physical limitations in GNSS hardware and data processing. The GNSS code bias and phase bias are time delays within the satellite and receiver caused by their hardware, by imperfect modelling, such as environmental temperature changes, and by signal power redistribution, which can change over time.

In some embodiments, a satellite bias can be modeled as a first offset between the satellite clock and the signal emission time of the satellite signal from the satellite. Similarly, the receiver bias can be modeled a second offset between a given reception time of the satellite signal, which is adopted by the receiver and the time when the signal was actually, fully demodulated and linked to the internal receiver clock. Further, there is a time delay between the reception time in the antenna and the time linking within the receiver hardware. The above delays are commonly known as bias and has to be taken into account when processing GNSS data to generate global correction signals, such as satellite and receiver clock estimation, carrier phase ambiguity resolution, and satellite and receiver biases including, both code and carrier phase signals transmitted by each satellite within a set (e.g., constellation) of satellites.

Certain GPS satellites, which are referred to as Block IIR-M, Block IIF and Block III satellites, have the capability to redistribute transmit power between individual signal components. The transmit power redistribution is commonly called flex power; can be used for increased protection against jamming. For example, for GPS open service signals, such as L1 (coarse acquisition code) C/A and L2C, changes in signal powers show up directly in the measured carrier signal-to-noise ratio (C/NO) of respective observations.

In contrast, pseudo-random-noise code modulated signals (e.g., P(Y)-code signals) are encrypted, and a semi-codeless tracking approach is used by common geodetic GNSS receivers. However, this technique results in significant losses in the measured C/NO compared to unencrypted signals and results in identical C/NO values for L1 P(Y) and L2 P(Y). Therefore, a determination of frequency-specific signal power changes from C/NO measurements of GNSS receivers is not possible for the P(Y) signals of ground-based GPS receivers as well as differential code bias.

Transmit power changes are not only visible in the carrier-to-noise density ratio, but also in satellite code bias, which in turn tends to have a significant impact on GPS satellite clock estimation. The significant systematic variation for the GPS Block IIF satellites can be an indication of thermally dependent inter-frequency clock biases. Accordingly, the method and system of this disclosure is well-suited to adaptively estimate GNSS satellite bias and clock bias, such as bias associated with environmental temperature change, a (transient) signal power redistribution change, or both.

A location-determining receiver, position-determining receiver, or satellite receiver, such as a Global Navigation Satellite System (GNSS) receiver, is capable of receiving carrier phase measurements that are subject to ambiguities, such as integer ambiguities, in the number of cycles or fractional cycles of the received satellite signal. An epoch or measurement time means a specific instant in time of a navigation satellite system or the time interval during which the mobile receiver measures the carrier phase (e.g., at a certain corresponding frequency or rate). As used in this document, a mobile receiver is synonymous with the term rover. The receiver determines or resolves ambiguities of carrier phase measurements to estimate accurately the precise position or coordinates of the receiver. Although the code phase or pseudo-range measurements of the GNSS receiver are not associated with integer ambiguities in the cycles of the received satellite, code phase measurements do not provide the centimeter level position accuracy required for certain applications. As used throughout this document, ambiguities are often specific to the context of particular equations (e.g., later described in this document) which relate to observations from one or more receivers of carrier phase signals from one or more satellites. Accordingly, it is possible to have wide-lane (WL) ambiguities, narrow-lane (NL) ambiguities, single-difference (SD) ambiguities, double-difference (DD) ambiguities, real-time-kinematic (RTK) ambiguities, and refraction-corrected (RC) ambiguities that relate to phase measurements from one or more receivers, or one or more satellites.

If the satellite navigation receiver can receive at least two frequencies, such as L1 and L2 frequencies, the difference of the L1 and L2 carrier phase measurements can be combined to form wide-lane (WL) measurement (e.g., with a wavelength of approximately 86.25 centimeters for GPS) and the sum of the L1 and L2 carrier phase measurements can be combined to form narrow-lane (NL) measurements (e.g., with a wavelength of approximately 10.7 centimeters). The wide-lane measurements facilitate quick and efficient resolution of wide-lane integer ambiguities, whereas the narrow lane measurements facilitate precise and accurate resolution of narrow-lane ambiguities with minimal phase noise. The refraction-corrected ambiguities eliminate the first order of ionospheric delay associated with propagation of the satellite signal to the GNSS receiver on or near the surface of Earth.

Single-difference measurements (e.g., of carrier phase or code phase) can be formed between two receivers and a satellite. For example, single difference measurements can be formed between a reference receiver 130 (at a known location) and one satellite and between a rover receiver and the satellite (e.g., to eliminate or reduce certain errors that are common to both receivers). Single difference measurements (of carrier phase or code phase) can be formed with respect to one receiver (e.g., reference receiver 130 or rover) and a pair of satellites (e.g., at the same observation time to reduce or eliminate receiver clock error).

Double-difference measurements can be formed by subtracting two related single-difference measurements. For example, double-difference measurements (e.g., of carrier phase or code phase) can be formed with respect to one satellite, a reference receiver 130 and a rover receiver or mobile receiver 20 by subtracting two single difference measurements. Further, double-difference measurements can be formed with respect to two satellites and a rover receiver (e.g., 20), or by subtracting two single-difference measurements. In certain embodiments, differences may be taken at the same observation times (e.g., epochs) or different observation times and for different frequencies or combinations of received satellite signals.

As used herein, ambiguities that are estimated, determined or "resolved" may have integer values, float values or real number values. Accordingly, estimated ambiguities, determined ambiguities and resolved ambiguities shall be regarded as synonymous terms in this document. In contrast, ambiguities that are "fixed" shall mean the ambiguities have integer values, unless otherwise specified, such as where ambiguities are divided into a fixed integer component and a real value component (float component). Converged ambiguities refer to integer or real valued ambiguities that are associated with reliable or steady-state accurate solutions or position estimates that are at or approach peak accuracy and acceptable standard deviation levels for a GNSS receiver operating in a GNSS.

The measurement module 56 or navigation receiver (e.g., mobile receiver 20) can measure or observe the L1 and L2 carrier phases and pseudo-ranges of the applicable Global Navigation Satellite System (GNSS) (e.g., Global Positioning System (GPS) or GLONASS), as shown in equations (A1-A4) as follows:

$$P_1^j = \rho^j + \tau_r + \tau^j + T + b_{P_1} + B_{P_1}^j + I^j + \varepsilon_{P_1}^j \quad (A1)$$

$$P_2^j = \rho^j + \tau_r + \tau^j + T + b_{P_2} + B_{P_2}^j + \frac{f_1^2}{f_2^2} I^j + \varepsilon_{P_2}^j \quad (A2)$$

$$L_1^j = \Phi_1^j \lambda_1 = \\ \rho^j + \tau_r + \tau^j + T + b_{L_1} + B_{L_1}^j - I^j + N_1^j \lambda_1 + (W^j + w)\lambda_1 + \varepsilon_{L_1}^j \quad (A3)$$

$$L_2^j = \Phi_2^j \lambda_2 = \\ \rho^j + \tau_r + \tau^j + T + b_{L_2} + B_{L_2}^j - \frac{f_1^2}{f_2^2} I^j + N_2^j \lambda_2 + (W^j + w)\lambda_2 + \varepsilon_{L_2}^j \quad (A4)$$

where:

$P_i^j$ and $L_i^j$ are pseudo-range and carrier phase measurements (e.g., in meters), respectively, for a given frequency i (e.g., 1, 2, . . . , such as L1 or L2) and satellite j;

$\Phi_1^j$ is an ambiguous or non-integer phase measurement and $\lambda_1$ is the wavelength of the carrier phase measurement for frequency L1;

$\Phi_2^j$ is an ambiguous or non-integer phase measurement and $\lambda_2$ is the wavelength of the carrier phase measurement for frequency L2;

$\rho^j$ is the geometric distance (e.g., in meters) between the satellite j phase center and the receiver phase center including satellite orbital correction in the correction data 108, receiver tide displacement and earth rotation correction;

$\tau_r$ is the receiver r clock bias or error for a given GNSS system, where one receiver clock bias is estimated for each GNSS system such as GPS, GLONASS, Galileo or Beidou constellation;

$\tau^j$ is the satellite clock error for satellite j;

T is the tropospheric delay, and is divided into a dry component $T_{dry}$ and a wet component $T_{wet}$;

$b_{P_i}$ and $b_{L_i}$ are receiver dependent code bias and phase bias, respectively, for a given frequency i (1, 2, ...) and can be assumed to be same for each CDMA signal of all the visible satellites within each GNSS constellation;

$B_{P_i}{}^j$ and $B_{L_i}{}^j$ are satellite j dependent code bias and phase bias, respectively, for a given frequency i (1, 2, ...) which change very slowly over time;

$f_i$ and $\lambda_i$ are the GNSS carrier signal frequency i and its wavelength;

$I^j$ is the ionosphere error for a given satellite j;

$N_i{}^j$ is carrier phase integer ambiguity for a given frequency i and satellite j;

$W^j$ and W are phase windup errors for both satellite j and receiver, in cycles, respectively, which can be corrected with models;

$\varepsilon_{P_i}{}^j$ and $\varepsilon_{L_i}{}^j$ are code and phase errors, respectively, including white noise, multipath and remaining model errors for satellite j and frequency i.

In an alternate embodiment, an alternative approach for the receiver r clock bias, $\tau_r$, is the receiver r clock bias is to estimate one clock for a primary constellation such as GPS and then relative receiver clock biases between primary constellation and the other GNSS constellations.

For determination of the tropospheric delay, the dry component can be accurately modeled using an a priori troposphere model, such as the Global Pressure and Temperature model (GPT) or the GPT2 model; the remaining wet component, after removing an a priori wet model, can be further estimated as one zenith bias with elevation mapping function and/or additional two horizontal gradient coefficients.

If the measurement module 56 or receiver (e.g., mobile receiver 20) observes or measures GLONASS satellite signals, the different frequencies of different satellite transmitters 100 must be considered. For example, the satellite signals transmitted by GLONASS satellites can be derived from a fundamental frequency (1602 MHz for L1 band, 1246 MHz for L2 band) of the satellite L-Band. Each GLONASS satellite currently transmits on a different frequency using an FDMA technique. The equation to give the exact L1 center frequency is as follows:

$$f_1^j = 1602 \text{ MHz} + n^j \times 0.5625 \text{ MHz} \tag{A5}$$

where n' is frequency channel number (n=−7, −6, ..., 6) of satellite j. On the L2 band, the center frequency is determined by the equation:

$$f_2^j = 1246 \text{ MHz} + n^j \times 0.4375 \text{ MHz} \tag{A6}$$

Equations A1 through A4 may be expressed in alternate nomenclature, set forth in equations B1 through B4. The form of equations B1 through B4, inclusive, provides aggregate phase bias and aggregate code bias terms for end-to-end transmission, propagation, reception, and code demodulation of the L1 signal and L2 signal (e.g., the code signal and carrier phase signal) between a satellite and a corresponding GNSS receiver. The form of equations B1 through B4 facilitates greater detail on the determination of phase offsets associated with antenna phase delay, antenna phase wind-up, tidal effect, and relativistic effects, as expressed in equation B5. Further, equations B1 through B4 support equation B6, which provides technical details on determining the geometric distance between a GNSS receiver and a corresponding satellite.

The basic GNSS observables for L1 and L2 satellite signals are the code and carrier phase measurements between a GNSS satellite and a receiver:

$$P_{r,L_1}^s = D_r^s + \tau_{r,L_1} + J_{r,L_1}^s + B_{r,L_1} - B_{L_1}^s + b_{IFB_r,L_1}^j + \varepsilon_{P_{r,L_1}^s} \tag{B1}$$

$$\Phi_{r,L_1}^s \lambda_{L_1} = \tag{B2}$$
$$D_r^s + \tau_{r,L_1} + \delta_{pwu}\lambda_{L_1} - I_{r,L_1 + N_{r,L_1}^s}^s \lambda_{L_1} + b_{r,L_1} - b_{L_1}^s + \varepsilon \Phi_{r,L_1}^s$$

$$P_{r,L_2}^s = D_r^s + \tau_{r,L_2} + \frac{f_1^2}{f_2^2} I_{r,L_1}^s + B_{r,L_2} - B_{L_2}^s + b_{IFB_{r,L_2}^s} + \varepsilon_{P_{r,L_2}^s} \tag{B3}$$

$$\Phi_{r,L_2}^s \lambda_{L_2} = \tag{B4}$$
$$D_r^s + \tau_{r,L_2} + \delta_{pwu}\lambda_{L_2} - \frac{f_1^2}{f_2^2} J_{r,L_1}^s + N_{r,L_2}^s \lambda_{L_2} + b_{r,L_2} - b_{L_2}^s + \varepsilon_{P_{r,L_2}^s}$$

where:

[ ]$_r$ refers to receiver r;

[ ]$^s$ refers to satellite s;

$\tau_{r,L_{i=1,2}}$ the receiver clock error for each frequency at $L_i$;

P is code measurement from satellite s to receiver r;

$\Phi$ is carrier phase measurement from satellite s to receiver r;

I is ionospheric slant delay error from satellite s to receiver r;

B is code bias due to the multipath, satellite related delay and receiver related delay;

b is carrier phase bias due to the multipath, satellite related delay and receiver related delay;

$b_{IFB}$ is the Inter-Frequency Bias, which is only applicable to frequency division multiple access (FDMA) pseudo range signal, (e.g., GLONASS);

$\varepsilon$ is measurement noise including any un-modeled multipath and other unmodeled errors, N is the integer ambiguity;

f is the GNSS carrier signal frequency; and $\lambda$ is the GNSS carrier phase signal wavelength.

$D_{r,L_{i=1,2}}{}^s$ represents the common terms for a given frequency $$D_{r,L_{i=1,2}}^s = \rho_r^s - \tau_r^s + T_r^s + \delta_{pcv/pco} + \delta_{tides} + \delta_{rel} + \delta_{shapiro} \tag{B1}$$

where $\rho_r^s$ the geometry distance from the receiver phase center to the satellite phase center;

$\tau^s$ is the satellite clock error;

$T_r^s$ is the tropspheric delay effect;

$\delta_{pcv/pco}$ is the antenna phase delay due to phase center offset and variation from both satellite and receiver antenna;

$\delta_{pwu}$ is the phase wind up due to relative changing orientation between satellite and receiver antennas. It only exists for carrier phase observable;

$\delta_{tides}$ is the tidal effect including solid earth tide, ocean tides loading, polar tide loading, etc.

$\delta_{rel}$ is relativistic effect on satellite clock; and $\delta_{shapiro}$ is relativistic effect on signal propagation, i.e., Shapiro delay.

The satellite-receiver geometric distance ρ is obtained by solving so-called light-time equation expressed as below equation. The equation contains the satellite movement effect during signal propagation and the received time offset by the receiver clock bias. The satellite position is represented in inertial coordinate (ECI) and the station position is presented, in earth-center earth-fixed (ECEF).

$$\rho = |r^s(t-\tau_r-\rho/c)+\delta_{apcs}-U(t-dt)^T(\tau_r+\delta_{sdisp})| \quad (B2)$$

where $r^s(t)$ is satellite s position in ECI (m);

$\tau_r$ is site r position in ECEF (m);

U(t) is ECI to ECEF transformation matrix;

$\delta_{apcs}$ is satellite antenna offset between phase center and mass center (m); and $\delta_{sdisp}$ is site displacement including solid earth tide, ocean loading and other sources of phase offsets (m).

Between earth-fixed and inertial, coordinate can be interconnected by the transformation matrix U(t) computed by the precession/nutation model and ERP (Earth Rotation Parameters) expressed as below $$U(t)=R_y(-x_p)R_x(-y_p)R_z(GAST)N(t)P(t) \quad (B3)$$

$$GAST=GMST+\Delta\psi \cos \varepsilon \quad (B4)$$

$$GMST=GMST(0^hUT1)+r(t_{UTC}+(UT1-UTC)) \quad (B5)$$

where:

$R_y, R_x, R_z$ are coordinate rotation matrix around x/y/z axis;

$x_p, y_p$ are polar motion offsets;

GAST is Greenwich Apparent Sidereal Time;

GMST is Greenwich Mean Sidereal Time;

N(t), P(t) are nutation and precession matrix;

$\Delta\psi, \varepsilon$ are nutation in longitude, obliquity;

r is ratio of universal to sidereal time; and

UT1-UTC is earth rotation angle offset.

FIG. 1A is a block diagram of one embodiment of a satellite receiver system 11 for rapid determination of precise position by correction data 108 received wirelessly from a correction data source 21, backup data stored in a data storage device 62 (in FIG. 2) associated with the mobile receiver 20, and recovery data generated by relative positioning module 18 (in FIG. 2) or real-time kinematic filter associated with the mobile receiver 20. A correction data source 21 transmits correction data 108 via a wireless signal to the mobile receiver 20 or rover and the correction data 108 is received via a correction wireless device 26 associated with the mobile receiver 20.

In one embodiment, the correction data source 21 comprises an electronic system for generation and distribution of correction data 108. As illustrated in FIG. 1A, the correction data source 21 comprises a (global) reference data network 132, a data processing center 118, a terrestrial uplink station 128 and a communications satellite 135.

In one embodiment, reference receiver 130 measures the carrier phase of one or more of the carrier signals or received satellite signals from a set of satellite transmitters 100 on satellites orbiting the Earth. The reference receiver 130 can also measure the pseudo-range or code phase of a pseudo-random noise code that is encoded on one or more of the carrier signals from the set of satellite transmitters 100. The reference receivers 130 receive and send measurements, ephemeris data, other observables and any information derived from the deliverables to an electronic data processing center 118 (e.g., hub). In one embodiment, each reference receiver 130 transmits (e.g., via a communications link, a communications network, a wireless channel, a communications channel, communications line, a transmission line, or otherwise) a set of carrier phase measurements of received satellite signals, and associated satellite identifiers, and ephemeris data to an electronic data processing center 118 (e.g., reference data processing hub).

The data processing center 118 or its correction data estimator 134 determines correction data 108 (e.g., precise correction data) in real time based on the measurements, ephemeris data, other observables and any derived information received from one or more reference receivers 130. In one embodiment, the data processing center 118 comprises an electronic data processor 120, a data storage device 124, and one or more data ports 126 that are coupled to a data bus 122. The data processor 120, the data storage device 124 and the one or more data ports 126 may communicate with each other via the data bus 122.

Software instructions and data that are stored in the data storage device 124 may be executed by the data processor 120 to implement any of the blocks, components or modules (e.g., electronic modules, software modules, or both) described in this disclosure document. The data processor 120 may comprise a microcontroller, a microprocessor, a programmable logic array, an application specific integrated circuit (ASIC), a digital signal processor, or another device for processing data, manipulating, accessing, retrieving, and storing data. A data storage device 124 may comprise electronic member, non-volatile electronic memory, an optical storage device, a magnetic storage device, or another device for storing digital or analog data on a tangible storage medium, such as an optical disk, a magnetic disk, or electronic memory. Each data port 126 may comprise a buffer memory, a transceiver or both for interfacing with other network elements, such as a reference receiver 130 or a terrestrial satellite uplink station 128.

In one embodiment, the data processing center 118 or data processor 120 or correction data estimator 134 receives the phase measurements and corresponding satellite identifiers from the reference receivers 130, reference receiver identifiers (or corresponding coordinates) and processes the phase measurements to estimate a clock bias for each satellite, or rather each satellite signal, or a corresponding clock solution for incorporation into correction data 108. As illustrated in FIG. 1A, the clock solution, clock bias or correction data 108 is provided to a terrestrial uplink station 128 or another communications link. For example, the terrestrial uplink station 128 communicates or transmits the clock solution, clock biases or correction data 108 to a communications satellite 135 (e.g., repeater).

In turn, the communications satellite 135 transmits (e.g., in a timely manner, in real-time, or with suitable latency for the navigation, guidance or control application) the correction data 108 to a correction wireless device 26 (e.g., a satellite receiver or L-band satellite receiver) at a mobile receiver 20. The correction wireless device 26 is coupled to a mobile receiver 20 (e.g., mobile GNSS receiver) or rover. The mobile receiver 20 also receives satellite signals from one or more GNSS satellites and measures the carrier phase (and code phase) of the received satellite signals. In conjunction with the phase measurements the precise orbit correction data, clock correction data, satellite wide-lane bias and satellite narrow-lane bias (e.g., for each satellite) in the correction data 108 can be used to estimate the precise position, attitude, or velocity (e.g., solution) of the mobile receiver 20, or its antenna. For example, the mobile receiver 20 may employ a precise point positioning (PPP) estimate using precise clock and orbital solutions for the received signals of the satellites.

Figure 1B:
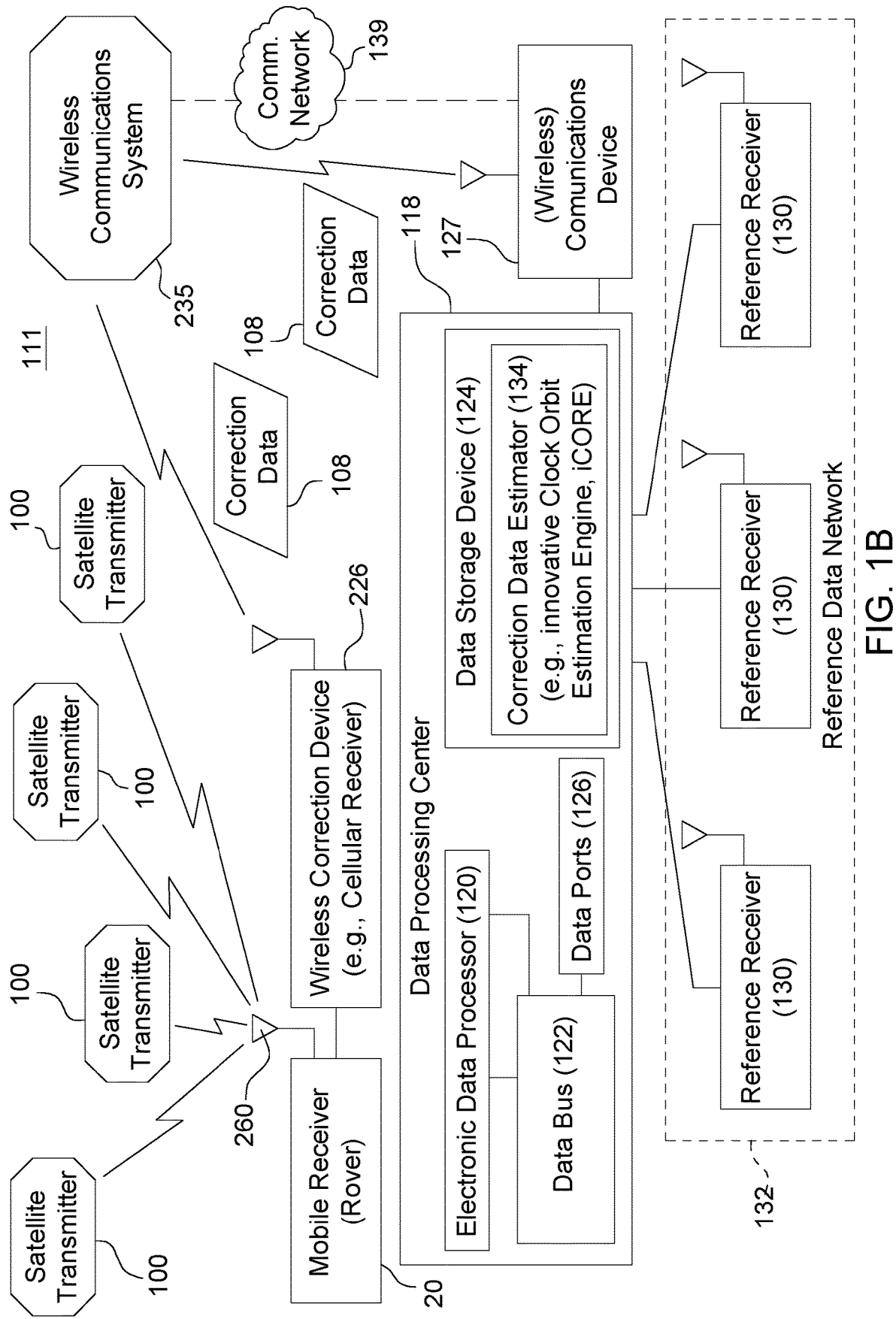
FIG. 1B is a block diagram of one embodiment of a navigation satellite receiver system for determination of precise position, where the navigation satellite receiver can obtain correction data from a wireless communications network.

The satellite receiver system 111 of FIG. 1B is similar to the system 11 of FIG. 1A except the system of FIG. 1B replaces the communications satellite 135 and the terrestrial uplink station 128 with a communications device 127 (e.g., server), a communications network 139 (e.g., Internet or communications link), a wireless communications system 235, and a correction wireless device 226 (e.g., cellular transceiver). Like reference numbers in FIG. 1A and FIG. 1B indicate like elements, modules or features.

As illustrated in FIG. 1B, the correction data source 121 comprises a reference data network 132, a data processing center 118, a communications device 127 and a wireless communications system 235. In one embodiment, the wireless communications system 235 may comprise a cellular communications system, a trunking system, a WiFi communications system, or another communications system. For example, the cellular communications system may comprise cell sites or base stations in communication with a base station controller, a router, or another mobile telephone switching office (MTSO), where the MTSO interfaces with a communications network 139, such as the Internet.

The communications network 139 may comprise microwave links, fiber optical links, the public switched telephone network (PSTN), the Internet, or another electronic communications network. In one embodiment, the communications device 127 comprises a server that formats, organizes or transmits the correction data in data packets (e.g., data packets compatible with TCP/IP Transmission Control Protocol/Internet Protocol) for transmission over the communications network 139. In FIG. 1B, communications network 139 communicates with the correction wireless device 226 (e.g., cellular transceiver) that is associated with or coupled to the mobile receiver 20.

In this document, under the precise positioning mode of FIG. 1A or FIG. 1B, the mobile receiver 20 can achieve centimeter-level accuracy positioning, by using the real-time global differential correction data 108. This correction data 108 is available and valid globally through either over satellite communications (e.g., L-Band geostationary communication satellite) in FIG. 1A or wireless communications system (e.g., cellular wireless system) in FIG. 1B. The global differential correction under a precise positioning mode, illustrated in the example of FIG. 1A or FIG. 1B, eliminates the need for local reference stations and radio communication that would otherwise be used to establish short baselines (e.g., less than approximately 20 kilometers to approximately 30 kilometers) between a reference receiver 130 and a mobile receiver 20 for precise position accuracy.

The correction data 108 may comprise precise orbit and clock corrections and any other satellite bias data that is necessary or useful to provide a precise point position (PPP) data services (e.g., with centimeter-level accuracy) to position-determining receivers in one or more geographic regions or throughout the world. The correction data 108 with additional satellite bias data enable mobile receivers 20 to quickly converge and pull-in to precise accuracy (e.g., centimeter level accuracy) or peak accuracy levels.

From time to time, any mobile receiver 20 may experience signal interruption of one or more satellite signals (from one or more satellite transmitters 100) for various reasons, such as signal propagation variation, electromagnetic interference, electromagnetic noise, signal attenuation, signal fading, multipath signal reception, tree obstructions, vegetation obstructions, terrain obstructions, building obstructions, the setting of a satellite from view or reception range, among other reasons. Obstructions refer to structures or objects that can attenuate or block propagation of the satellite signals between any satellite transmitter 100 and the mobile receiver 20. If a mobile receiver 20 or method of this disclosure experiences a temporary loss or interruption of one or more received satellite signals (e.g., GNSS signals) for short time (e.g., for a few minutes) and subsequently regains one or more of the received satellite signal after the brief loss or interruption, the receiver or method can employ an innovative technique of recovering the converged position solution (e.g., PPP solution or position estimate) rapidly to approximately the same level of accuracy before the signal interruption by estimating the differences of navigation states, such as position, carrier phase ambiguities, or the like. The above innovative technique may be referred to as a rapid recovery (RR) technique. In one embodiment, the rapid recovery technique allows a receiver to recover from the time gap in proper phase measurements of the received satellite signals, where the time gap is less than or equal to a maximum time period. For example, for a time gap or signal interruption of several minutes, the method or receiver 20 can recover a precise position estimate of the receiver almost immediately (e.g., within some seconds) based on reference to stored historical data, once the receiver resumes tracking of received satellite signals and generating phase measurements of the received satellite signals following the blockage event.

In this disclosure, the precise point positioning (PPP) algorithm can provide centimeter level accuracy, using the correction data 108, which includes a single set of clock and orbit corrections with global validity, generated from a sparse global network of reference stations. Unlike certain prior art real-time kinematic systems for providing correction data 108, PPP eliminates the need for a dense network of real-time kinematic (RTK) base stations and associated wireless communications links to support determination of correction data 108 with local validity or communications of a correction signal between an RTK base station and rover 20.

As illustrated in FIG. 1A and FIG. 1B, a reference position-determining receiver or reference receiver 130 receives satellite signals from a first set of satellites (e.g., satellite transmitters 100) within view or reliable reception range. In one configuration, a received satellite signal has a carrier signal that is encoded with a pseudo-random noise code or other spread-spectrum code.

The mobile position-determining receiver or rover 20 receives satellite signals from a second set of satellites (e.g., satellite transmitters 100) within view or reliable reception range. As used in this document, the terms rover 20 and mobile receiver 20 shall be synonymous. For the RTK algorithm executed by the relative positioning module 18, there needs to be commonality between the member satellites in the first and second sets of satellites within view or reliable range of the reference receiver 130 and the rover 20. However, for the PPP algorithm executed by the precise positioning module 16 in the rover 20, the rover 20 may use additional satellites that are not within the first set.

For the relative positioning module 18 or real-time kinematic (RTK) filter 48 to provide accurate results from recovery from a signal interruption, the mobile receiver 20 needs to be within a maximum range or distance from a first measurement time (e.g., $t_1$) to a second measurement time (e.g., $t_2$). For example, if the mobile receiver 20 has not moved by more than a maximum of range of zero to approximately thirty kilometers from the first measurement time to the second measurement time, the double-difference equations used by the real-time kinematic filter 48 can provide accurate results. In alternate embodiments, if the mobile receiver 20 has not moved by more than a maximum of range of zero to approximately fifty kilometers from the first measurement time to the second measurement time, the real-time kinematic filter 48 can provide acceptable or adequate results. Accordingly, the relative positioning module 18 or real-time kinematic filter 48 may verify that the mobile receiver 20 has not moved by more than a range of zero to approximately thirty kilometers between the first measurement time and the second measurement time prior to applying the real-time kinematic (RTK) filter 48 to resolve ambiguities associated with double-difference carrier phase measurements.

The rover 20 is coupled to or in communication with a correction wireless device 26 that receives correction data 108 from the correction data source (21, 121) via the transmitted wireless correction signal.

As illustrated in FIG. 1A and FIG. 1B, the mobile receiver 20 attains a converged state with final precise accuracy after resolving ambiguities associated with the carrier phase signals based on the received correction data 108 in accordance with a precise point position algorithm or a precise positioning module 16.

In an alternate embodiment, the mobile receiver 20 attains a converged state with final precise accuracy at a first measurement time (e.g., $t_1$) after resolving ambiguities associated with the carrier phase signals based on the received correction data 108 in accordance with a real-time kinematic (RTK) positioning algorithm or other differential correction algorithm.

Generally, the resolved ambiguities comprise the pulled-in wide-lane and narrow-lane ambiguities from one or more GNSS satellites' carrier signals the absolute tropospheric delay at zenith direction including a priori model and residual tropospheric delay estimates. The pulled-in ambiguities are associated with position estimates that achieve steady-state accuracy approaching a peak precise accuracy, such as position estimates (e.g., less than five centimeters horizontal or pass-to-pass position accuracy) within acceptable standard deviation metrics (e.g., within one standard deviation) for a target percentage time reliability or availability (e.g., approximately 95 percent reliability).

At the mobile receiver 20 or rover, the relative positioning module 18 or the real-time kinematic filter 48 retrieves or reads the backup data after the temporary signal interruption or after the reception of one or more received satellite signals is restored; the relative positioning module 18 applies a real-time kinematic (RTK) algorithm to provide relative position vector between reference receiver 130 between the first measurement time and the second measurement time and recovery data. For example, the relative positioning module 18 uses double-difference of phase measurements between the reference receiver 130 and the rover 20 and two satellites to resolve double-difference RTK ambiguities, or related data. At the rover 20, the precise positioning module 16 applies the relative position vector, the correction data 108 as inputs, constraints, or both for convergence of one or more predictive filters (738, 40, 745) on wide-lane and narrow-lane ambiguities (e.g., in accordance with a precise positioning algorithm). At the rover 20, the precise positioning module 16 or the navigation positioning estimator 50 estimates a precise position of the rover 20 based on or derived from carrier phase measurements, code phase measurements, and correction data to achieve the converged or fixed narrow-lane ambiguities and wide-lane ambiguities.

Figure 2:
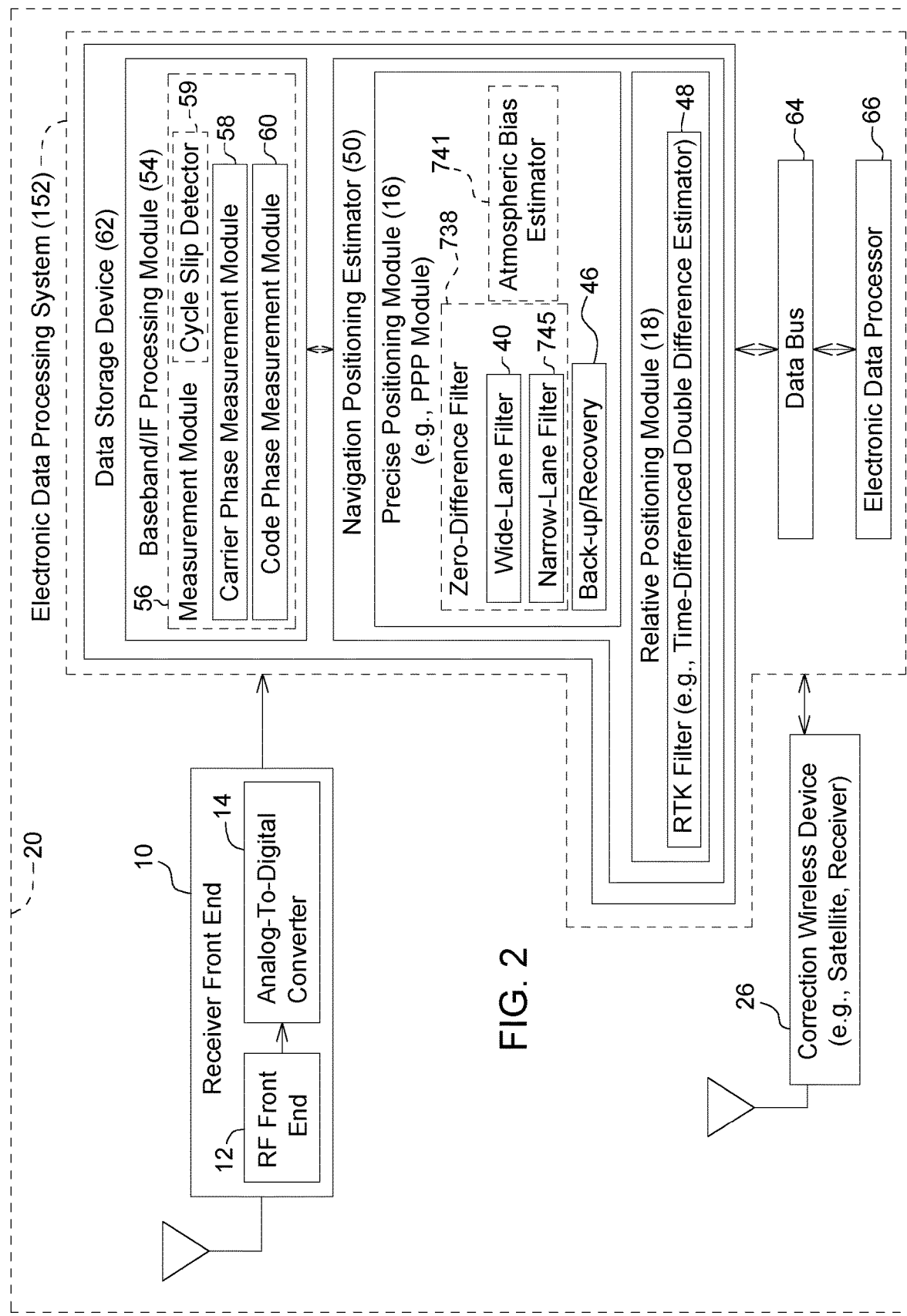
FIG. 2 is a block diagram of an illustrative example of satellite receiver (e.g., rover or mobile satellite receiver) shown in greater detail than FIG. 1A or FIG. 1B.

FIG. 2 is a block diagram of an illustrative example of satellite receiver shown in greater detail than FIG. 1A or FIG. 1B. The position determining receiver of FIG. 2 may be used as a reference receiver 130, a rover 20 or both.

In one embodiment, the mobile receiver 20 comprises a receiver front end 10 coupled to an electronic data processing system 152. The receiver front end 10 comprises an antenna, a radio frequency (RF) front end 12, and an analog-to-digital (A/D) converter 14. The RF front end 12 may include one or more of the following: an radio frequency amplifier or microwave amplifier, a filter (e.g., bandpass filter), and a downconverter for down-converting the received satellite signal to an intermediate frequency signal or a baseband signal.

The electronic data processing system 152 includes that portion of the receiver that processes data after the analog-to-digital conversion by the analog-to-digital converter 14. For example, the electronic data processing system 152 can comprise an electronic data processor 66, a data storage device 62 (e.g., electronic memory) and a data bus 64 for communication between the electronic data processor 66 and the data storage device 62, where software instructions and data are stored in the data storage device 62 and executed by the data processor 66 to implement any of the blocks, components or modules (e.g., electronic modules, software modules, or both) illustrated in FIG. 2. The mobile receiver 20 may comprise a location-determining receiver for: (a) determining a location or precise position (e.g. three-dimensional coordinates) of a receiver antenna, (b) a range-determining receiver for determining a range or distance between the receiver antenna and a satellite (e.g., satellite antenna) or (c) determining ranges between the receiver antenna and one or more satellites, or (d) determining position, velocity, acceleration, or attitude (e.g., yaw, pitch, roll) of the mobile receiver 20 or its antenna.

The analog-to-digital converter 14 converts the analog intermediate frequency signal or analog baseband signal to a digital signal. The digital signal comprises one or more digital samples that are available at a sampling rate. Each sample has a finite quantization level and each sample is capable of being processed by an electronic data processing system 152.

In one embodiment, the data storage device 62 stores the following modules or components: baseband/intermediate frequency processing module 54, measurement module 56, and navigation positioning estimator 50.

The baseband/intermediate frequency(IF) processing module 54 or measurement module 56 processes the digital signals. The measurement module 56 or a carrier phase measurement module 58 measures or detects the carrier phase of the received satellite signals from a set of GNSS satellites with view or reception range. For example, the measurement module 56 measures the carrier phase of the received signal by correlating the received digital signal to a locally generated reference signal. However, the measurement module 56 or carrier phase measurement module 58 measures the carrier phase of the satellite signals subject to an ambiguity or integer ambiguity in the number of cycles in any path between the receiver antenna and the satellite. The measurement module 56 or the code phase measurement module 60 measures the code phase or pseudo-range of the received satellite signals.

In one configuration, the measurement module 56 further comprises an optional cycle slip detector 59 that detects a cycle slip or loss of continuity in the tracking of the carrier phase of the received carrier signal from one or more satellites. For each satellite signal where a cycle slip is detected (e.g., by detector 59) and the received satellite signal is reacquired within a maximum time period, the rapid recovery process of this disclosure can be used to recover the ambiguity or rapidly converge on the new ambiguity, rather than restarting the ambiguity resolution process from scratch for that satellite signal and ignoring the received satellite signal until floating ambiguity or fixed integer ambiguity is reached. The optional nature of the cycle slip module 59 are indicated by its dashed lines.

The baseband/intermediate frequency processing module 54 is coupled to, or in communication with, the navigation positioning estimator 50. In one embodiment, the navigation positioning estimator 50 comprises a precise positioning module 16 (e.g., precise point positioning (PPP) module) and a relative positioning module 18.

In certain embodiments, the precise positioning module 16 represents a PPP estimator. The precise positioning module 16 can execute a precise point positioning algorithm to estimate a precise position of the receiver or its antenna based on received correction data 108 via the correction wireless device 26. In general, in one embodiment the precise positioning module 16 comprises a predictive filter, such as a Kalman filter or modified Kalman filter.

In one embodiment, the precise positioning module 16 may comprise an optional zero-difference filter 738, a wide-lane filter 40, a narrow-lane filter 745, a backup/recovery module 46, and an optional atmospheric bias estimator 741. The zero-difference filter 738 and the atmospheric bias estimator 741 are indicated as optional by the dashed lines in FIG. 2. Although the zero-difference filter 738 may comprise a wide-lane filter 40 and a narrow-lane filter 745 as illustrated, the precise positioning module 16 can realize one or more single-difference filters or double-difference filters for the wide-lane ambiguity resolution, narrow-lane ambiguity resolution, or resolution of ionosphere-free ambiguities.

In one embodiment, the precise positioning module 16 comprises a precise point positioning module that operates in accordance with a precise point positioning algorithm. For illustrative purposes, the following equations can be used to implement one possible embodiment as follows:

The observation model that has been widely used for PPP is based on ionosphere-free code and carrier phase observations that eliminate the first order of ionosphere error as shown in equations (A1-A4). The observations, such as carrier phase and code phase measurements, received from all the satellites are processed together in one or more predictive filters (e.g., Kalman filters, or the combination of a wide-lane filter 40 and a narrow-lane filter 745) that solves for the different unknowns, namely the receiver coordinates, the receiver clock, the zenith tropospheric delay and the phase floating ambiguities. The accuracy of the satellite clocks and orbits is one of the most important factors affecting the quality of the PPP solution. In order to achieve its full potential to applications, PPP faces two major challenges including a long initialization time and robust and reliable integer ambiguity resolution to derive a more precise solution.

In one embodiment, the wide-lane filter 40, which can be applied to PPP determination, uses the following equations described below. Given the code and phase measurements from two frequencies, such as L1 and L2 for GPS, G1 and G2 for GLONASS, the Melbourne-Wübbena linear combination $L_{WL}^j$ can be formed as shown below.

$$L_{WL}^j = \left(\frac{f_1}{f_1 + f_2}P_1^j + \frac{f_2}{f_1 + f_2}P_2^j\right) - \left(\frac{f_1}{f_1 - f_2}L_1^j - \frac{f_2}{f_1 - f_2}L_2^j\right) \quad (A7)$$

where:
$f_1$ is the L1 carrier frequency and $f_2$ is the L2 carrier frequency of the received satellite signals;
$P_i^j$ and $L_i^j$ are pseudo-range and carrier phase measurements (e.g., in meters), respectively, for a given frequency i (e.g., 1, 2, . . . , such as L1 or L2) and satellite j.

In general, to form the Melbourne-Wübbena linear combination for wide-lane ambiguity resolution, the equation A7 herein can be applied to one or more GNSS systems by substituting L1 and L2 code phase measurements with the corresponding code measurements and phase measurements from two frequencies for corresponding reference receivers 130 as follows: (a) L1 and L2 carrier signals apply to GPS/QZSS to form the GPS/QZSS Melbourne-Wübbena linear combination; (b) G1 and G2 carrier signals apply to GLONASS to form the GLONASS Melbourne-Wübbena linear combination; (c) B1C and B2A carrier signals apply to Beidou phase III to form the Beidou Melbourne-Wübbena linear combination; (d) E1 and E5 carrier signals apply to Galileo to form the Galileo Melbourne-Wübbena linear combination.

By expanding the above equation (A7) using equations (A1)-(A4), it can be shown that the geometric range related terms, which include range, receiver and satellite clock, ionosphere and troposphere errors and the phase wind-up term, are cancelled. It can be expressed in equation (A8) as $$L_{WL}^j = N_{WL}^j \lambda_{WL} + b_{WL} + B_{WL}^j + \text{IFB}^j + \varepsilon_{WL}^j \quad (A8)$$

where:
$L_{WL}^j$ are wide-lane carrier phase measurements (e.g., in meters for L1 and L2 frequencies) and satellite j;
$\lambda_{WL}$ is wide-lane wavelength, about 86.4 cm for GPS and c is speed of light;

$$\lambda_{WL} = \frac{c}{f_1 - f_2}; \quad (A9)$$

$N_{WL}^j$ is integer wide-lane ambiguity for satellite j;

$$N_{WL}^j = N_1^j - N_2^j; \quad (A6)$$

where $b_{WL}$ is wide-lane receiver bias (one per receiver and constellation for all visible satellites), which is a combination of L1 and L2 receiver code bias and phase bias, as indicated in equation (A11):

$$b_{WL} = \left(\frac{f_1}{f_1 + f_2}b_{P_1} + \frac{f_2}{f_1 + f_2}b_{P_1}\right) - \left(\frac{f_1}{f_1 - f_2}b_{L_1} - \frac{f_2}{f_1 - f_2}b_{L_2}\right), \quad (A11)$$

where majority of GLONASS inter-frequency bias $b_{P_1}$ and GLONASS inter-frequency bias $b_{P_2}$ in code measurement is usually assumed to be linear or a trigonometric function of the GLONASS satellite frequency number; it is not the same for all the visible satellite as with the case of CDMA signals such as GPS;
where $\text{IFB}^j$ is the inter-frequency bias for satellite j, such as for a GLONASS satellite;

where $B_{WL}{}^j$ is wide-lane satellite j bias (one per satellite)), which is a wide-lane combination of L1 and L2 satellite code bias and satellite phase bias; and where $\varepsilon_{WL}{}^j$ is the wide lane measurement error for satellite j including white noise, multipath and remaining unmodeled errors.

In one embodiment, the satellite wide-lane bias and receiver wide-lane biases tend to vary over time and are generally not constant over time (e.g., over extended periods or many successive epochs).

$IFB^j$ is wide-lane inter-frequency bias, which applies to a frequency division multiple access (FDMA) signal, such as GLONASS GNSS. $IFB^j$ does not apply to spread spectrum or Code Division Multiple Access (CDMA) GNSS systems, such as GPS/QZSS/Beidou and Galileo. $\lambda_{WL}$ is wide-lane wavelength, which is about 86 cm for GPS and QZSS, about 84 cm for GLONASS, 78 cm for GALILEO and 75 cm for BEIDOU.

With respect to the inter-frequency bias per satellite, the linear model can be approximated below for GLONASS constellation as equation (A12):

$$IFB^j \approx k \cdot n^j \quad (A12)$$

where k is the IFB coefficient (e.g., GLONASS wide-lane IFG linear frequency coefficient) for receiver code bias. The above IFB varies from receiver to receiver, also varies from one site of reference receiver 130 (e.g., antenna and cabling set up) to another site of reference receiver 130. Modelled in this way, typically k is less than 0.1. For the FDMA GLONASS constellation, the wide-lane IFB coefficient needs be estimated for each receiver (e.g., each reference receiver 130).

The wide-lane satellite j bias, $B_{WL}{}^j$, (one per satellite) is a combination of L1 and L2 satellite code bias and satellite phase bias as in equation (A13); the satellite bias is changing slowly overtime; both satellite and receiver wide-lane biases are not constant over time:

$$B_{WL}^j = -\left(\frac{f_1}{f_1+f_2}B_{P_1}^j + \frac{f_2}{f_1+f_2}B_{P_2}^j\right) + \left(\frac{f_1}{f_1-f_2}B_{L_1}^j - \frac{f_2}{f_1-f_2}B_{L_2}^j\right) \quad (A13)$$

where $B_{P_1}{}^j$ is satellite bias for satellite j of the code phase or pseudo-range signal encoded on frequency L1 ($f_1$); where $B_{P_2}{}^j$ is satellite bias for satellite j of the code phase or pseudo-range on frequency L2 ($f_2$); where $B_{L_1}{}^j$ is satellite bias for satellite j of the carrier phase on frequency L1; and where $B_{L_2}{}^j$ is satellite bias for satellite j of the carrier code on frequency L2.

Figure 4:
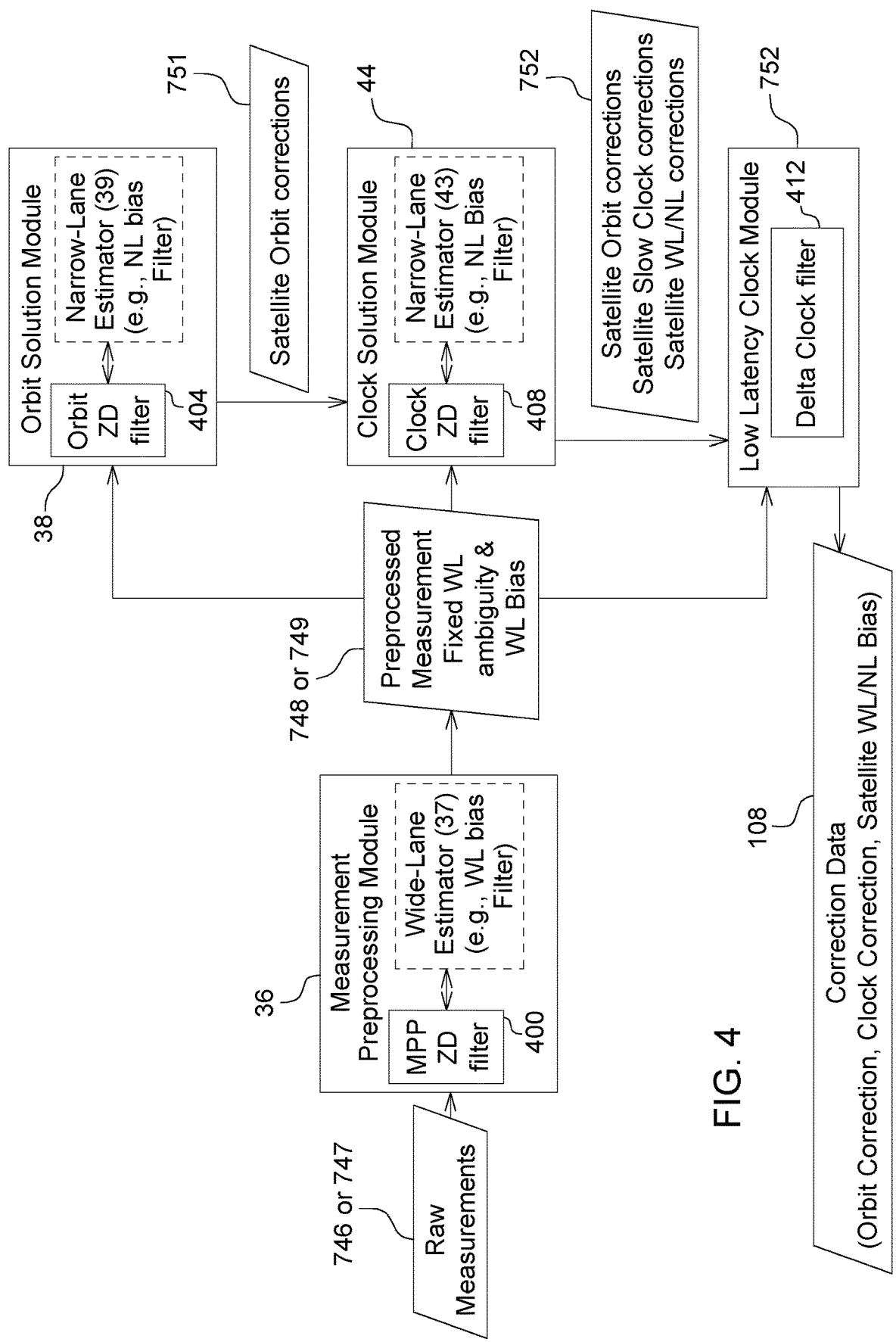
FIG. 4 shows an illustrative example of the correction data estimator of FIG. 3 in greater detail.

An optional zero difference filter can be used to determine undifferenced or zero-differenced (ZD) ambiguity states or float ambiguity states associated with the carrier phase measurements of the received satellite signals. The zero difference filter 738 is illustrated in dashed lines in FIG. 2 to show that the zero difference filter 738 is optional and may be included within the wide-lane filter 40 in alternate embodiments. For example, the zero-differenced ambiguity state can be determined based on correction data 108 that contains satellite bias information from a network or group of reference receivers 20. Although the measurement pre-processing module 36 of FIG. 4 illustrates a MPP (measurement preprocessing) ZD (zero-difference) filter 400, in practice each GNSS constellation (e.g., GPS, GLONASS, GALILEO and BEIDOU) has its separate wide-lane zero difference filter. Because the QZSS system (managed by Japan) is a GPS system augmentation, the QZSS satellite can be processed together with GPS system in wide-lane filter.

The data processing center 118 comprises a correction data estimator 134 or other software to provide correction data 108 (e.g., global differential corrections), where wide-lane and narrow-lane ambiguities are resolved across the reference data network 132 of reference receivers 130. In one embodiment, the correction data estimator 134 further comprises an Ambiguity Resolution Engine (ARE) in which the wide-lane ambiguity is resolved first, followed by narrow-lane ambiguity resolution.

The wide-lane filter 40 uses zero-differenced (ZD) Melbourne-Wübbena linear combination $L_{WL}{}^j$ in Eq. (7) as the input measurement to estimate one wide-lane floating ambiguity state $N_{WL}{}^j$ per visible satellite. The wide-lane satellite bias $B_{WL}{}^j$ can be broadcast in real-time within correction data 108 or correction signals to mobile receivers and will compensate for that term using equation (A8).

The precise positioning module 16 or wide-lane filter 40 lumps the receiver wide lane bias $b_{WL}$ into float WL ambiguity state $N_{WL}{}^j$. Accordingly, the ZD WL ambiguity does not hold an integer characteristic because all of the ZD WL ambiguities include the common receiver wide lane bias. However, the single differenced (SD) wide-lane ambiguities between satellites within each constellation (e.g., GPS constellation) at a mobile receiver or reference receiver are still integers and can be resolved in accordance with SD equations. Further, DD narrow-lane ambiguities, the DD wide-lane ambiguities, or the DD L1/L2 ambiguities between measurement times (or between epochs) within each constellation are still integers and can be resolved in accordance with double difference equations formed by subtraction of two SD observations with the benefit of receiver bias cancellation. For the GLONASS constellation, the additional inter-frequency bias (IFB) state may be required in order to preserve the integer nature of the SD ambiguities.

Given that the actual ZD float ambiguity state variable is the sum of ZD integer ambiguity and receiver bias, as explained above, the dynamic update for the receiver bias variance needs to be included in the process noise model for the ZD ambiguity states as shown below in equation A 14 (e.g., for one or more GNSS constellations) as follows:

$$Q_{WL}(t) = Q_{WL}(t-1) + \begin{pmatrix} 1 & \cdots & 1 \\ \vdots & \ddots & \vdots \\ 1 & \cdots & 1 \end{pmatrix} q_{b_{WL}} \cdot \Delta t \quad (A7)$$

where $Q_{WL}$ is the time-varying receiver bias variance for the wide-lane ambiguities, $q_{b_{WL}}$ is the process noise associated with a matrix of ones or all-ones matrix, and $\Delta t$ is the time interval between time t−1 and t.

Equation (A8) will be used for wide-lane filter 40. The zero differencing wide-lane raw observation is used for the measurement update in the wide-lane filter 40. The state variables include one float wide ambiguity per visible satellite, each conceptually including the wide-lane integer ambiguity and common receiver phase bias for the respective constellation.

In the navigation positioning estimator 50 of the mobile receiver 20, the wide-lane filter 40 will begin processing even before the satellite wide-lane (WL) bias correction from the correction data 108 is received or even if the satellite WL bias correction is invalid. The float wide-lane (WL) ambiguity is reduced by the satellite wide-lane bias correction when the satellite WL bias correction becomes valid (e.g., makes a transition to valid from invalid states). Likewise, the satellite WL bias is removed from the float wide-lane ambiguity (and the satellite WL bias is increased) when the satellite wide-lane bias becomes invalid (e.g., makes a transition from valid to invalid states).

In one embodiment, in the navigation positioning estimator 50 or the wide lane filter 40, the float ambiguity will be adjusted whenever +/−2 cycle jumps of the satellite wide-lane (WL) bias are detected, which indicates a transition between valid and invalid states. The above adjustment of the satellite wide-lane bias is limited to deviations of +/−2 cycles deviations to reduce the bandwidth or resources required for data processing. As described above, the between-satellite single differencing ambiguity resolution for each constellation can be conducted, which is the equivalent of double-differencing ambiguity resolution. The satellites without a valid satellite wide-lane bias will be skipped by the ambiguity resolution process, and the covariance matrix term may be inflated by a term representing small variance such as $1^{e-4}$ cycles-squared once the corresponding ambiguity has been fixed.

As previously suggested, the wide-lane filter 40 may comprise a zero-difference (ZD) wide-lane filter, a single-difference (SD) wide-lane filter, or a double-difference (DD) wide-lane filter, or all of the foregoing filters to determine ZD WL ambiguities, SD WL ambiguities, and/or DD WL ambiguities. The single-difference wide-lane ambiguity and variance co-variance matrix for each constellation is derived from the wide-lane filter 40, such as a zero differenced wide-lane float ambiguity Kalman filter.

In one embodiment, a LAMBDA (Least-squares AMBiguity Decorrelation Adjustment) or a modified LAMBDA procedure is performed to resolve the WL ambiguities. For instance, the error minimization of the least-squares equation for decorrelated ambiguities is carried out over a search region determined by variance and covariance matrix of the ambiguities; floating ambiguity estimates and associated variance co-variance matrices can be used as inputs to the LAMBDA process, where the output is integer ambiguity estimates.

After passing the ambiguity resolution validation (e.g., consistent with the LAMBDA or modified LAMBDA process or an evaluation of the standard deviation of the resolved ambiguity candidates is less than a threshold fractional number of cycles over a minimum number of consecutive epochs), an integer constraint representing the single differencing of the float wide-lane ambiguities can be applied into the float ambiguity filter based on equation (A8). The fixed single differencing wide-lane ambiguities will be used for ambiguity fixing for the reference receiver 130 and the correction generation of the reference receiver 130 (e.g., virtual base station) to be used in the correction data 108 (e.g., distributed to any mobile receivers).

In one embodiment, the above WL filter 40 uses the WL equations to speed up convergence on the resolution of the WL ambiguities and to provide constraints or inputs for the narrow-lane filter 745 and narrow-lane ambiguity resolution, which can provide greater potential accuracy in position estimates because the WL carrier phase measurements are associated with more phase noise than the NL carrier phase measurements.

In one embodiment, the narrow-lane filter 745 can use the following equations described below. The refraction corrected (RC) measurement is formed with the advantage eliminating the first order of ionosphere delay error. The RC code measurements using equation (A1-A2) are formed in equation (A15) as below, which is in meter-level accuracy but unbiased.

$$P_{RC}^j = \qquad (A8)$$
$$\frac{f_1^2}{f_1^2 - f_2^2} P_1^j - \frac{f_2^2}{f_1^2 - f_2^2} P_2^j = \rho^j + \tau_r + b_{RC} + \tau^j + B_{RC}^j + T + \varepsilon_{P_{RC}}^j$$

where:
$b_{RC}$ is the receiver refraction-corrected code bias (one per receiver and constellation for all visible CDMA satellites, such as GPS satellites) which is a refraction-corrected (RC) combination of the L1 receiver code bias and the L2 receiver code bias;
$B_{RC}^j$ is the satellite code bias which is a refraction-corrected (RC) combination of the L1 satellite code bias and the L2 satellite code bias;
$\varepsilon_{P_{RC}}^j$ the refraction-corrected (RC) code measurement error for satellite j including white noise, multipath and remaining un-modeled errors; and
the other variables or parameters have the same meaning as set forth earlier in this document.

In equation A15, the receiver refraction-corrected code bias $b_{RC}$ can be lumped into the receiver clock state and can be estimated together as receiver clock nuisance parameters. For GLONASS satellites, an additional inter-channel code bias may be required to be estimated if the magnitude of the inter-channel code bias is significant. $B_{RC}^j$ can be lumped into the satellite clock (e.g., or satellite correction $\tau^j$ when they are estimated together in satellite clock determination by the PPP network). Accordingly, for simplicity, the bias $b_{RC}$ and $B_{RC}^j$ in equation (A15) can be ignored and shown in equation (A16), $$P_{RC}^j = \frac{f_1^2}{f_1^2 - f_2^2} P_1^j - \frac{f_2^2}{f_1^2 - f_2^2} P_2^j = \rho^j + \tau_r + \tau^j + T + \varepsilon_{P_{RC}}^j \qquad (A16)$$

where:
$P_{RC}^j$ is the refraction-corrected phase code (or pseudo-range) for satellite j;
$P_1^j$ is the measured phase code or measured pseudo-range on the L1 frequency for satellite j;
$P_2^j$ is the measured phase code or measured pseudo-range on the L2 frequency for satellite j;
$\varepsilon_{P_{RC}}^j$ is the RC phase code measurement error for satellite j including white noise, multipath and remaining un-modeled errors; and
the other variables, such as geometric difference $\rho^j$, receiver r clock bias $\tau_r$, satellite clock error $\tau^j$, and tropospheric delay T, are defined below in conjunction with equation A17.

The refraction-corrected (RC) carrier phase measurement, $L_{RC}^j$ for satellite j, using equations (A3-A4) is also formed in equation (A17) as below, which is in centimeter-level accurate but biased by an ambiguity term $\hat{N}_{NL}^j \lambda_{NL}$.

$$L_{RC}^j = \frac{f_1^2}{f_1^2 - f_2^2} L_1^j - \frac{f_2^2}{f_1^2 - f_2^2} L_2^j = \qquad (A9)$$
$$\rho^j + \tau_r + b_{NL} + \tau^j + B_{NL}^j + T + (N_{RC}^j + W^j + w)\lambda_{NL} + \varepsilon_{L_{RC}}^j$$

where:
- $f_1$ is the L1 carrier frequency and $f_2$ is the L2 carrier frequency of the received satellite signals;
- $L_1^j$ is the measured carrier phase for the L1 carrier frequency transmitted from satellite j;
- $L_2^j$ is the measured carrier phase for the L2 carrier frequency transmitted from satellite j;
- $\rho^j$ is the geometric distance between the satellite j phase center and the receiver phase center including satellite orbital correction, receiver tide displacement and earth rotation correction;
- $\tau_r$ is the receiver r clock bias or error for a given GNSS system, where one receiver clock bias is estimated for each GNSS system such as GPS, GLONASS, Galileo or Beidou constellation;
- $\tau^j$ is the satellite clock error;
- $b_{NL}$ is the receiver narrow-lane phase bias (one per receiver and constellation for all visible satellites),
- $B_{NL}^j$ is the satellite j narrow lane phase bias (one per satellite for all receivers), which is a RC combination of the L1 satellite phase bias and the L2 satellite phase bias;
- T is the tropospheric delay, and is divided into a dry component $T_{dry}$ and a wet component $T_{wet}$;
- $W^j$ and W are phase windup errors for both satellite j and receiver, in cycles, respectively, which can be corrected with models;
- $N_{RC}^j$ is the refraction-corrected (RC) carrier phase ambiguity term;

$$\lambda_{NL} = \frac{c}{f_1 + f_2}$$

is the narrow lane wavelength;
and
- $\varepsilon_{L_{RC}}^j$ is the RC phase measurement error for satellite j including white noise, multipath and remaining unmodeled errors.

The narrow-lane wavelength ($\lambda_{NL}$) is about 10.7 cm for GPS/QZSS, 10.5 cm for GLONASS, 10.8 cm for GALILEO and 10.8 cm for BEIDOU, where the narrow-lane wavelength is less than their WL wavelength ($\lambda_{WL}$).

In equation A17, receiver narrow-lane phase bias, $b_{NL}$, is a RC combination of the L1 receiver phase bias and the L2 receiver phase bias. If the receiver narrow-lane phase bias, $b_{NL}$, is lumped into the floating ambiguity state, the $b_{NL}$ in equation (A17) can be ignored. However, this model implies that an individual ambiguity does not have an integer characteristic. Similar to the case of WL, single-differenced narrow-lane ambiguities between satellite still hold the integer property.

Both satellite and receiver narrow-lane biases (e.g., refraction-corrected narrow-lane biases) are not constant over time. The satellite j narrow lane bias also represents the fractional part of the difference of code-based clock and integer phase-based clock. If the satellite code bias, $B_{RC}^j$, of satellite j, is combined into the satellite clock or the satellite clock correction, the satellite narrow-lane code bias, $B_{NL}^j$, of satellite j in equation (A17) can be expressed a difference of the satellite narrow-lane code bias and satellite code bias, such as $B_{NL}^j - B_{RC}^j$.

$N_{RC}^j$ is the RC carrier phase ambiguity term in equation (A18), as below:

$$N_{RC}^j \lambda_{NL} = \frac{f_1^2}{f_1^2 - f_2^2} N_1^j \lambda_1 - \frac{f_2^2}{f_1^2 - f_2^2} N_2^j \lambda_2 \quad (A18)$$

$$= \frac{N_{NL}^j}{2} \lambda_{WL} + \frac{N_{WL}^j}{2} \lambda_{NL}$$

$$= \lambda_{NL} \left( N_1^j + \frac{f_2}{f_1 - f_2} N_{WL}^j \right)$$

$$= \lambda_{NL} \left( N_2^j + \frac{f_1}{f_1 - f_2} N_{WL}^j \right)$$

The RC carrier phase ambiguity term $N_{RC}^j \lambda_{NL}$ can be further divided into two integer ambiguity terms. There are three equivalent combination forms, as shown in equation (A18), which can be determined with reference to a GNSS receiver (e.g., reference receiver 130):

(1) Combination of integer WL ambiguity $N_{WL}^j$, in equation (A10), and integer NL ambiguity $N_{NL}^j$, where the integer NL ambiguity can be expressed as follows: $N_{NL}^j = N_1^j + N_2^j$;

(2) Combination of integer WL ambiguity $N_{WL}^j$ and integer L1 carrier phase ambiguity $N_1^j$ for satellite j; and (3) Combination of integer WL ambiguity $N_{WL}^j$ and integer L2 carrier phase ambiguity $N_2^j$ for satellite j.

Both the WL integer ambiguity and the NL ambiguity integer, $N_{WL}^j$ and $N_{NL}^j$, respectively can be resolved to improve position accuracy and reduce pull-in time. Further, the L1 carrier phase ambiguity integer $N_1^j$ or L2 carrier phase ambiguity integer $N_2^j$ may be used in conjunction with any of the above combinations or expressions set forth with equation A18. For example, both the WL ambiguity integer $N_{r,WL}^s$ and L2 carrier phase ambiguity integer $N_{r,L_2}^s$ need be resolved, in order to remove the bias term from the refraction-corrected, carrier phase measurement. As long as the bias terms are removed from the refraction-corrected (RC) phase measurements, the high accuracy carrier phase measurement can be used to provide cm-level positioning.

The narrow lane wavelength is much shorter than WL wavelength. In the case of GPS, the narrow lane wavelength is about 10.7 cm while WL wavelength is 86.4 cm. Therefore, in comparison with $N_{NL}^j$ the GPS WL ambiguity integer $N_{WL}^j$ can be resolved relatively easier. In order to recover the integer property of the RC carrier phase ambiguity term $N_{RC}^j$, the WL ambiguity integer $N_{WL}^j$ generally is resolved first because it is considered easier to resolve.

In the case WL ambiguity integer $N_{r,WL}^s$ is resolved; equation (B19) can be derived from equation A18 as follows:

$$\Phi_{r,RC}^s \lambda_{NL} - \frac{f_{L_1}}{f_{L_1} - f_{L_2}} N_{r,WL}^s \lambda_{NL} = \quad (B19)$$

$$D_r^s + \delta_{pwu} \lambda_{NL} + N_{r,L_2}^s \lambda_{NL} + b_{r,NL} - b_{NL}^s + \varepsilon_{\psi_{r,NL}^s}$$

For simplicity, NL will be referred as narrow lane. Because the RC measurements are formed to resolve NL ambiguity, the term NL may implicitly include refraction-corrected (RC) NL or the term NL may be synonymous with RC NL. Because the L2 carrier phase ambiguity $N_{r,L_2}^s$ cycle is in the unit of NL wavelength, the L2 ambiguity $N_{r,L_2}^s$ may be referred to as NL ambiguity.

$\Phi_r^s$ is carrier phase measurement from satellite s to receiver r;

$N_{r,WL}^s$ is the wide-lane integer ambiguity for satellite s to receiver r;

$f_{L1}$ is the GNSS L1 carrier signal frequency;

$f_{L2}$ is the GNSS L1 carrier signal frequency;

$\delta_{pwu}$ is the phase wind up due to relative changing orientation between satellite and receiver antennas as a carrier phase observable;

$\lambda_{NL}$ is the GNSS narrow-lane wavelength;

$D_r^s$ represents the common terms for a given frequency;

$b_{r,NL}$ is receiver r narrow-lane lane phase bias (one per receiver and constellation for all visible satellites), which is a RC combination of L1 receiver phase bias and L2 receiver phase bias;

$b_{NL}^s$ is satellite s narrow lane phase bias (one per satellite for all receivers), which is a RC combination of L1 satellite phase bias and L2 satellite phase bias; and $\varepsilon_{\Phi_{r,NL}}^s$ is the narrow-lane phase error from satellite s to receiver r.

Both satellite and receiver narrow lane biases are not constant over time.

In one embodiment, equations (A16-A17) can be used for the narrow-lane filter 745. The zero differencing refraction-corrected code and phase raw observations are used for the narrow-lane filter 745 measurement update. Accordingly, in the backup data the stored narrow-lane ambiguities or stored refraction-corrected ambiguities can be used to derive the narrow-lane ambiguities. The state variables include receiver position and velocity, receiver clock offsets, residual troposphere delay and floating refraction-corrected ambiguities (which implicitly combine integer wide-lane and narrow-lane ambiguities in equation (A18) along with receiver phase bias). For GLONASS satellites, the additional inter-channel code bias per satellite may be required to be estimated if the magnitude of inter-channel code bias is significant.

The refraction-corrected phase measurements may compensate for first order ionospheric delay, or residual tropospheric delay that is not included in modeled tropospheric delay, T, or both. In one embodiment, the troposphere zenith delay and/or horizontal gradient coefficients can be estimated after an a priori troposphere model is applied. It should be noted that the receiver clock term for this method can absorb the receiver code bias. The satellite orbit, clock and satellite narrow lane bias corrections received from correction data 108 will be applied and remaining errors are reduced to sub-centimeter level.

In an illustrative configuration, the narrow-lane filter 745 can begin processing even before the satellite narrow-lane bias corrections are received or if they are invalid. The float narrow-lane ambiguity is adjusted by the satellite narrow-lane bias when it changes state to a valid state from an invalid state. Likewise, the satellite narrow-lane bias is adjusted or removed from the float narrow-lane ambiguity when the narrow-lane bias changes state to an invalid state from a valid state. In one embodiment, the float ambiguity is adjusted whenever +/−2 cycle jumps of satellite narrow-lane bias are detected. The adjustment of the satellite narrow-lane bias is limited to +/−2 cycles to reduce the bandwidth or resources for data processing.

In one embodiment, a Best Integer Equivariant (BIE) or a modified Best Integer Equivariant algorithm can be used to take advantage of the integer nature of the ambiguities to speed up the pull-in time and improve the overall positioning accuracy.

The observation model based on equations (A16-A17) allows the estimation of the position coordinate, receiver clock offset, and floating ambiguities (each combining an integer narrow lane ambiguity with the receiver phase bias). The troposphere delay can be modeled or estimated along with other parameters. It should be noted that receiver clock term for this method can absorb the receiver code bias. The satellite orbit, clock and satellite narrow lane bias correction can be obtained from the correction data 108 are applied and the remaining errors are reduced to sub-centimeter level.

In a summary, the ambiguities can be resolved in two steps:

(1) The first step is wide-lane ambiguity resolution using the equation (8). For example, details of wide-lane ambiguity resolution are discussed in conjunction with the wide-lane filter 40 in this document.

(2) The second step is the narrow-lane ambiguity resolution. For example, details of the narrow-lane ambiguity resolution are discussed in conjunction with the narrow-lane filter 745 in this document. The narrow-lane ambiguities are computed efficiently (e.g., on a constrained basis) by inserting the resolved integer wide-lane ambiguities into equation (A18). This narrow lane ambiguity can be the integer ambiguity value associated with either the L1 or the L2 frequency, or the narrow lane combination of both the L1 and L2 frequencies. The effective narrow lane ambiguity wavelength is about 10.7 cm, which is independent of which of the narrow lane ambiguities is resolved. This narrow lane wavelength is easily computed for either the L1 or the L2 ambiguity using equation (A18). If the narrow lane combination of both the L1 and L2 frequencies is used, the combined narrow-lane ambiguity wavelength is only one-half of the wavelength of an individual frequency narrow lane ambiguity. However, since the combined narrow-lane ambiguity must have the same odd-even integer characteristic as the wide lane ambiguity, the same effective wavelength (10.7 cm) results for the combined narrow-lane ambiguity and the individual narrow-lane ambiguity because of the odd-even constraint.

In one embodiment, the reference receiver 130 that resolves wide-lane ambiguities and narrow-lane ambiguities to arrive at a refraction-corrected narrow-lane ambiguity solution and associated precise position estimate can be used to form or generate correction data 108 for use by one or more rovers or mobile receivers 20 in a network. At a reference receiver 130 after the narrow-lane filter 745 converges (for example, the position error is less than 10 cm) from reference receiver 130, raw measurement corrections can be generated based on the equation (1-4). In an illustrative configuration, the correction data 108 can comprise one or more of the following: the converged position estimate of the reference receiver 130, residual troposphere delay, refraction-corrected ambiguities from equation (A17), fixed wide-lane ambiguities and covariance, along with raw measurement corrections. This correction data 108 can be broadcast via wireless communications devices and/or a wireless communications system 235 or wireless communications network for other receivers nearby.

The reference station and the mobile station apply correction data 108 to the carrier phase measurements, the code phase measurements, or both. The correction data 108 contains corrections for one or more of the following: satellite orbit corrections, clock corrections, tide corrections (e.g., solid Earth tide, ocean tide and polar tide), both receiver and satellite antenna phase center variation and offset, and both receiver and satellite phase wind-up.

In one embodiment, the estimated parameters, such as receiver position, GNSS receiver clocks and troposphere delay are required to be corrected. The code biases for both satellite and receiver in Eq. (A1-A2), the phase biases in Eq. (A3-A4) for both satellite and receiver and ionosphere delay are uncorrected. The integer ambiguities and receiver phase bias for the carrier phase measurements remain in the phase corrections. The converged position, residual troposphere delay, refraction-corrected ambiguities in equation (A17), the fixed wide-lane ambiguities in equation (A8) and their variance information are combined with the raw measurement corrections as backup data for the mobile receiver 20, or as components in the correction data 108 to be distributed to mobile receivers 20.

If a receiver or method of this disclosure experiences a temporary loss or interruption of one or more received satellite signals (e.g., GNSS signals) for short time (e.g., for a few minutes) and subsequently regains one or more of the received satellite signal after the brief loss or interruption, the receiver or method can employ an innovative Rapid Recovery technique of recovering the converged position solution (e.g., PPP solution or position estimate) rapidly to approximately the same level of accuracy before the signal blockage by estimating the differences of navigation states, such as position, carrier phase ambiguities, or the like. In accordance with one embodiment, the Rapid Recovery technique has three steps or components comprising the following: (1) virtual base correction generation, (2) RTK ambiguity fix and (3) Rapid recovery process.

Virtual Base Correction Generation

The backup data can include but is not limited to refraction corrected (RC), narrow-lane (NL) resolved ambiguities, in accordance with equation A17. After the narrow-lane (NL) filter converges (e.g., the position error is less than 10 centimeters), the mobile receiver generates backup data (e.g., measurement corrections for the first measurement time) or updates the backup data (e.g., at regular intervals with retention of only the last or most current backup data) based on the equations (A1-A4). The mobile receiver 20 stores the backup data, associated with a first measurement time (e.g., $t_1$) in a data storage device 62 for potential use to recover from any signal blockage events or interruptions of one or more received satellite signals from satellite transmitters 100 at the mobile receiver 20. The backup data can also be referred to as virtual base station correction data. The backup data may include one or more of the following: the converged position, residual troposphere delay, refraction-corrected ambiguities from equation (A17), ionospheric delay rate estimate, fixed wide-lane ambiguities and covariance, and raw measurement corrections.

In one embodiment, correction data 108 (as opposed to backup data) comprises satellite orbit corrections (751) and clock corrections that can be applied to the raw phase measurements at the mobile receiver. In another embodiment, the correction data 108 comprises one or more of the following: satellite orbit and clock corrections, tide corrections, receiver antenna phase center variation, receiver antenna phase center offset, satellite phase center variation, satellite antenna phase center offset, receiver phase wind-up, and satellite phase wind-up. For example, tide correction data 108 can comprise any of the following items: solid Earth tide, ocean tide and polar tide. The correction data 108 is received by the correction wireless device 26, which is co-located with the mobile receiver 20, and the mobile receiver 20 can apply to the correction data 108 to the raw phase measurements of one or more satellite signals, or both raw phase measurements and raw code phase measurements. The mobile receiver 20 applies the correction data 108 in conjunction with the saved backup data to rapidly recover the precise position of the mobile receiver, such as a precise position based on a fixed or resolved ambiguity in the carrier phase of the received satellite signals.

Certain parameters cannot be measured directly as observables at the mobile receiver 20 or any reference receiver 130. The mobile receiver 20 estimates estimated parameters, such as receiver position, (GNSS) receiver clock, and troposphere delay from the observables, or the observables in combination with models. After considering the correction data 108 and the estimated parameters, the mobile receiver 20 has certain biases. For example, the code biases for both satellite and receiver in equations (A1-A2) are not corrected; the phase biases in equations (A3-A4) for both satellite and receiver and ionosphere delay are not corrected. The correction data 108 does not contain integer ambiguities and receiver phase bias for the carrier phase measurements. The integer ambiguities and receiver phase bias remain in the correction data 108 that is applied at the mobile receiver 20.

Ionospheric Estimation/Modeling

In one embodiment, at the mobile receiver 20 in the relative positioning module 18, the navigation positioning estimator 50, or the atmospheric bias estimator 741 estimates the atmospheric delay or bias between time $t_1$ and $t_2$, where $t_1$ represent the time prior to signal loss or interruption and $t_2$ represent the time after the signal loss or interruption. The atmospheric dependent errors such as ionosphere error (i.e. I) should be handled independently at each time $t_1$ and $t_2$. In one embodiment, the first strategy generally used to mitigate this portion of errors is a combination of modeling and estimation. The ionosphere delay error increases over time quickly (e.g., roughly speaking 10 centimeters per minute). When dual frequency carrier phase measurements from equations (A3-A4) are available from a receiver (e.g., mobile receiver), the difference of geometry free phase measurements between satellites i and j over $t_1$ and $t_2$ can be expressed as equation (A19) at follows:

$$\nabla \Phi_1^{ij} \lambda_1(t_2) - \nabla \Phi_2^{ij} \lambda_2(t_2) - \nabla \Phi_1^{ij} \lambda_1(t_1) + \nabla \Phi_2^{ij} \lambda_2(t_1) = \quad (A19)$$
$$\frac{f_1^2 - f_2^2}{f_2^2} \nabla \Delta I_{t_1,t_2}^{ij} + \nabla B_{L_1}^{ij}(t_2) - \nabla B_{L_1}^{ij}(t_1) - \nabla B_{L_2}^{ij}(t_2) +$$
$$\nabla B_{L_2}^{ij}(t_1) + \nabla W_{t_2}^{ij}(\lambda_1 - \lambda_2) - \nabla W_{t_1}^{ij}(\lambda_1 - \lambda_2)$$

Where $\nabla$ is difference operator between satellites i and j. $\nabla \Delta I_{t_1,t_2}^{ij}$ is ionosphere change (e.g., double-difference ionosphere estimate) between satellites i and j over $t_1$ (before shading or signal interruption) and $t_2$ (after shading or signal interruption). Equation A19 has a first difference in phase wind-up $W_{t_1}^{ij}$ between satellites i and j over $t_1$ (before shading or signal interruption) and $t_2$ (after shading or signal interruption), and second difference in phase wind-up $W_{t_2}^{ij}$ between satellites i and j over $t_1$ (before shading or signal interruption) and $t_2$ (after shading or signal interruption).

At the mobile receiver 20, the receiver phase wind-up and receiver phase bias can be cancelled between the satellites (100). The satellite phase bias and phase wind-up change very slowly over time. One of major factors causing the phase wind-up change is attributable to satellite yaw rotation, which is less than the maximum yaw rate 0.2 degree per second. For simplicity, the satellite phase bias and phase windup changes can thus be ignored. The above-mentioned equation (A19) can then be simplified as equation (A20)

$$\nabla \Phi_1^{ij} \lambda_1(t_2) - \nabla \Phi_2^{ij} \lambda_2(t_2) - \nabla \Phi_1^{ij} \lambda_1(t_1) + \nabla \Phi_2^{ij} \lambda_2(t_1) = \frac{f_1^2 - f_2^2}{f_2^2} \nabla \Delta I_{t_1,t_2}^{ij} \quad (A20)$$

The ionosphere change $\nabla \Delta I_{t_1,t_2}^{ij}$ can be modeled as a first-order Gauss-Markov process as equation (A21) as follows:

$$\nabla I^{ij}(t_2) = \phi_{t_1,t_2} \cdot \nabla I^{ij}(t_1) + Q_{t_1,t_2}, \text{ where } \phi_{t,t-1} \cong e^{-\tau(t_2-t_1)}, Q_{t_1,t_2} = q_I^2(t_2 - t_1) \quad (A21)$$

where $\tau, \sigma$ are correlation time and dynamics of the ionosphere rate which are design factors characterizing the model, and $Q_{t_1,t_2}$ is a time-varying, first-order Gauss-Markov, function based on the ionosphere parameter $q_I^2$. In the navigation positioning estimator 50 or the atmospheric bias estimator 741, the measurements from equation (A20) can be used for measurement update and equation (A21) can be used for time update, respectively, of the precise positioning module 16, the atmospheric bias estimator 741, or a predictive filter (e.g., Kalman filter) used to estimate this ionospheric delay change. Note that only incremental or relative ionospheric values (e.g., $\Delta I = I(t_2) - I(t_1)$) are interesting, but not the absolute ionospheric error itself (e.g., $I(t_2)$ or $I(t_1)$). It should be emphasized that in order to model the ionosphere rate properly, the differencing operation between satellites is required in order to eliminate the receiver phase bias and receiver phase wind-up changes over time.

In the mobile receiver 20, navigation positioning estimator 50 or precise positioning module 16 determines or estimates the backup data for the first measurement time ($t_1$). For example, for the first measurement time, $t_1$ (e.g., prior to signal loss or interruption), the mobile receiver 20 determines and the backup/recovery module 46 stores, retrieves or manages the backup data, such as converged position of the mobile receiver 20 residual troposphere delay, refraction-corrected ambiguities in the equation (A17), the ionosphere rate in equation (A21), the fixed wide-lane ambiguities in the equation (A8) and their variance information are combined with the raw measurement corrections. The backup data for the first measurement time (e.g., $t_1$) is stored in the data storage device 62 of the mobile receiver 20, which can be modeled as a virtual base station or virtual reference receiver for time $t_1$.

In addition to the signal blockage, the occurrence of a power outage can also cause the precise positioning module 16 (e.g., a precise point position (PPP) navigation module or estimator) reset and corresponding long convergence time. For example, a power outage of the mobile receiver can occur because of power-connectivity issue (e.g., broken wire in a wiring harness or oxidized connector), battery discharge, circuit breaker, blown fuse, main power cut-off from a vehicle (e.g., agricultural work vehicle) to the mobile receiver. Accordingly, in certain embodiments, the data storage device 62 may comprise non-volatile random memory or flash memory such that the backup data (e.g., virtual base correction) for Rapid Recovery (RR) before shading can be read, retrieved or recovered after the mobile receiver is power cycled within a short gap, such as approximately three (3) to approximately five (5) minutes. As a power loss can occur anytime, the virtual base corrections are written to data storage device (e.g., NVRAM) in a regular time interval based on user settings or factory default settings, such as approximately every 30 seconds. Further, in on embodiment, the previously recorded backup data for the first measurement time $t_1$ is refreshed or overwritten with new or current backup data for the measurement time for each regular time interval, or for a separate overwrite time interval that exceeds the regulator time interval.

RTK Ambiguity Resolution

In one embodiment, the relative positioning module 18 comprises a real-time kinematic (RTK) filter or relative position estimator. In general, the relative positioning module 18 comprises a predictive filter, such as Kalman filter or a modified Kalman filter. RTK algorithm is a reliable method for determining the relative position and ambiguity difference between two receivers in carrier-phase positioning in real-time (e.g., for navigation applications). If the reception of the received satellite signals is interrupted at the mobile receiver, because of a temporary power loss of input power to the mobile receiver or obstruction of the received satellite signal from shading (e.g., trees or vegetation), there will be a measurement gap (e.g., GNSS measurement gap) in the raw phase measurements and raw code phase measurements at the mobile receiver. Further, the ambiguities before shading at the first measurement time and the ambiguities after shading at the second measurement time may change. Therefore, for precise positioning the mobile receiver 20, the precise positioning module 16 or the relative positioning module 18 determines new ambiguities and the cycle slip detector 59 detects cycle slips. However, some error sources such as the satellite-dependent code and phase biases before shading do not change significantly over a short time from when the satellite orbit corrections 751 and clock corrections are applied; the mobile receiver mitigates the effects of changes over time (e.g., between the first measurement time and the second measurement time) by applying a time differencing operator between epochs (e.g., between the first measurement time and the second measurement time). In order to handle this situation effectively, the mobile receiver 20 or the relative positioning module 18 uses an RTK technique or filter. The purpose of the RTK ambiguity resolution is to compute the relative position change from before and after shading $\Delta X_{RTK}$, as well as the double-difference (DD) ambiguities for wide-lane (WL) and refraction-corrected (RC), $\nabla \Delta N_{WL}^{ij}$(RTK) and $\nabla \Delta N_{RC}^{ij}$(RTK). Here, the RTK is not used to determine the relative position and relative position and ambiguity difference between two receivers in carrier-phase positioning. Instead, the backup data (e.g., previous measurement corrections) from the first measurement time are is considered as a virtual base station. Actually, the double differencing approach between epochs ($t_1$ and $t_2$) and between satellites, similar to RTK, are used.

The RTK algorithm or RTK-like algorithm uses the following double-difference equations for code phase and carrier phase to determine the relative position vector (e.g., baseline vector) between the reference receiver 130

$$\nabla \Delta P_1^{ij} = \nabla \Delta \rho^{ij} + \nabla \Delta I^{ij} + \nabla \Delta \varepsilon_{P_1}^{ij} \quad (22)$$

$$\nabla \Delta P_2^{ij} = \nabla \Delta \rho^{ij} + \frac{f_1^2}{f_2^2} \nabla \Delta I^{ij} + \nabla \Delta \varepsilon_{P_2}^{ij} \quad (23)$$

$$\nabla \Delta L_1^{ij} = \nabla \Delta \rho^{ij} - \nabla \Delta I^{ij} + \Delta N_1^i \lambda_1^i - \Delta N_1^j \lambda_1^j + \nabla \Delta \varepsilon_{L_1}^{ij} \quad (24)$$

$$\nabla \Delta L_2^{ij} = \nabla \Delta \rho^{ij} - \frac{f_1^2}{f_2^2} \nabla \Delta I^{ij} + \Delta N_2^i \lambda_2^i - \Delta N_2^j \lambda_2^j + \nabla \Delta \varepsilon_{L_2}^{ij} \quad (25)$$

$\nabla\Delta L_1^{ij}$ is the double-difference L1 carrier phase measurements with respect to satellite i and j and the mobile receiver at the measurement times $t_1$ and $t_2$, where $t_1$ is the first measurement time and $t_2$ is the second measurement time;

$\nabla\Delta\rho^{ij}$ is the double-difference geometric distance between the satellite j phase center and the mobile receiver phase center and between satellite i phase center and the receiver phase center, including satellite orbital correction, receiver tide displacement and earth rotation correction;

$\nabla\Delta I^{ij}$ is the double-difference ionosphere error for a given satellite j and satellite i;

$\Delta N_1^i \lambda_1^i$ is the single-differenced integer ambiguity for satellite i multiplied by the wavelength for the L1 carrier from satellite i;

$\Delta N_1^j \lambda_1^j$ is the single-differenced integer ambiguity for satellite j multiplied by the wavelength for the L1 carrier from satellite j;

$\nabla\Delta\varepsilon_{L_1}^{ij}$ is the double-difference phase measurement error for satellite j and satellite i including white noise, multipath and remaining un-modeled errors with respect to the L1 frequency;

$\nabla\Delta L_2^{ij}$ is the double-difference L2 carrier phase measurements with respect to satellite i and j, and the mobile receiver at the measurement times $t_1$ and $t_2$ where $t_1$ is the first measurement time and $t_2$ is the second measurement time;

$\Delta N_2^i \lambda_2^i$ is the single-differenced integer ambiguity for satellite i multiplied by the wavelength for the L2 carrier from satellite i;

$\Delta N_2^j \lambda_2^j$ is the single-differenced integer ambiguity for satellite j multiplied by the wavelength for the L2 carrier from satellite j;

$\nabla\Delta\varepsilon_{L_2}^{ij}$ is the double-difference phase measurement error for satellite j and satellite i including white noise, multipath and remaining un-modeled errors with respect to the L2 frequency; and $f_1$ is the L1 carrier frequency and $f_2$ is the L2 carrier frequency of the received satellite signals.

In equations (A22-A25), the receiver/satellite dependent errors, such as code phase bias (e.g., receiver code phase bias and satellite code phase bias), carrier phase bias (e.g., receiver phase bias and satellite phase bias) and clock bias (e.g., receiver clock bias and satellite clock bias), that are common between satellites and the mobile receiver at measurement times $t_1$ and $t_2$ (e.g., measurement times or epochs) can be cancelled out by the double differencing operation between satellites and receiver at measurement times. $t_1$ and $t_2$ where $t_1$ is the first measurement time and $t_2$ is the second measurement time.

Under certain conditions, the ionosphere error can be significant; mobile receiver 20 can compensate for the ionosphere error based on the time difference and the ionosphere rate estimated in the equation (A21). The remaining ionosphere error is also estimated per satellite in the RTK engine. The troposphere error is corrected based on the elevation mapping function using the troposphere bias estimation before the shading events or power cycle. In one embodiment, the mobile receiver 20 can ignore the remaining satellite dependent errors including orbit, clock, code bias and phase biases after the time differencing operator is conducted and orbit and clock corrections from the correction data 108 are applied at both epochs.

Although two GNSS receivers (e.g., reference receiver 130 and rover 20) and two satellites are usually required for the formation of a double-difference measurements, here one GNSS receiver (e.g., mobile receiver 20 or rover) takes measurements at two different measurement times for two different satellites to form double-difference measurements. In one embodiment in accordance with the RTK algorithm, a minimum of four double-difference equations and five satellites are required to solve for the relative position vector and the associated integer ambiguity for a three dimensional position estimates (e.g., in Cartesian coordinates, x, y, z).

The correction data 108, which includes orbit and clock corrections, are applied for the mobile receiver between the two measurement times or epochs (e.g., between the first measurement time and the second measurement time). It should be mentioned that the different GLONASS satellites have different frequency and wavelength. Accordingly, for GLONASS satellites, the receiver clock error after the double-differencing phase measurements can be cancelled, but the resulting double differencing ambiguities are not integers anymore. The float ambiguity bias for each reference satellite (e.g., GLONASS satellite) is required to be estimated.

Referring to FIG. 1A, FIG. 1B, FIG. 3 and FIG. 4, a method or system provides a satellite correction signal with a precise, low-latency satellite clock estimate. An electronic data processing center 118 is arranged to collect raw phase measurements from a plurality of reference receivers 130 at known corresponding locations (e.g., three dimensional coordinates). A measurement pre-processing (MPP) module (36 in FIG. 3) or a data processor 120 of the data processing center 118 determines a wide-lane ambiguity and a respective satellite wide-lane bias for the collected phase measurements for each satellite to provide assistance or appropriate constraints for efficient or rapid resolution of narrow-lane ambiguities.

An orbit solution module 38 or the data processor 120 determines satellite correction data 108 for each satellite in an orbit solution at an orbit correction rate based on the collected raw phase and code measurements and determined orbital narrow-lane ambiguity and respective orbital satellite narrow-lane bias, which can be estimated with the assistance of the determined wide-lane ambiguity and wide-lane bias. Advantageously, in on embodiment, the wide-lane ambiguity and respective wide-lane bias, determined by the measurement preprocessing module 36, can be shared and leveraged amongst one or more predictive filters (39, 43, 412) in the other modules (38, 44, 42) of the correction data estimator 34. Further, the orbit solution module 38, the data processor 120, or the narrow-lane estimator 39 is configured to determine, resolve or fix narrow-lane ambiguities and to estimate corresponding narrow-lane bias, such as one or more of the following: receiver narrow-lane phase bias, satellite narrow-lane phase bias, receiver narrow-lane code bias, and/or satellite narrow-lane code bias.

A clock solution module 44 or data processor 120 determines a slow satellite clock correction (e.g., moderate-latency satellite clock correction) at a slow update rate (or moderate update rate) based on the satellite orbital correction data 751, the collected raw phase and code measurements, and clock-solution-module-determined narrow-lane ambiguity (informally referred to as "clock narrow-lane ambiguity") and respective satellite narrow-lane bias, which can be estimated with the assistance of the determined wide-lane ambiguity and wide-lane bias. Further, the clock solution module 44, the data processor, or the narrow-lane estimator 43 is configured to determine, resolve or fix narrow-lane ambiguities and to estimate or to refine corresponding narrow-lane bias, such as one or more of the following: receiver narrow-lane phase bias, satellite narrow-lane phase bias, receiver narrow-lane code bias, and/or satellite narrow-lane code bias. In one embodiment, the narrow-lane estimator 43 of the clock solution module 44 can refine one or more previous narrow-lane estimates of the narrow-lane estimator 39 (e.g., from a current or previous epoch of phase or code measurements of a respective GNSS receiver).

A low latency clock module 42 or data processor 120 determines lower-latency satellite clock correction data 108 or delta clock adjustment to the slow satellite clock at a fast update rate based on freshly or recently updated measurements of the collected raw phase measurements that are more current than a plurality of previous measurements of the collected raw phase measurements used for the slow satellite clock correction to provide lower-latency clock correction data 108. In one embodiment, the fast update rate is a fixed rate that is greater than the slow update rate or orbit rate (e.g., orbital update rate). However, in an alternate embodiments, the fast update rate can be varied (dynamically) based on: (1) availability, reliability or quality (e.g., signal strength, dilution of precision, or other quality metrics) of the raw carrier phase measurements from particular satellites or reference stations, or (2) selecting a subset of the satellite measurements or reference stations as active for use to estimate correction data based on availability, reliability or quality of the raw carrier phase measurements from time to time.

The data processing center 118 incorporates the satellite orbital correction data 751 and the low-latency clock correction data 108 into the correction data 108 with global validity for the GNSS for transmission (e.g., satellite or wireless transmission) to one or more mobile receivers 20 that operate in a precise positioning mode, such as a precise point positioning (PPP) mode. For example, the data processing center 118 incorporates the satellite wide-lane bias, the satellite orbital correction data, the satellite narrow-lane bias from the slow clock solution and the low latency clock correction data into the correction data, encoded on the global satellite differential correction signal, with global validity for the GNSS transmission to one or more mobile receivers. The precise positioning mode (e.g., PPP mode) uses precise clock and orbital solutions for the received signals of the satellites, along with satellite biases, to provide precise correction data 108 that is globally valid or that does not depend on a locally valid differential data, such as real-time kinematic (RTK) correction data 108 that is locally valid, accurate for short-baselines between the reference station and the mobile station (e.g., for applications or off-road vehicles that require greater than reliable decimeter level accuracy).

In one embodiment, the orbit rate (e.g., orbital update rate) is less than (e.g., or less than or equal to) the slow update rate; an orbit zero-difference filter 404 is applied to facilitate the estimation, by the orbit narrow-lane estimator 39 (e.g., narrow-lane filter), of the orbit narrow-lane ambiguity and respective narrow-lane satellite bias at the orbit update rate based on the collected raw phase measurements. In another embodiment, the fast update rate is greater than the slow update rate or the orbit rate; a clock zero-difference filter 408 can be applied to facilitate the estimation, by the clock narrow-lane estimator 43 (e.g., narrow-lane filter), of the clock narrow-lane ambiguity and respective narrow-lane satellite bias at the slow update rate based on the collected raw phase measurements.

In accordance with FIG. 1A, a system is capable of providing correction data 108, encoded in a satellite correction signal, with a precise, low-latency Global Navigation Satellite System (GNSS) satellite clock solution or precise, low-latency clock data in real-time. The final satellite clock solution comprises precise, low-latency clock data that represents an integrated solution of two simultaneous or parallel processes for estimation of GNSS satellite clock estimates: (1) a slow clock solution and (2) low-latency clock solution or intermediate low-latency solution.

The latency can be measured based on time difference between an earlier measurement time (e.g., epoch) associated with a collection of phase measurements of satellite signals at one or more reference receivers 130 and receipt of processed measurements at a later measurement time (e.g., epoch) at the mobile receiver 20 or rover. For example, FIG. 2A and FIG. 2B subdivide the above latency time difference into different time periods for additional analysis, which will be described later. Low-latency means a lower latency than a moderate latency of the slow clock solution of the clock solution module 44. The lower latency solution (e.g., of the low latency clock module 42) may be referred to as a fast clock solution (e.g., from a fast clock process), whereas the moderate latency solution (e.g., of the clock solution module 44) may be referred to as a slow clock solution (e.g., from a slow clock process). A low latency clock module 42 or data processor 120 determines lower-latency satellite clock correction data 108 or delta clock adjustment to the slow satellite clock based on freshly or recently updated measurements of the collected raw phase measurements that are more current than a plurality of previous measurements of the collected raw phase measurements used for the slow satellite clock correction to provide lower-latency clock correction data 108. The lower-latency clock correction data 108 refers to aggregate, smooth clock correction data, with lower-latency than the slow clock solution, that contains contributions from the lower-latency satellite clock correction data and the slow satellite clock correction data.

The low-latency clock data or low-latency clock solution can refer to either or both of the following: (1) the clock data associated with the low-latency process, or (2) the final satellite clock solution that results from an integrated solution based on the slow clock solution and the intermediate, low-latency solution. The low-latency clock data improves the accuracy of satellite clocks and reduces the latency (or increases the timeliness) of the final solution in real time, which is incorporated into correction data 108 for distribution to mobile receivers 20 or rovers.

In one embodiment, the slow clock process can utilize most or all possible measurements (e.g., carrier phase measurements from the reference data network 32 of reference receivers 130) to estimate a slow clock solution, but with a slow clock latency, slow clock delay or moderate latency (e.g., approximately 6 seconds to approximately 10 seconds) associated with: (1) the estimation, by the data processing center 118 and associated reference data network 32, of absolute satellite clocks, tropospheric bias, satellite narrow-lane bias and satellite narrow-lane ambiguity (e.g., refraction corrected narrow-lane ambiguity), or (2) the collection, by the data processing center 118 and associated reference data network 32, of raw phase measurements from the reference receivers 130, (3) both the above estimation and collection. In one embodiment, the slow clock solution is used to conduct ambiguity resolution and to estimate tropospheric bias and gradients per reference receiver to facilitate determination of a refraction correction for the clock narrow-lane ambiguity and respective narrow lane bias; the resolved ambiguities and/or estimated tropospheric bias from the slow clock process can be shared or used in the low-latency clock solution. For example, tropospheric bias can be estimated based on an a priori model and residual tropospheric bias estimation from the slow clock solution. The slow clock process supports collection and analysis of more measurements than the low-latency process to facilitate precise or absolute accuracy of clock estimates and more sophisticated slow clock models. In one embodiment, the slow clock process has greater data processing capacity or throughput requirements than the low-latency clock process, such that the computation of the slow clock solution can take approximately one to approximately two seconds, even if the data processing center 118 supports a parallel data processing environment.

Meanwhile, the low-latency clock process uses less of the measurements (e.g., carrier phase measurements from the reference data network 32) than the slow clock process and the low-latency process has a low-latency or low-latency clock delay (e.g., about one to two seconds) to collect or to collect and compute satellite clock change at a low-latency rate that is greater than the slow clock rate or moderate latency rate. The data processor 120 or the data processing center 118 integrates low-latency clock data with slow clock data and orbit data at low-latency rate to deliver a consistent, accurate and timely set of correction data 108.

Working together with the orbit solution and slow clock solution at a low-latency rate, the data processing center 118 can deliver a consistent set of correction data 108 including satellite orbit, clock (e.g., absolute clock estimate), wide-lane satellite bias, narrow-lane satellite bias and quality information in a timely manner (e.g., with reduced latency or low-latency with respect to the slow clock process). In particular, the data processing center 118 can deliver in real-time the correction data 108 to one or more mobile receivers with wireless correction device 26 through satellite signals (e.g., L-band signals) in FIG. 1A, through a wireless communications system 135 (in FIG. 1B), or through a wireless communications system 57 (in FIG. 3) (e.g., via Internet 756). In one embodiment, the correction data is delivered in real-time without material latency (between measurement time or raw phase measurements at the reference receiver 130 and availability of correction data at the mobile receiver 20) that would tend to degrade accuracy in position estimates of approximately five centimeter horizontal (e.g., pass-to-pass) accuracy or better with approximately ninety-five percent reliability with less than one standard deviation of variation at the mobile receiver 20.

Figure 3:
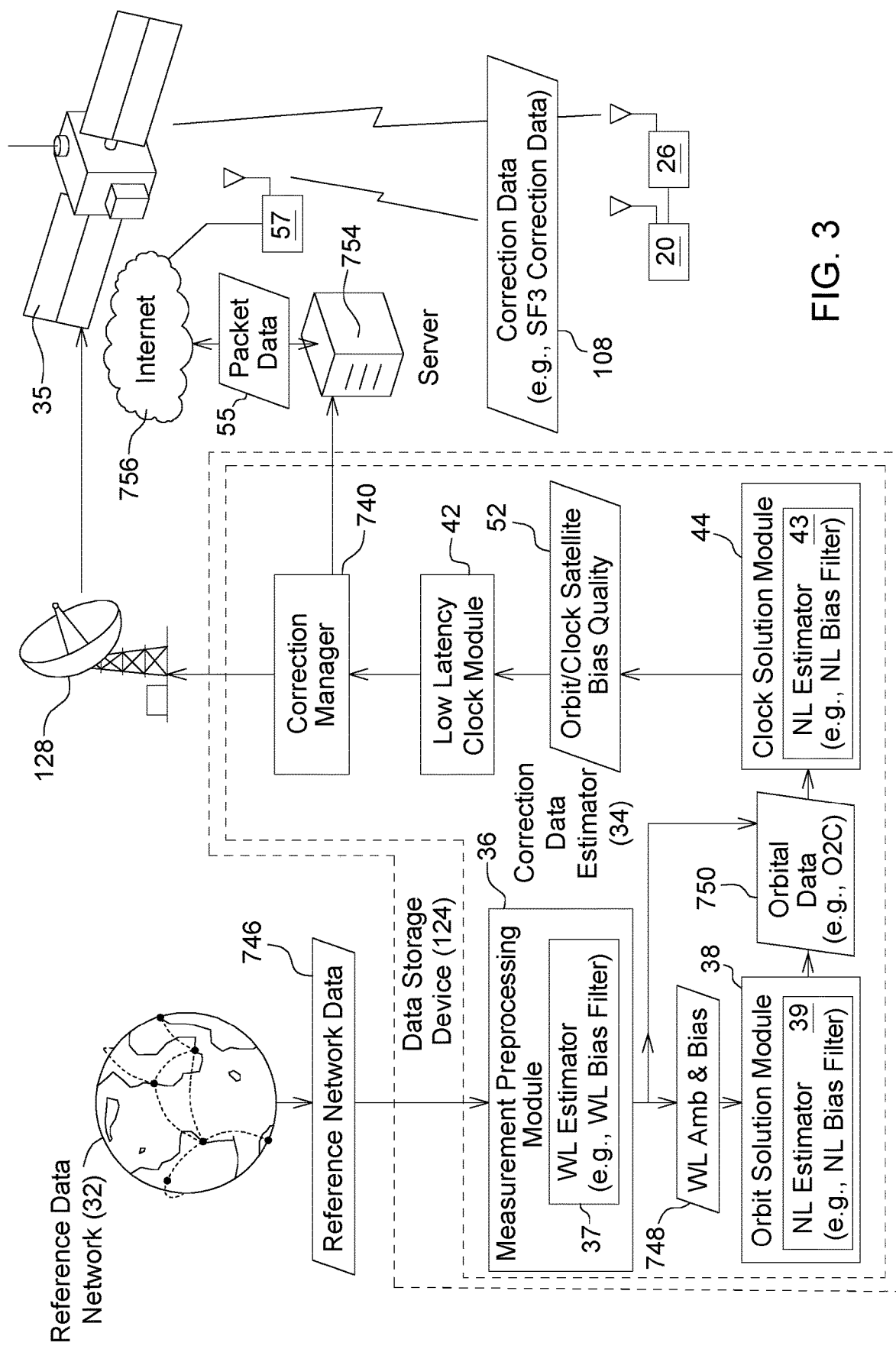
FIG. 3 is a block diagram of another embodiment of a system for providing a satellite correction signal with a precise, low-latency Global Navigation Satellite System (GNSS) satellite clock.

FIG. 3 is a block diagram of another embodiment of a system for providing a satellite correction signal with a precise, low-latency Global Navigation Satellite System (GNSS) satellite clock. The system of FIG. 3 is similar to the system of FIG. 1A or FIG. 1B, except the data storage device 124 stores or supports a correction data estimator 34 and two alternative paths for flow of the correction data 108 to the end user of the mobile receiver 20 are provided. Like reference numbers in FIG. 1A, FIG. 1B and FIG. 3 indicate like elements.

The correction data estimator 34 (e.g., Innovative Clock Orbit Real-time Estimator (iCORE)) comprises a module or software instructions that can be executed by the data processor 120 for providing correction data 108 as output based on the input of carrier phase measurements and associated data from one or more reference receivers 130. The associated data may comprise data such as satellite identifiers, satellite signal identifiers (e.g., frequency or band), or ephemeris data associated with the received satellite signals, reference station identifiers (e.g., or reference station coordinates), measurement time stamps associated with the measured carrier phase, among other ancillary data.

Further, in other embodiments, the associated data may comprise pre-processing data, resolved wide-lane ambiguities, resolved narrow-lane ambiguities, or resolved refraction-corrected ambiguities for any reference receiver 130 or reference station with a known or fixed location (e.g., three dimensional coordinates).

The correction data estimator 34 generates correction data 108 that enable ambiguity resolution on one or more mobile receivers 20 or rovers that receive the correction data 108 via a correction wireless device 26. The correction data estimator 34 employs an innovative ambiguity resolution algorithm for the generation of the low-latency clock data and satellite biases. For example, the architecture of the correction data estimator 34 or data processing center 118 is well suited to support processing measurement data (and associated pre-processing data) of many (e.g., one hundred or more) reference receivers 130 or reference stations, including all necessary computation such as measurement pre-processing, orbit and clock determination, ambiguity resolution and the final correction data 108 generation, within a fraction of second.

In one embodiment, the correction data estimator 34 comprises an measurement pre-processing (MPP) module 36, an orbit solutions module, a clock solution module 44, a low latency clock module 42, and correction distribution module to provide global differential correction data 108. In one embodiment, the measurement pre-processing (MPP) module 36 receives reference network data 746 from the reference data network 32 of one or more reference satellite receivers. The reference network data 746 may comprise one or more of the following: raw measurements, raw carrier phase measurements from each reference satellite receiver, raw code phase measurements from each reference satellite receiver, a reference satellite receiver identifier, a reference receiver 130 position offset or position offset vector from its known position, a phase offset corresponding to the reference receiver 130 position offset, atmospheric bias data, satellite bias data, receiver bias data, receiver clock bias data, satellite clock bias data, or other data. Raw measurements 747 can refer to raw carrier phase measurements from one or more reference satellite receivers, or raw code phase measurements from one or more reference satellite receivers, or both.

In one embodiment, the correction data estimator 34 can generate correction data 108 or correction signals in real-time based on the reference network data 746 or collected measurement data from the reference data network 32, where the correction data 108 are generated to provide centimeter-level accuracy estimates including: (1) satellite orbit estimate, (2) satellite clock estimate, and (3) satellite phase biases and their quality information.

In one embodiment, the measurement pre-processing module 36 accepts reference network data 746 as input data and applies the wide-lane estimator 37 (e.g., Ambiguity Resolution Estimator (ARE)) to output wide-lane ambiguities and corresponding wide-lane bias. For example, the pre-processing module 36 or the wide-lane estimator 37 (e.g., wide-lane filter or Kalman filter) may output wide-lane ambiguities and associated wide-lane bias (748) or fixed wide-lane ambiguities and associated wide-lane bias (749). Collectively, fixed wide-lane ambiguity and associated wide-lane bias can be referred to by reference number 749, whereas wide-lane bias alone is referred to be by reference number 748.

The measurement pre-processing module 36 communicates the wide-lane ambiguity and corresponding wide-lane bias data to the orbit solution module 38 and the clock solution module 44. The orbit solution module 38 receives the input of the wide-lane ambiguities and corresponding wide-lane bias data and applies an orbit narrow-lane estimator 39 (e.g., narrow-lane ARE (Ambiguity Resolution Estimator)) to provide predicted satellite orbital data 750 (e.g., O2C data) output. The predicted satellite orbital data 750 can be used to correct orbital errors in the slow clock and low-latency solutions, and to generate orbit correction signals for incorporation into the correction data 108 to be provided to end users.

The orbit solution module 38 communicates the predicted satellite orbital data to the clock solution module 44. The clock solution module 44 receives the input of the predicted satellite orbital data 750, and the wide-lane ambiguities and associated wide-lane bias (748 or 749). The clock solution module 44 applies the clock narrow-lane estimator 43 (e.g., narrow-lane (Ambiguity Resolution Estimator), narrow-lane filter, or Kalman filter) and outputs the predicted orbital data 750, clock satellite bias data, and satellite bias quality data (52). For example, in one embodiment, the clock solution module 44 outputs one or more of the following: predicted orbital data, clock satellite bias data, satellite bias quality data, satellite slow clock corrections, satellite wide-lane bias corrections, and satellite narrow-lane bias corrections 752.

The low latency clock module 42 communicates with the clock solution module 44 to receive the predicted orbital data 750, clock satellite bias data, and satellite bias quality data (52), where the clock satellite bias data can comprise satellite wide-lane bias corrections, and satellite narrow-lane bias corrections. Further, in one embodiment, the low latency clock module 42 receives satellite slow clock corrections (e.g., satellite NL bias corrections 752 as illustrated in FIG. 4). The low latency clock module 42 outputs low-latency correction data 108 including one or more of the following: low-latency precise satellite orbital correction data 751 for corresponding satellites, low-latency precise clock data for corresponding satellites, wide-lane satellite bias, and narrow-lane satellite bias. In one embodiment, the low-latency data is provided at a greater data transmission rate than similar higher-latency data provided by the clock solution module 44, where the low-latency data is updated on a regular basis commensurate with the greater data transmission rate to provide accurate and current correction data 108.

In certain configurations, the data processing center 118 can communicate via communication links with one or more secondary data processing hubs (not shown) that are geographically distributed (e.g., on a global basis), where each secondary data processing hub is configured with hardware and software similar to the data processing center 118 with a correction data estimator 34 and where the data processing center 118 can control the secondary data processing hub or hubs.

For example, the correction manager 740 can select correction data 108 (e.g., the best correction data 108 or most reliable correction data 108) provided by the data processing center 118, alone, or in combination with one or more secondary data processing hubs for distribution to end users. Further, the correction manager 740 can select the geographic scope of the measurement data or the identity of the satellites (e.g., outlier or unreliable measurements from malfunctioning satellites can be ignored) to be used in the correction data 108 that is distributed to end users via satellite or wireless communications system 57.

The correction manager 740 is capable of monitoring the correction data 108 for error correction and distributing the data to end users or subscribers of the data correction data 108 service. The correction manager 740 may distribute the correction data 108 via a satellite communications network, a wireless network (e.g. WiFi, 802.11, or cellular network), or both. A broadcasting system is capable of delivering the best of the global differential corrections to user receiver from multiple correction generation servers 754, such as the data processing center 118 and one or more secondary data processing hubs. For example, the set of global differential correction can be chosen and uplinked to INMARSAT communication satellite via Land-Earth Station (LES) as illustrated in FIG. 3.

The correction manager 740 is capable of communicating or distributing correction data 108 to the satellite uplink communications device or distribution of the satellite data via the satellite communications network. In turn, the satellite uplink communications device provide a signal to a communications satellite 35 with a transceiver, a combination of a transmitter and receiver to communicate correction data 108 via an electromagnetic or satellite signal (e.g., L-band signal) to mobile receivers 20 or rovers equipped with a correction wireless device 26. In certain embodiments, the electromagnetic or satellite signal with the correction data 108 may be encrypted or encoded such that only subscribers or licensees can access, decode or decrypt the correction data 108, or certain precision levels of the correction data 108 (e.g., SF3 correction data 108).

The correction manager 740 is capable of communicating or distributing correction data 108 to a server 754 that has access to an electronic communications network, such as the Internet 756. For example, the server 754 may comprise a computer that accesses the Internet 756 via an Internet service provider to enable the correction data 108 to be communicated in one or more data packets 55 (e.g., Internet Protocol data packets). The data packets may be processed by a wireless communications system 57, such as WiFi wireless system, a local wireless network, a wide area wireless network, or a cellular communications system via a correction wireless device 26, which may comprise a smartphone, a WiFi-enabled communications transceiver, or another device for receiving the correction data 108 and providing the received correction data 108 to the mobile receiver 20 or rover. As in the case of the satellite signal with the correction data 108, the correction data 108 transmitted by the server 754, the data packets 55 or both may be encrypted or encoded such that only subscribers or licensees can access, decode or decrypt the correction data 108, or certain precision levels of the correction data 108.

The mobile receiver 20 of the end user is capable of receiving the correction data 108, which includes a global differential corrections. The mobile receiver 20 or rover is capable of resolving ambiguity based on the received correction data 108 and achieving centimeter-level navigation.

FIG. 4 shows an illustrative example of the correction data estimator 34 of FIG. 3 in greater detail. Like reference numbers in FIG. 3 and FIG. 4 indicate like elements, modules or features.

The correction data estimator 34 comprises a measurement pre-processing module 36, an orbit solution module 38, a clock solution module 44 and low-latency clock module 42. The measurement pre-processing (MPP) module prepares "clean" measurements and provides wide-lane fixed ambiguities and wide-lane bias products for use by the correction data estimator 34 and its other modules. The orbit solution module 38 provides accurate satellite position and velocity estimates to assist in proper geometric estimates or range estimates between a particular reference receiver 130 an corresponding satellite. The orbit solutions or precise orbital data is provided for use by the correction data estimator 34 and the its other modules. The clock solution module 44 provides a satellite slow clock solution estimate and narrow-lane bias products at a low rate, slow clock rate, or a slow update rate. The low latency clock module 42 provides fast satellite clock estimate at a low-latency update rate (e.g., approximately 1 Hertz (Hz) or greater), fast rate, or a fast update rate, which is greater than the slow clock rate. Further, the low-latency module integrates, manages and communicates the state data and filter results for sharing among the ambiguity resolution filters to enable the MPP module, orbit solution module 38 and slow clock solution module 44 to output or generate a set of consistent correction data 108 or signals in real-time.

Each one of the MPP module, the orbit solution module 38 and clock solution module 44 comprises two parts: (1) zero-difference filter and (2) an network ambiguity resolution module or filter. In one embodiment, each zero-Differential (ZD) filter (e.g., Kalman filter) does one or more of the following: (a) processes ZD measurements, (b) defines or forms state variables for the ZD filter, (c) and performs or processes update and/or dynamic update of the ZD filter (e.g., based on the defined state variables and states). In one embodiment, the measurement preprocessing module 36, the orbit solution module 38, the clock solution module 44 and/or the low-latency clock module 42 may further comprise one or more network ambiguity resolution estimation (ARE) modules that perform or conduct ambiguity resolution by one or more predictive filters, such as wide-lane estimator 37 (e.g., wide-lane filter), a narrow-lane estimator 39 (e.g., narrow-lane filter), or another predictive filter (e.g., Kalman filter). The network ambiguity resolution estimation module is capable of resolving wide-lane and narrow-lane ambiguities. Different ZD filter and ARE modules (e.g., wide-lane estimator 37 (e.g., wide-lane filters), narrow-lane estimator 39 (e.g., narrow-lane filters), or both) as used for different modules, such as MPP module, the orbit solution module 38 and clock solution module 44, because the update rates and data states of the different modules can be different.

In one embodiment, low latency clock module 42 can only use the carrier phase measurements to derive clock change between two different epochs. In order to improve computation efficiency, the double differencing approaches between time and satellites are used to reduce size of estimated states, such as ambiguity states and receiver clocks estimates. The tropospheric biases are corrected using a prior model and residual troposphere bias estimation from slow clock solution. The low latency clock module 42 estimates satellite clock changes, not reference receiver 130 clock changes. The computation by the data processing center 118 is extremely efficient. For example, if the data processing center 118 is implemented on a state-of-the art desktop computer at the time of filing of this disclosure, the data processing center 118 can take a few milliseconds to finish processing all the measurements of many sites or reference receivers 130 (e.g., sixty or more reference receivers 130) for any epoch.

Measurement Pre-Processing Module

As illustrated, the measurement pre-processing module 36 further comprises a measurement pre-processing zero-difference filter 400 and a network wide-lane ambiguity resolution estimator (e.g., wide-lane estimator 37 (e.g., wide-lane filter)). The measurement pre-processing zero-difference filter 400 supports precise point positioning (PPP). An optional measurement pre-processing zero-difference filter 400 can be used to determine undifferenced or zero-differenced (ZD) ambiguity states or float ambiguity states associated with the raw carrier phase measurements (e.g., L1 raw carrier phase, L2 carrier phase, wide-lane difference of L1/L2 combination of carrier phase) for one or more of the reference receivers 130 in the reference data network 32. The zero-difference filter is illustrated in dashed lines in FIG. 4 to show that the zero-difference filter is optional and may be included within the wide-lane estimator 37 (e.g., wide-lane filter) in alternate embodiments. For example, the zero-differenced ambiguity state can be determined based on correction data 108 that contains satellite bias information from a network or group of reference receivers 130.

At regular intervals or sampling intervals after the measurement pre-processing module 36 receives the raw measurements 747 from each reference receiver 130 of reference data network 32, the measurement pre-processing module 36 processes, preprocesses and "cleans" the measurements, and resolves the wide-lane (WL) ambiguities (and WL bias estimates) associated with the received carrier phase measurements for each satellite within view of each reference receiver 130. The measurement pre-processing module 36 provides support for both the orbit/clock solution and the low-latency clock by providing the "cleaned" carrier measurements, along with respective fixed wide-lane ambiguities, and respective satellite WL biases.

In one embodiment, the measurement pre-processing module 36 uses the Melbourne-Wübbena linear combination as zero-difference (ZD) measurement to estimate the following state variables:
1) ZD float WL ambiguity per visible satellite and reference site (reference receiver 130) which combines receiver wide-lane bias and WL integer ambiguities.
2) One wide-lane bias per satellite.
3) One GLONASS IFB WL coefficient per tracked site.

With the use of the ZD float WL ambiguity as a constraint or search-limiting constraint for a wide-lane estimator 37 (e.g., wide-lane filter) (e.g., Kalman filter), the measurement pre-processing module 36 or is wide-lane estimator 37 (e.g., wide-lane filter) resolves the WL ambiguity in double-difference (DD) and single difference (SD) form, where the receiver WL bias is cancelled.

In an alternate embodiment for a reference receiver 130 that tracks GLONASS satellites, the measurement pre-processing module 36 determines GLONASS IFB WL coefficient per tracked site, where sensitivity coefficient of the GLONASS IFB WL coefficient is the satellite frequency number. This state variable only exists for GLONASS case and not for other GNSS systems, like GPS.

In order to make the computation effective, the measurement pre-processing module 36 averages the ZD Melbourne-Wübbena measurements for each site at an interval such as 60 seconds if there is no cycle slip detected. For example, the reference receiver 130 comprises a cycle slip detector to detect a carrier cycle slip in the carrier phase measurements for each received signal from a given satellite or minimum set of satellites (e.g., five satellite) necessary to reliably track the three dimensional position of the reference receiver 130. For each sampling interval, the measurement pre-processing module 36 or ZD filter (e.g., ZD Kalman filter) processes the smoothed ZD Melbourne-Wübbena measurements on a site-by-site basis. At each measurement update interval, the ZD Kalman filter dynamic update and measurement update is processed to update state variables.

In an alternate embodiment, GPS and GLONASS systems have two separate wide-lane estimator 37 (e.g., wide-lane filters) associated with the measurement pre-processing module 36. The reference receiver 130 bias is not a desirable global differential product because the reference receiver 130 bias is not used for user receiver navigation. Accordingly, in order to reduce filter size and computation complexity, the reference receiver 130 WL bias is not explicitly estimated and combined into the ZD float ambiguity state instead.

In particular, the pre-processing module 36 or network wide-lane ambiguity filter uses zero-differenced (ZD) Melbourne-Wübbena linear combination in equation (B1) as the input measurement to estimate one wide-lane floating ambiguity state per visible satellite. The wide-lane satellite bias can be broadcast in real-time within correction data 108 or correction signals to mobile receivers 20 and will compensate for that term using equation (B2).

In one embodiment, the wide-lane estimator 37 (e.g., wide-lane filter), which can be applied to PPP determination, uses the following equations described below. Given the code and phase measurements from two frequencies, such as L1 and L2 for GPS, G1 and G2 for GLONASS, the Melbourne-Wübbena linear combination $L_{WL}^j$ can be formed as shown below.

$$L_{WL}^j = \left(\frac{f_1}{f_1+f_2}P_1^j + \frac{f_2}{f_1+f_2}P_2^j\right) - \left(\frac{f_1}{f_1-f_2}L_1^j - \frac{f_2}{f_1-f_2}L_2^j\right) \quad (B1)$$

By expanding the above equation (1), it can be shown that the geometric range related terms, which include range, receiver and satellite clock, ionosphere and troposphere errors and the phase wind-up term, are cancelled. It can be expressed in equation (2) as:

$$L_{WL}^j = N_{WL}^j \lambda_{WL} + b_{WL} + B_{WL}^j + IFB^j + \varepsilon_{WL}^j \quad (B2)$$

where:

$\lambda_{WL}$ is wide-lane wavelength, about 86.4 cm for GPS and c is speed of light;

$$\lambda_{WL} = \frac{c}{f_1 - f_2}; \quad (B3)$$

$N_{WL}^j$ is integer wide-lane ambiguity for satellite j;

$$N_{WL}^j = N_1^j - N_2^j; \quad (B4)$$

$b_{WL}$ is wide-lane receiver bias (one per receiver and constellation for all visible satellites), which is a combination of L1 and L2 receiver code bias and phase bias, as indicated in equation (5):

$$b_{WL} = \left(\frac{f_1}{f_1+f_2}b_{P_1} + \frac{f_2}{f_1+f_2}b_{P_1}\right) - \left(\frac{f_1}{f_1-f_2}b_{L_1} - \frac{f_2}{f_1-f_2}b_{L_2}\right), \quad (B5)$$

where majority of GLONASS inter-frequency bias $b_{P_1}$ and $b_{P_2}$ in code measurement is usually assumed to be linear or a trigonometric function of the GLONASS satellite frequency number; it is not the same for all the visible satellite as with the case of CDMA signals such as GPS;

where $IFB^j$ is the inter-frequency bias for satellite j, such as for a GLONASS satellite;

where $B_{WL}^j$ is wide-lane satellite j bias (one per satellite); and where $\varepsilon_{WL}^j$ is the wide-lane measurement error for satellite j including white noise, multipath and remaining un-modeled errors.

With respect to the inter-frequency bias per satellite, the linear model can be approximated below for GLONASS constellation as equation (6):

$$IFB^j \approx k \cdot n^j \quad (B6)$$

where k is the IFB coefficient for receiver code bias. The IFB varies from receiver to receiver, also varies from one siting (antenna and cabling setup) to another siting. Modelled in this way, typically k is less than 0.1.

The wide-lane satellite j bias, $B_{WL}^j$, (one per satellite) is a combination of L1 and L2 satellite code bias and satellite phase bias as in equation (7); the satellite bias is changing slowly over time; both satellite and receiver wide-lane biases are not constant over time:

$$B_{WL}^j = -\left(\frac{f_1}{f_1+f_2}B_{P_1}^j + \frac{f_2}{f_1+f_2}B_{P_2}^j\right) + \left(\frac{f_1}{f_1-f_2}B_{L_1}^j - \frac{f_2}{f_1-f_2}B_{L_2}^j\right) \quad (B7)$$

where $B_{P_1}^j$ is satellite bias for satellite j of the code phase or pseudo-range signal encoded on frequency L1 ($f_1$); where $B_{P_2}^j$ is satellite bias for satellite j of the code phase or pseudo-range on frequency L2 ($f_2$); where $B_{L_1}^j$ is satellite bias for satellite j of the carrier phase on frequency L1, where $B_{L_2}^j$ is satellite bias for satellite j of the carrier code on frequency L2.

Orbit Solution Module

The orbit solution module 38 relates to orbit determination, such as estimation of accurate time-dependent satellite position estimates, velocity estimates, acceleration data, and other motion data. In the correction data estimator 34, the other major modules including slow clock estimation module and low latency clock module 42 do not estimate satellite orbits. The other modules totally rely on the predicted orbits over a corresponding valid orbit time period (e.g., few minutes) from the orbit solution. The orbit solution module 38 runs at an orbital correction rate or a lower rate such as 300 seconds per iteration or update of orbit solutions since the GNSS satellite orbits are smooth. In the correction data estimator 34, the modules including the measurement pre-processing module 36, the orbit module, clock module and low latency clock module 42 can run in parallel.

The orbit solution uses the refraction-corrected code and carrier phase measurements from global reference station network. There are three types of state variables to be considered in the orbit solution module 38 and its associated filters, such as the orbit zero-difference filter 404 and the network NL filter for ambiguity resolution:

1) Satellite-dependent state variables including satellite position, velocity, satellite clock, satellite narrow-lane bias, yaw rate and empirical solar radiation force modeling parameters.
2) Receiver-dependent state variables including reference position, receiver clocks, residual troposphere bias and gradients, carrier phase ambiguities.
3) Common-state variables including Earth Orientation parameters such as polar motion and UT1-UTC.

In order to provide global differential positioning services, such as STARFIRE™ correction data services (e.g., as correction data 108), the precise satellite clocks and orbits have to be estimated and delivered to end-user receivers in real-time. STARFIRE correction data services is a trademark of Deere & Company of Moline, Ill. Typically, predicted satellite orbits (e.g., called O2C data) over a few minutes are considered known in the clock estimation because the errors of these predicted orbits are rather small and stable and can even be absorbed by the estimated clocks. The correction data estimator 34 can use the predicted orbital data to correct orbital errors in slow clock solutions and low-latency solutions and to generate correction data 108 in real-time.

In one embodiment, the orbit solution module 38 may comprise an orbit zero-difference filter 404 and a network narrow-lane ambiguity resolution estimator (ARE). With the benefit of the results (e.g., float ambiguity states) of the pre-processing zero-difference filter 400, the orbit zero-difference filter 404 can be used to determine undifferenced or zero-differenced (ZD) ambiguity states or float ambiguity states associated with the raw carrier phase measurements (e.g., L1 raw carrier phase, L2 carrier phase, wide-lane difference of L1/L2 combination of carrier phase, or narrow-lane difference of L1/L2 combination of carrier phase) for one or more of the reference receivers 130 in the reference data network 32.

With the benefit of the undifferenced or zero-differenced (ZD) ambiguity states or float ambiguity states associated with the raw carrier phase measurements or narrow-lane difference of the raw carrier phase measurements and the resolved WL ambiguities provided by the measurement pre-processing module 36, the network narrow-lane ambiguity estimator (in association with the orbit solution module 38) can estimate narrow-lane ambiguities (e.g., fixed integer NL ambiguities) or refraction-corrected narrow-lane ambiguities for one or more reference receivers 130 in the reference data network 32. The resolved WL ambiguities can be used as constraints in a search process or to assist the NL ambiguity estimator (e.g., NL filter) to converge rapidly upon a integer ambiguity solution for carrier phase measurements.

The orbit solution uses the refraction-corrected code and refraction-corrected carrier phase measurement. The refraction-corrected code measurement can be modelled as:

$$P_{r,RC}^s = \rho_r^s + \tilde{\tau}_r - \tilde{\tau}^s + T_r^s + \delta_{pcv/pco} + \delta_{tides} + \delta_{rel} \quad (C10)$$

The refraction-corrected carrier phase measurement can be modelled as:

$$\Phi_{r,RC}^s \lambda_{NL} = \rho_r^s + \tilde{\tau}_r - \tilde{\tau}^s + T_r^s + AMB_{r,RC}^s + b_{r,NL} - b_{NL}^s + \delta_{pcv/pco} + \delta_{tides} + \delta_{rel} + \delta_{pwu} \lambda_{NL} \quad (C11)$$

where:

$\rho_r^s$ is the satellite true range and can be further modelled as below:

$$\rho_r^s = \sqrt{(x^s - x_r)^2 + (y^s - y_r)^2 + (z^s - z_r)^2} \quad (C12)$$

where:

[$x^s$ $y^s$ $z^s$] define the satellite orbit position and [$x_r$ $y_r$ $z_r$] are pre-surveyed as known coordinate or estimated as unknown parameters, (e.g., and other parameters, such as solar radiation pressure and velocity can be estimated);

$\tilde{\tau}_r$ is the GNSS receiver clock and bias term, which is the combination of receiver clock error $\tau_r$ and receiver code bias $B_{r,NL}$;

$\tilde{\tau}^s$: satellite clock and bias term, which is the combination of satellite clock error $\tau^s$ and satellite code bias $B_{NL}^s$.

$$\tilde{\tau}^s = \tau^s + B_{NL}^s \quad (C37)$$

$T_r^s$ is the tropospheric delay and can be divided into dry component $T_{r,dry}^s$ and wet component $T_{r,wet}^s$;

$AMB_{r,RC}^s$ is the combination of WL ambiguity and NL ambiguity and can be derived from the difference between the RC corrected float ambiguity and the receiver narrow-lane phase bias;

$b_{r,NL}$ is receiver narrow-lane phase bias per receiver;

$B_{NL}^s$ is the satellite code bias;

$\delta_{pcv/pco}$ is the antenna phase delay due to phase center offset and variation from both satellite and receiver antenna;

$\delta_{tides}$ is the tidal effect including solid earth tide, ocean tides loading, polar tide loading; and $\delta_{rel}$ is relativistic effect on satellite clock.

In one embodiment, one or more predictive filters in the clock solution module 44, alone or together with the low latency clock module 42, can estimate or resolve the combined WL and NL ambiguity, AM $B_{r,RC}^s$, and associated WL bias and NL bias, respectively, as follows:

Similar to WL ambiguity estimation, the reference receiver NL phase bias is not explicitly estimated, but is instead combined with the NL float ambiguity state. For example, the ambiguity term and receiver narrow lane phase bias per receiver $b_{r,NL}$ are combined as one state as combined RC float ambiguity term $(AMB)_{r,RC}^s$ in the following equation:

$$(AMB)_{r,RC}^s = AMB_{r,RC}^s + b_{r,NL} \quad (C13)$$

In this disclosure, $AMB_{r,RC}^s$ is the combination of WL and NL ambiguities, where:

$$AMB_{r,RC}^s = \lambda_{NL}\left[\hat{N}_{r,L_2}^s + \frac{f_1}{f_1 - f_2}\hat{N}_{r,WL}^s\right].$$

If the WL ambiguity is resolved, the combined, refraction corrected (RC) float ambiguity term, $(AMB)_{r,RC}^s$, can be rewritten as:

$$(AMB)_{r,RC}^s = \lambda_{NL}\left[\hat{N}_{r,L_2}^s + \frac{f_1}{f_1 - f_2}\hat{N}_{r,WL}^s\right] + \quad (C14)$$

$$b_{r,NL} = \left[\hat{N}_{r,L_2}^s \lambda_{NL} + b_{r,NL}\right] + \frac{f_1}{f_1 - f_2}\hat{N}_{r,WL}^s \lambda_{NL}$$

Further, if the WL ambiguity is resolved, only $[N_{r,L_2}^s \lambda_{NL} + b_{r,NL}]$ needs be solved for, which is defined as the modified, RC float ambiguity term, denoted by the asterisk after satellite s.

$$(AMB)_{r,RC}^{s*} = \hat{N}_{r,L_2}^s \lambda_{NL} + b_{r,NL} \quad (C15)$$

The ambiguity is resolved in double-differenced (DD) and single-differenced (SD) form, where the receiver NL bias $b_{r,NL}$ is cancelled. Therefore, this SD modified RC float ambiguity term $\nabla(AMB)_{r,RC}^{s_i s_j *}$ is, in essence, an accurate representation of the SD NL ambiguity $\nabla N_{r,L_2}^{s_i s_j}$, consistent with the following equations:

$$\nabla(AMB)_{r,RC}^{s_i s_j *} = (AMB)_{r,RC}^{s_i *} - (AMB)_{r,RC}^{s_j *} = \left[\hat{N}_{r,L_2}^{s_i}\lambda_{NL} + b_{r,NL}\right] - \quad (C16)$$

$$\left[\hat{N}_{r,L_2}^{s_j}\lambda_{NL} + b_{r,NL}\right] = \left[\hat{N}_{r,L_2}^{s_i} - \hat{N}_{r,L_2}^{s_j}\right]\lambda_{NL} = \nabla\hat{N}_{r,L_2}^{s_i s_j}\lambda_{NL}$$

Similarly, the DD modified RC float ambiguity term is, in essence, an accurate representation of the DD NL ambiguity, consistent with the following equations:

$$\Delta \nabla (AMB)_{r_m r_n, RC}^{s_i s_j *} = \nabla (AMB)_{r_m, RC}^{s_i s_j *} - \nabla (AMB)_{r_n, RC}^{s_i s_j *} = \quad (C17)$$

$$\nabla \hat{N}_{r_m, L_2}^{s_i s_j} \lambda_{NL} - \nabla \hat{N}_{r_n, L_2}^{s_i s_j} \lambda_{NL} = \Delta \nabla \hat{N}_{r_m r_n, L_2}^{s_i s_j} \lambda_{NL}$$

τ is GNSS receiver clock state vector, as defined by the following equation:

$$\tau = \begin{pmatrix} \tau_G \\ \tau_R \\ \tau_E \\ \tau_C \\ \tau_Q \end{pmatrix} = \begin{pmatrix} 1 & 1 & 0 & 0 & 0 \\ 1 & 0 & 1 & 0 & 0 \\ 1 & 0 & 0 & 1 & 0 \\ 1 & 0 & 0 & 0 & 1 \\ 1 & 1 & 0 & 0 & 0 \end{pmatrix} \begin{pmatrix} TCXO \\ B_{G/Q} \\ B_R \\ B_E \\ B_C \end{pmatrix} = H^* B \quad (C38)$$

where:
$\tau_G$ is GNSS receiver clock state vector for GPS;
$\tau_R$ is GNSS receiver clock state vector for GLONASS;
$\tau_E$ is GNSS receiver clock state vector for European Galileo;
$\tau_C$ is GNSS receiver clock state vector for Beidou;
$\tau_Q$ is GNSS receiver clock state vector for QZSS;
TXCO represents the common oscillator which is same for all the clocks in rover receiver (e.g., which represents a universal or common clock state for each refraction corrected frequency and GNSS constellation);
$B_{G/Q}$ are the system bias (e.g., physical parameters), including oscillator and system code bias, for the GPS/QZSS GNSS constellation;
$B_R$ are the system bias, including oscillator and system code bias, for GLONASS GNSS constellation;
$B_E$ are the system bias, including oscillator and system code bias, for the European GNSS constellation;
$B_C$ are the system bias, including oscillator and system code bias, for the Beidou GNSS constellation;
Vector B represents the system bias (e.g., physical parameters), including oscillator and system code bias; and
Vector H represents a transformation matrix in which matrix coefficients represent a change in the GNSS receiver clock state vector for one or more constellations.

The single common clock state for each refraction corrected frequency and GNSS constellation represents the receiver TXCO offset, GNSS receiver system bias between constellations. The underlying relationships between any GNSS clock and the receiver TXCO offset will be reflected through dedicated variance-covariance propagation. Accordingly, the above design is particularly suitable for any combination of multi-GNSS systems. The overall clock state vector T can represent the following physical parameters in equation C38).

Based on the equation C38, the clock dynamic noise matrix $Q_\tau$ associated with the receiver clock state vector can be propagated in equation C38 via a predictive filter (e.g., Kalman filter) as follows:

$$Q_\tau = H^* Q_B^* H' \quad (C38)$$

where:
$Q_\tau$ is the clock dynamic noise matrix;
Vector H represents a transformation matrix for a current epoch in which matrix coefficients represent a change in the GNSS receiver clock state vector for one or more constellations between the current epoch and previous epoch;

$Q_\tau$ is the bias dynamic noise matrix; and
Vector H' represents the transformation for next epoch in which matrix coefficients represent a change in the GNSS receiver clock state vector for one or more constellations between the current epoch and the next epoch.

In the orbit solution module 38, the orbit solution ZD (e.g., Kalman) filter 404 applies summation, delay and feedback to the data to process or update one or more of the following state variables (e.g., coefficients):

a) Satellite orbit position [$x^s$ $y^s$ $z^s$], where the sensitivity coefficients are:

$$\left[ \frac{x^s - x_r}{\rho_r^s} \frac{y^s - y_r}{\rho_r^s} \frac{z^s - z_r}{\rho_r^s} \right]; \quad (C18)$$

b) Satellite clock and bias term $\tilde{\tau}^s$, where sensitivity coefficient is −1;
c) GNSS receiver clock and bias term $\tilde{\tau}_r$, where there is one parameter for each constellation and where, except for QZSS, the sensitivity coefficient is 1;
d) Tropospheric zenith delay wet component $Z_{wet}$, where the sensitivity coefficient is the tropospheric delay mapping function for the wet component $M_{wet}$;
e) Tropospheric horizontal gradients at north-south direction, where sensitivity coefficient is:

$$M_{wet} ctg(e) \cos(\alpha); \quad (C19)$$

f) Tropospheric horizontal gradients at east-west direction, sensitivity coefficient is $$M_{wet} ctg(e) \sin(\alpha); \quad (C20)$$

g) RC float ambiguity term $(AMB)_{r,RC}^s$, or $(AMB)_{r,RC}^{s*}$ for the case of WL ambiguity being resolved, where the sensitivity coefficient is $\lambda_{NL}$;
h) Satellite NL bias $b_{NL}^s$, where the sensitivity coefficient is −1.

Clock Solution Module

In one embodiment, the clock solution module 44 may comprise an clock zero-difference filter 408 and a network narrow-lane ambiguity resolution estimator (ARE). With the benefit of the results (e.g., float ambiguity states) of the pre-processing zero-difference filter 400, the clock zero-difference filter can be used to determine undifferenced or zero-differenced (ZD) ambiguity states or float ambiguity states associated with the raw carrier phase measurements (e.g., L1 raw carrier phase, L2 carrier phase, wide-lane difference of L1/L2 combination of carrier phase, or narrow-lane difference of L1/L2 combination of carrier phase) for one or more of the reference receivers 130 in the reference data network 32. Although the ZD ambiguity float states and other filter states can be shared to the extent that the shared filter states are timely, clock ZD filter may operate at a different update rate for the states than the other ZD filters in the correction data estimator 34.

With the benefit of the undifferenced or zero-differenced (ZD) ambiguity states or float ambiguity states associated with the raw carrier phase measurements or narrow-lane difference of the raw carrier phase measurements and the WL ambiguities provided by the measurement-pre-processing module 36 to provide constraints, the network narrow-lane ambiguity estimator (in association with the clock solution module 44) can estimate narrow-lane ambiguities (e.g., refraction corrected, fixed integer NL ambiguities) for one or more reference receivers 130 in the reference data network 32.

Slow Clock Solution Module

All or most of the measurements (e.g., carrier phase measurements) from reference data network 32 are collected, pre-processed and are batched when they arrives at the data processing center 118. The longer time the data processing center 118 or the correction data estimator 34 waits, the more measurements are collected that are available for processing, but the longer the delay and the greater the potential that the clock solution could become stale by the time it reaches the mobile receivers 20 of the end users. In certain embodiments, the slow clock solution module 44 or the correction data estimator 34 typically estimates thousands of states for determination of clock solutions. For example, the data processing center 118 can take up to several seconds to finish the computation process for the slow clock solutions. In order to reduce the correction latency and utilize the more measurements, the correction data estimator 34 uses two clock solutions including slow clock and low-latency clock solution. In the slow clock solution module 44, all the measurements are batched as long as they arrived before a fixed latency, such as 6-15 seconds.

The slow clock solution module 44 measurements and the clock zero-difference (ZD) filter (e.g., ZD Kalman filter) use similar measurements as the orbit solution module 38, except for several major differences. First, the slow clock solution module 44 runs or provides updates to the slow clock solution at a different rate such as every 30 or 60 seconds. In contrast, the orbit solution module 38 runs or provides updates to the orbital data or orbit solution every 300 seconds because clock corrections vary more quickly than orbit corrections. Second, in the slow clock solution module 44, all or most of the state variables remain the same or similar to the counterpart state variables in the orbit solution module 38, except the satellite-orbit-related states. The satellite-orbit-related states are not estimated, but use the orbit estimation results from orbit solution of the orbit solution module 38.

In one embodiment, the slow clock solution module 44 can output a complete set of global difference corrections or correction data 108 including one or more of the following corrections: satellite orbit corrections, satellite clock corrections, satellite WL biases, satellite NL biases and quality information. The slow clock solution module 44 can communicate correction data 108 and estimated tropospheric parameters to the low latency clock module 42. As used herein, "biases" that are not qualified as satellite or receiver biases will refer to satellite bias, such as satellite WL and NL biases. Reference receiver 130 bias is not of interest to global differential correction product and thus not solved for in the reference receivers 130, whereas mobile receiver 20 bias can be addressed in the mobile receiver 20.

The slow clock solution module 44 uses un-differenced refraction-corrected code and carrier phase observations to estimate satellite and receiver clocks, troposphere biases, satellite narrow-lane bias. In one embodiment, the orbit update rate is very low (e.g., 5 minute update rate) for orbit data and a slow clock update rate (e.g., 30 seconds) for slow clock, or even longer. Because a large number of ambiguities have to be estimated together with both receiver and satellites clock parameters, the computation by the data processing center 118 is time-consuming especially with ambiguity resolution and satellite bias estimation. The data processing center 118 or the correction data estimator 34 may wait for longer time to ensure enough measurements from the reference data network 32 (e.g., global network) are collected and processed when they arrive at data processing center(s) 118. The longer time the data processing center 118 waits, the more measurements are collected by the data processing center 118, which also results in longer delay for clock corrections to reach mobile receivers 20 of the end users in real-time on a timely basis. The data processing center 118 and the correction data estimator 34 keep the data corrections sufficiently timely in real-time for use by the rover receivers, such that the satellite clocks along with satellite biases preserve the integer nature of ambiguity resolution for rover receiver. The ambiguity fixing can reduce the convergence time and improve the accuracy of navigation by the mobile receivers 20 or rovers.

As illustrated in FIG. 4, in one configuration the low latency clock module 42 further comprises a delta clock filter 412. Although the modules are shown as separate blocks in the block diagram of FIG. 4, it is understood that the correction data estimator 34 illustrated in FIG. 3 and FIG. 4 may be implemented by one or more predictive filters, such as Kalman filters and that the blocks represent one possible interpretation of a illustrative software that can be used to facilitate or carry out the method and system described in this disclosure.

Figure 6:
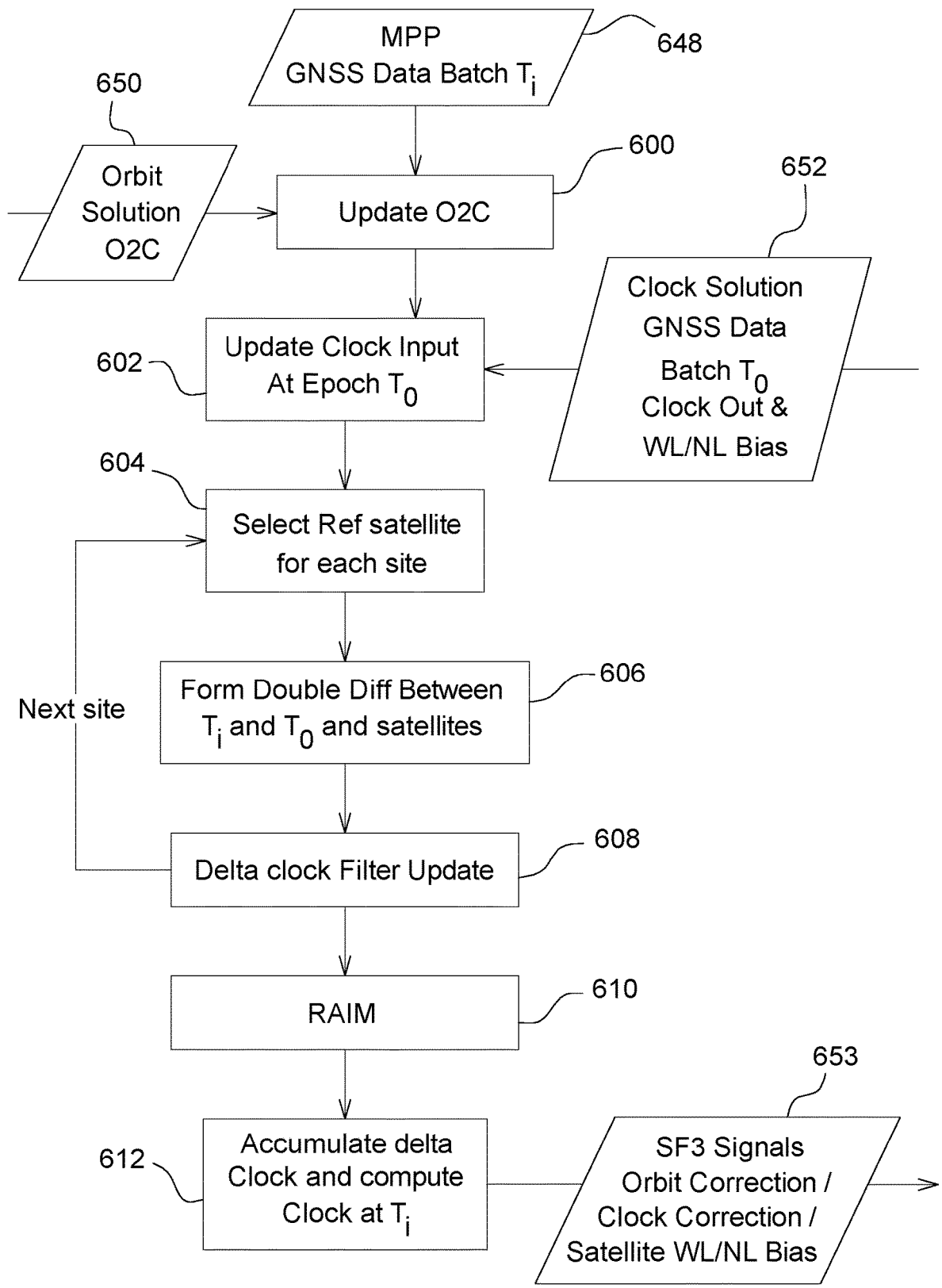
FIG. 6 is a flow chart of one embodiment method for providing a satellite correction signal with a precise, low-latency Global Navigation Satellite System (GNSS) satellite clock.

FIG. 6 is of one embodiment of a method for providing a satellite correction signal with a precise, low-latency Global Navigation Satellite System (GNSS) satellite clock. The method of FIG. 6 begins in block 600.

In block 600, the data processor 120, correction data estimator 34 or the orbit solution module 38 determines the predicted orbital data for a respective measurement time (e.g., epoch Ti), or an update to the predicted orbital data, based upon reference network data 746 (e.g., batch data or raw measurement data 747 for time or epoch Ti) received from one or more reference receivers 130 and previous predicted orbital data (e.g., for time T)) from the orbit solution module 38 or stored in a data storage device 124 (e.g., register, electronic memory, or non-volatile random access memory). Measurement time or epoch (e.g., Ti) can be a next epoch after a previous epoch or first epoch (e.g., T0). Further, the orbit solution module 38 can provide the predicted orbital data (e.g., predicted orbital data for measurement time or epoch Ti) or the update to the predicted orbital data, based on wide-lane ambiguities and corresponding wide-lane ambiguity bias data, where the wide-lane ambiguities and corresponding wide-lane ambiguity bias data are provided by the measurement pre-processing module 36.

In one example of carrying out block 600, the correction data estimator 34 or the orbit solution module 38 estimates the predicted orbital data (e.g., 02C data) over a few minutes at an orbit update rate, such as once every 300 seconds, from the time that orbit solution are fixed in low latency clock module 42. For example, the correction data estimator 34 or the orbit solution module 38 is configured to estimate or update the orbit solution data based on the orbit solution data 650 (e.g., previous or stored orbit solution data for epoch T0 or the last epoch) and the measurement pre-processing (MPP) GNSS data batch 648 for epoch Ti (e.g. next epoch after epoch T0 or the last epoch).

In block 602, the data processor 120, correction data estimator 34 or clock solution module 44 determines the clock input data, or an update of clock input at measurement time or epoch T0 based on the predicted orbital data (e.g., at measurement time or epoch Ti or epoch T0) and based upon any of the following: (a) clock solution GNSS data (e.g., slow clock solution data), (b) wide-lane bias data, and (c) narrow-lane bias data (e.g., batch data for epoch T0), and/or (d) network data 746 (e.g., batch data or raw measurement data 747 for time or epoch T0) received from one or more reference receivers 130. As used herein, measurement time or epoch Ti follows measurement time or epoch T0.

For example, in block 602, the data processor 120, correction data estimator 34 or clock solution module 44 determines the clock input data, or an update of the clock input that is updated at slow clock rate or at a slow clock interval based on a clock solution GNSS data 652 consistent with batch T0 or epoch T0, clock bias and WL/NL bias. Accordingly, a transition from measurement time T0 to measurement time Ti does not necessarily trigger an update of the clock input data, unless Ti is coincident with the next update interval of the slow clock process. For example, the pre-processed measurements from measurement pre-processing module 36 are batched and sent to low latency clock module 42 for block 604 after a few seconds waiting window (e.g., first update interval), such as 1-2 seconds. Meanwhile, the pre-processed measurements are sent to orbit/clock solutions module after longer period or window (e.g., a second update interval), such as 6-15 seconds.

After block 602, the method continues in block 604. In block 604, the data processor 120, correction data estimator 34, or low-latency module selects a reference satellite for each site of the reference network, or a pair of reference satellites for each reference receiver 130 of the reference network. For example, in one embodiment the correction data estimator 34 or the low-latency module selects the highest elevation satellite without cycle slips as a reference satellite for each reference site. Any difference in elevation between the reference receiver 130 and the mobile receiver 20 should be taken into account for tropospheric bias compensation. The tropospheric biases are corrected using a prior model and residual troposphere bias estimation from slow clock solution.

In block 606, the data processor 120, correction data estimator 34, or the low-latency module determines a double difference between the carrier phase measurements or narrow-lane carrier phase measurements at measurement times or epochs Ti and T0 and the pair of satellites. For example, the double difference is determined for carrier phase measurements at each reference receiver 130 at measurement times or epochs Ti and T0 and the pair of satellites. The double difference (DD) narrow-lane ambiguities are resolved to determine precise refraction-corrected carrier phase measurements for which certain biases are canceled out. For example, in double differencing techniques, one or more of the following biases can cancel out: receiver code phase bias (e.g., receiver code phase bias and satellite code phase bias), carrier phase bias (e.g., receiver phase bias and satellite phase bias) and clock bias (e.g., receiver clock bias and satellite clock bias), that are common between satellites and receivers and can be cancelled out by the double differencing operation between satellites and receivers. Some ionospheric propagation delay bias cancels out in the double-difference equations. The remaining atmospheric errors including ionospheric and tropospheric delay can be ignored after the double differencing for double differencing between the same reference receiver 130 at different times. However, an ionosphere error between different reference receivers 130 separated by long base-lines could be estimated and used by the correction data estimator 34.

In one embodiment, the low latency clock module 42 reduces the correction latency to improve clock accuracy with absolute clocks from slow clock solution. In order to improve computation efficiency, the double differencing measurements between time and satellites are used so that some unnecessary states such as ambiguity and receiver clocks are removed. The low-latency module or the delta clock filter 412 only estimates changes in states for satellite clock for processing efficiency and enhanced rapid availability/reduced latency of the correction data 108 for the mobile receivers 20.

In one example, the clock solution module 44 determines predicted orbital data, satellite bias data and satellite bias quality data (e.g., variance-co-variance data) based on the resolved double-differenced refraction corrected, narrow-lane ambiguities.

In block 608, the data processor 120, correction data estimator 34 or low latency clock module 42 receives the predicted orbital data, satellite bias data and satellite bias quality data (e.g., variance-co-variance data) based on the resolved double-differenced refraction corrected, narrow-lane ambiguities and provides a delta clock filter 412 update. Prior to the next update of the clock solution module 44 at the slow update rate in block 602, the low latency clock module 42 only estimates delta satellite clocks so that the computation can be updated at a low-latency rate that is greater than the orbit update rate of the orbit solution module 38 and the slow update rate of the clock solution module 44.

In one example of the method of FIG. 6, the method continues with block 604 after each iteration of blocks 604, 606 and 608 for each site or reference receiver 130, until all the calculations of blocks 604, 606 and 608 have been made for all sites or reference receivers 130 in the reference data network 32. Further, each iteration of blocks 604, 606 and 608 is consistent with providing low-latency correction data 108 at a low-latency intervals or a low-latency data rate.

In block 610, the data processor 120, the correction manager 740 or the low-latency clock applies a RAIM (receiver autonomous integrity monitoring) algorithm to the delta clock filter 412. The RAIM algorithm comprises software that uses an over-determined solution or redundant calculations to check the consistency of satellite measurements, such as carrier phase measurements and code phase measurements of one or more satellites for each reference receiver 130 in the network. The RAIM algorithm requires at least five satellites in reception range to detect a material carrier phase error measurement or material error in the clock correction for any satellite in the constellation. The correction manager 740 or data processor 120 may delete, suspend or flag (as suspect or unreliable) low-latency clock correction data 108 for one or more satellites that that is determined to be erroneous or unreliable such that the mobile receiver 20 or rover may ignore or provide less weight to low-latency clock correction data 108 that has been flagged as suspect or unreliable.

In one example of executing block 610, the received satellite signals, low latency clock module 42 or the delta clock filter 412 uses the a priori satellite clock rates from broadcast ephemeris to estimate delta satellite clocks as an error checking mechanism, such as supporting the RAIM algorithm. Within the low latency clock module 42, an additional predictive filter (e.g., Kalman filter or least squares estimator) can be used to estimate delta clock for the RAIM algorithm. Further, the estimated delta satellite clocks derived from the broadcast ephemeris can be compares to the estimated delta satellite clods associated with the predictive filter or lease squares estimator. The number of estimated state variables or unknowns is equal to the number of active satellites. The RAIM algorithm is used to ensure to detect and remove any measurement with cycle slips.

In block 612, the data processor 120, correction data estimator 34, or low latency clock module 42 accumulates delta clock data and computes the clock data that corresponds to measurement time or epoch Ti for incorporation into the correction data (108, 653) or low-latency correction data. For example, the low-latency correction data 108 incorporates precise orbital correction data 650, precise low-latency clock data, precise low-latency clock quality data, and wide-lane satellite bias data and narrow-lane satellite bias data on a satellite-by-satellite basis that can be applied to the particular satellites in view of or within reliable reception range of the mobile receiver 20. In one configuration, the correction data 108 can be globally valid in the GNSS system for each corresponding measurement time or epoch and for each satellite to which it pertains.

Figure 7:
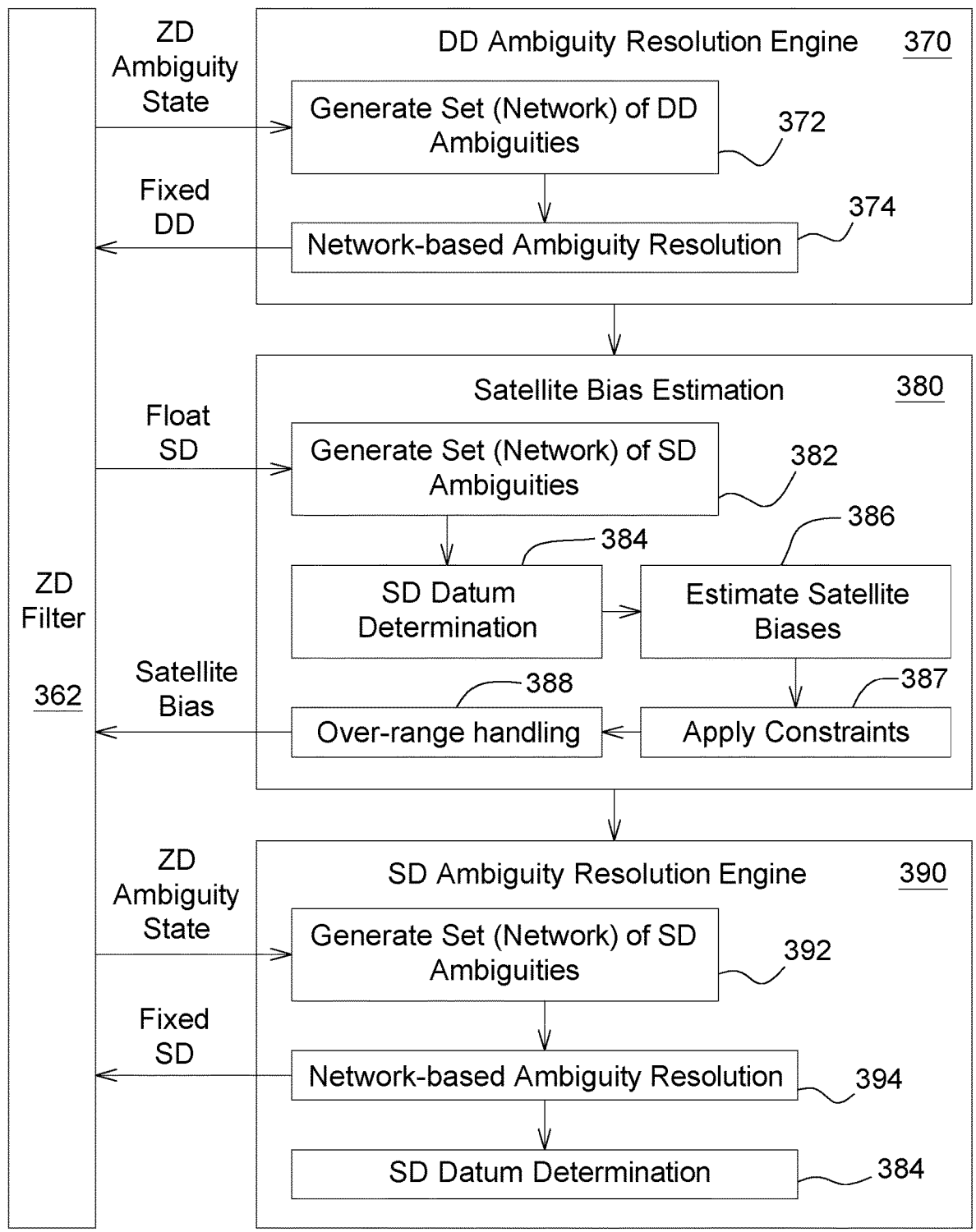
FIG. 7 is a block diagram of the preprocessor, orbit solution and clock solution modules according to some embodiments.

FIG. 7 is a block diagram of the measurement preprocessing module 36, orbit solution module 38 and clock solution module 44 shown in FIG. 4, according to some embodiments. Each of these modules include a zero difference filter 362, such as a zero difference Kalman filter, that generates and updates a zero difference ambiguity state and other state variables (described in more detail below), a double-difference ambiguity resolution engine 370, a satellite bias estimation module 380, and a single-difference ambiguity resolution engine 390. It is noted that in measurement preprocessing module 36, the ambiguities being resolved and the satellite bias values being determined are wide-lane ambiguities and satellite bias values, while in the orbit solution module 38 and clock solution module 44, the ambiguities being resolved and the satellite bias values being determined are narrow-lane ambiguities and satellite bias values.

The double-difference ambiguity resolution engine 370 determines a set of double-difference ambiguities based on ambiguity state variable estimates received from the zero difference filter 362, determines which of the double-difference ambiguities are ready for resolution in accordance with predefined criteria, and performs a network-based ambiguity resolution process 374, which determines double-difference fixed ambiguity values. For example, the double-difference ambiguity engine 370 comprises a generator 372 of DD ambiguities that generates or determines a set of double-difference ambiguities (e.g., ambiguity candidates with an applicable search space) based on ambiguity state variable estimates received from the zero difference filter 362.

It is noted that since the satellites are in flight, or in orbit, the distance between each reference station and the satellites in view is constantly changing. As a result, the ambiguity state output by the ZD filter 362 is being updated each measurement epoch (e.g., once per second), and the double-difference fixed ambiguity values are also being updated each epoch. Thus the double-difference fixed ambiguity values, each based on a combination of four float ambiguities, are "fixed" in that they have integer values, or an integer property, but the four float ambiguities are not constant due to slowly changing receiver phase bias, and instead are updated at the update rate or epoch rate of the module 36, 38 or 44. As explained in more detail below, the various module each have their own epoch rate. Similarly, the single-difference fixed ambiguity values generated by the single-difference ambiguity resolution engine 390 are updated each epoch. Furthermore, as the sets of satellites in view of the various reference stations change, due to movement of the satellites along their respective orbits, in some embodiments the SD datum, discussed below, is updated, and as needed, new satellite bias estimates are generated and provided to the ZD filter 362. Thus, in one embodiment, the computation processes performed by each of the modules are dynamic processes, with the ZD Kalman filter states generated by the ZD filter 362 of each module (e.g., measurement preprocessing module 36, orbit solution module 38, clock solution module 44) being updated once per epoch, and the external "filters" or "engines" (370, 380 and 390) also producing updated solutions to support the operation of the ZD filter 362.

The satellite bias estimation module 380 is invoked, to determine initial satellite bias values, once a sufficient quantity (e.g., at least half) of the double-difference ambiguities have been resolved (i.e., fixed DD ambiguities have been determined). Using a process described in more detail below, the fixed DD ambiguities, alone or together with SD float ambiguities, are used to estimate (i.e., determine) an initial satellite bias value for each satellite. Once the initial satellite bias value for each satellite has been estimated, the satellite bias values can be separated from the float DD ambiguities, which facilitates resolution of the double-difference ambiguities in subsequence computations (both by the satellite corrections generation system (e.g., 11 or 111 or the system of FIG. 4), and by navigation receivers (e.g., rovers 20).

Furthermore, once the initial satellite bias values have been determined by satellite bias estimation module 380, the initial satellite bias values are updated by the ZD filter 362 at a predefined rate, for example once per epoch or once per P epochs, where P is an integer greater than one, depending on the implementation. The satellite bias estimation module 380 may comprise a generation process (382) for a set of SD ambiguities (e.g., candidate ambiguities), a SD datum determination process 384 and an estimation process 386 for satellite biases based on the input of float SD ambiguities from the ZD filter 362, where the estimated satellite biases are applied to the constrain process 387.

If SD fix of ambiguities is ready for a given satellite, SD ambiguity constraints in SD ambiguity resolution engine 390 are applied to improve satellite bias values and other state estimation in the ZD filter 362 for that satellite. In some embodiments, satellite wide-lane bias values are updated at a rate of once per minute (i.e., at the update rate of the measurement preprocessing module 36), and satellite narrow-lane bias values are updated at a rate of once per 30 seconds (i.e., at the update rate of the clock solution module 44), but other update rates may be used in other embodiments. Satellite bias estimate module 380 is discussed in further detail below.

In some embodiments, single-difference ambiguity resolution engine 390 is invoked after the satellite bias estimation module 380 has generated a set of initial satellite bias values that satisfy predefined constraints (387) and which have been adjusted by over-range handling (388), as needed, to maintain the satellite bias values within a predefined range of values. For example, the satellite WL bias dynamic noise 503 in the ZD filter (362, 400, 501), which is available from the WL filters 504, may comprise a predefined constraint 387 for satellite WL bias estimation. Similarly, the satellite NL bias dynamic noise 510, which is available from the satellite code bias filters 512 (e.g., code-phase bias filters), may comprise a predefined constraint 387 for satellite NL bias estimation. In FIG. 7, satellite bias output from the satellite bias estimation module 380 refers to satellite WL bias estimates, or satellite NL bias estimates (e.g., for the corresponding module or modules (26, 38, 44).

The single-difference ambiguity resolution engine 390 determines a set of single-difference ambiguities (e.g., float single-difference ambiguities) based on ambiguity state variable estimates received from the zero difference filter 362, which, in turn, have been adjusted based on the fixed double-difference ambiguities determined by the double-difference ambiguity resolution engine 370. Using the determined set of single-difference ambiguities, the single-difference ambiguity resolution engine 390 determines which of the single-difference ambiguities are ready for resolution in accordance with predefined criteria, and performs a network-based ambiguity resolution process 394, which determines single-difference fixed ambiguity values. It is noted that once an initial set of single-difference fixed ambiguity values have been determined and provided to ZD filter 362, single-difference ambiguity resolution engine 390 updates the set of single-difference fixed ambiguity values in accordance with changes in the zero-difference ambiguity state, as received from the ZD filter 362. For example, the single-difference ambiguity engine 390 comprises a generator 392 of SD ambiguities that generates or determines a set of single-difference ambiguities (e.g., ambiguity candidates with an applicable search space) based on ambiguity state variable estimates received from the zero difference filter 362.

Notation

In the explanations that following the following symbols and notation conventions are used:

P is code measurement from satellite to receiver in meter;
Φ is phase measurement from satellite to receiver in cycle;
B is code bias due to satellite hardware delay and receiver related delay
b is phase bias due to satellite hardware delay, receiver related delay and un-modeled satellite phase wind-up errors
$b_{IFB}$ is the linear Inter-Frequency code bias, which is only applicable to frequency division multiple access (FDMA) signal, e.g., GLONASS
N is the integer ambiguity
f is the GNSS carrier signal frequency
λ is the GNSS carrier signal wavelength Frequency Notation Subscripts denote the applicable frequency associated with a quantity as follows:
$[\ ]_{L1}$ refers to L1 frequency,
$[\ ]_{L2}$ refers to L2 frequency,
$[\ ]_{WL}$ refers to wide-lane, L1−L2,
$[\ ]_{NL}$ refers to narrow-lane, L1+L2.

Receiver Notation

Subscripts that include the lower case letter r denote quantities associated with a particular receiver (e.g., a reference receiver) as follows:
$[\ ]_{r_1}$ refers to receiver $r_1$,
$[\ ]_{r_2}$ refers to receiver $r_2$.

Satellite Notation

Superscripts that include the lower case letter s denote quantities associated with a particular satellite as follows:
$[\ ]^{S_1}$ refers to satellite, $S_1$,
$[\ ]^{S_2}$ refers to satellite, $S_2$.

Differential Notation $\Delta[\ ]_{r_1 r_2}$ refers to single difference between receiver $r_1$ and $r_2$,
$\nabla[\ ]^{S_1 S_2}$ refers to single difference between satellite $S_1$ and $S_2$,
$\nabla \Delta[\ ]_{r_1 r_2}^{S_1 S_2}$ refers to double difference between receiver $r_1$ and $r_2$, and satellite $S_1$ and $S_2$ Ambiguity Notation The ambiguity scalar or vector form notation follows
$\hat{N}$ refers to the float ambiguity (sometimes called floating ambiguities),
$\lfloor \hat{N} \rfloor$ refers to the fractional part of the float ambiguity,
round($\hat{N}$) refers to the round off integer part of the float ambiguity,
N refers to the fixed integer ambiguity.

The ambiguities are often organized in a vector form. The ambiguity vector notation form is as follows:
$\hat{N}_{float}$ refers to the float ambiguity vector $\hat{N}_{float} = \{\hat{N}_1, \ldots, \hat{N}_j, \ldots, \hat{N}_n\}$, where $\hat{N}_j$ is the $j^{th}$ float ambiguity element,
$N_{fixed}$ refers to the fixed integer ambiguity vector $N_{fixed} = \{N_1, \ldots, N_j, \ldots, N_n\}$, where $N_j$ is the $j^{th}$ fixed integer ambiguity element,
$\overline{N}_i$ refers to the $i^{th}$ integer ambiguity candidate vector, as various ambiguity candidate vectors trials are made during the ambiguity search process,
$\hat{N}^j$ refers to the partial float ambiguity vector with the $j^{th}$ ambiguity element or more $\hat{N}_j$ removed. For example, when the full ambiguity vector cannot be fixed, a partial fix is attempted by removing some ambiguity elements.

Initial Satellite Wide-Lane Bias Determination

Figure 8:
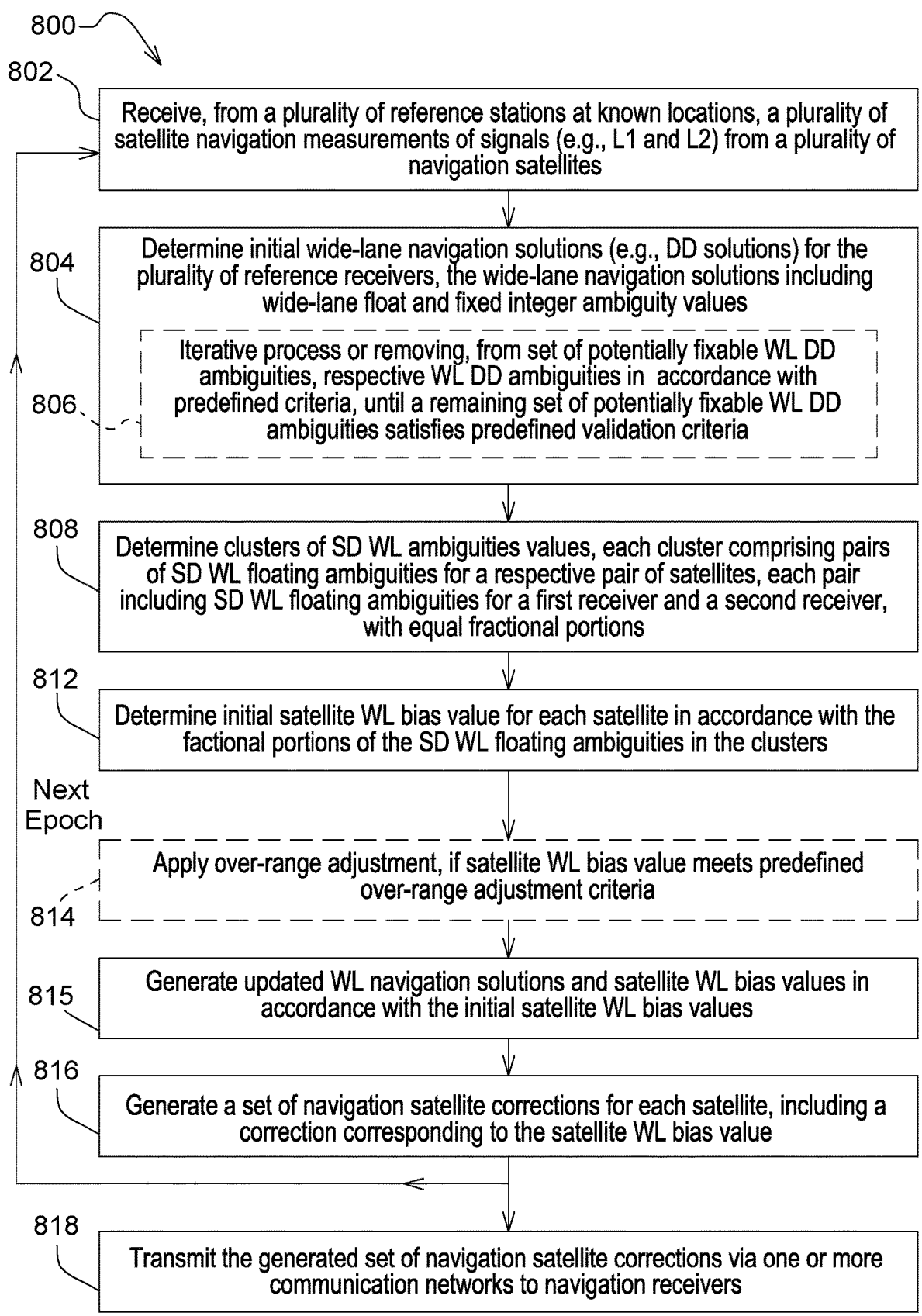
FIG. 8 is a flowchart of a process for generating navigation satellite corrections, include a correction corresponding to a satellite wide-lane bias for each satellite in a plurality of satellites, and for providing the generated navigation satellite corrections to navigation receivers, according to some embodiments.

FIG. 8 is a flowchart of a process 800 (also herein called method 800) for determining satellite wide-lane (WL) biases for a plurality of satellites, comprising n satellites, to facilitate navigation by navigation receivers that receive satellite navigation signals from various subsets of the plurality of satellites. FIG. 8 is a flowchart of a process 800 for resolving wide-lane double-difference and single-difference ambiguities in a measurement preprocessing module 36, and providing those solutions to orbit, clock and low latency clock modules (e.g., 38, 42, and 44 in FIG. 3 and FIG. 4), according to some embodiments. Process 800 concerns wide-lane bias determination, whereas the operation of measurement preprocessing module 36 is configured to resolve wide-lane ambiguities and provide those solutions to the other modules (e.g., orbit, clock and low latency clock modules).

Method 800 includes receiving (802) reference receiver measurement information, including receiving, from a plurality of reference receivers (e.g., reference receivers 130, FIG. 1A or FIG. 1B) at established locations, measurements of satellite navigation signals received by each of the reference receivers, wherein the satellite navigation signals received by each reference receiver of the plurality of reference receivers include satellite navigation signals at first (L1) and second (L2) frequencies. Typically, each reference receiver receives signals from at least four or five satellites that are within view of the reference receiver's GNSS antenna (e.g., antenna 260, FIG. 2).

As shown in FIG. 8, in process 800, the received values are used to update, for a next epoch, the measurement preprocessor's zero-difference (ZD) filter, and in particular the ZD wide-lane float ambiguities for each reference receiver and the ZD wide-land satellite biases, such as in step 815. For systems using signals from GLONASS satellites, the wide-lane inter-frequency bias (IFB) for each receiver is updated for the next epoch using the received measurements of satellite navigation signals.

Method 800 includes, in accordance with the received reference receiver measurement information, and in accordance with the established locations of the plurality of reference receivers, determining (804) initial wide-lane navigation solutions (of refraction-corrected wide-lane navigation solutions) for the plurality of reference receivers. For example, as discussed above, in some embodiments (and typically) the Melbourne-Wübbena linear combination $L_{r,WL}^s$ is used for wide-lane ambiguity resolution. As shown in FIG. 8, the Melbourne-Wübbena linear combination is iteratively updated (in 804 and 806) by the ZD filter of preprocessing module (MPP) 36, using the received measurements of satellite navigation signals.

The initial wide-lane navigation solutions include double-difference (DD) wide-lane fixed integer ambiguity values and single-difference (SD) wide-lane floating ambiguities. Further, in accordance with the initial wide-lane navigation solutions, for a constellation of n satellites in the plurality of satellites, method 800 includes determining (808) clusters (e.g., m clusters) of single-difference (SD) wide-lane floating ambiguities (e.g., where with respect to m clusters, m is an integer greater than one). Each cluster (e.g., of m clusters or n−1 clusters, where m equals n−1 for n satellites) of SD wide-lane ambiguity values comprises pairs of SD wide-lane floating ambiguities, $\nabla \hat{N}_{r_m}^{S_iS_j}$ and $\nabla \hat{N}_{r_n}^{S_iS_j}$, for a respective pair of satellites (e.g., satellites i and j). Each pair of SD wide-lane floating ambiguities includes first and second SD wide-lane floating ambiguities for a first reference receiver, $r_m$, and a second receiver, $r_n$, respectively, that receive satellite navigation signals from both satellites in the respective pair of satellites. Furthermore, the SD wide-lane floating ambiguities in each pair of SD floating ambiguities have equal fractional portions, $\lfloor \nabla \hat{N}_{r_m}^{S_iS_j} \rfloor = \lfloor \nabla \hat{N}_{r_n}^{S_iS_j} \rfloor$. For example, the fractional ambiguities are consistent with ambiguity clusters and SD ambiguity datum determination.

Method 800 also includes, determining (812) an initial satellite wide-lane bias value, $b_{WL}^s$, for each satellite s of the n satellites, in accordance with fractional portions of the SD wide-lane floating ambiguities in the m clusters. For example, see the above discussion of satellite bias estimation.

Furthermore, method 800 includes, in accordance with the determined initial satellite wide-lane bias value, $b_{WL}^s$, for each satellite s of the n satellites, generating (815) updated wide-lane navigation solutions for the plurality of reference receivers, including SD wide-lane fixed integer ambiguity values for the plurality of reference receivers. For example, in some embodiments, MPP ZD Kalman filter of the measurement preprocessing module 36 generates updated satellite wide-lane bias values and wide-lane navigation solutions at predefined intervals, often called epochs, using the initial satellite wide-lane bias values and initial wide-lane navigation solutions as initial values (e.g., as initial values for state variables corresponding to the DD wide-lane ambiguities and satellite wide-lane bias values).

Further, the method 800 includes generating (816) a set of navigation satellite corrections for each satellite of the n satellites, the set of navigation satellites corrections for each satellite s including a correction corresponding to the satellite wide-lane bias value, $b_{WL}^s$, determined for satellite s wherein the sets of navigation satellite corrections for the n satellites are for transmission to navigation receivers for use in determining locations of the navigation receivers.

In some embodiments, the sets of navigation satellite corrections for the n satellites are for transmission to navigation receivers for use in determining locations of the navigation receivers using an absolute mode of navigation, such as precise point positioning (PPP). Furthermore, in some embodiments, method 800 includes transmitting (818) the generated set of navigation satellite corrections for each satellite of the n satellites via one or more communication networks to navigation receivers for use in determining current locations of the navigation receivers using an absolute mode of navigation.

In some embodiments, method 800, performed by orbit solution system of FIG. 4, includes, combining raw GNSS measurements with information regarding detected phase slips and code outliers (i.e., clean GNSS measurements), resolved WL ambiguities (e.g., SD fixed ambiguities) in the MPP ZD filter 400, and the generated satellite WL biases, and sends the combined information to orbit solution, clock solution and low latency clock solution modules 38, 44 and 42, respectively.

In some embodiments, the number of clusters (see discussion of operations 808, 812, above), m, is equal to n−1, the satellite wide-lane bias value, $b_{WL}^s$, for each satellite s is a wide-lane phase bias value, and determining n−1 clusters of single-difference (SD) ambiguity values includes determining a set of fixed wide-lane double-difference (DD) ambiguity values with respect to the reference receivers and the plurality of satellites, each fixed wide-lane DD ambiguity value corresponding to a pair of the reference receivers and a pair of the satellites in the plurality of satellites. Further, each pair of SD wide-lane floating ambiguities, $\nabla \hat{N}_{r_m}^{S_iS_j}$ and $\nabla \hat{N}_{r_n}^{S_iS_j}$ for a pair of satellites $S_i$ and $S_j$ corresponds to a respective DD wide-lane fixed ambiguity value in the determined set of DD wide-lane fixed ambiguity values.

In some embodiments, determining (804) the initial set of fixed wide-lane DD ambiguity values with respect to the reference receivers and the plurality of satellites includes performing (806) an iterative process of removing respective float wide-lane ambiguities from a set of potentially fixable float wide-lane DD ambiguities in accordance with predefined criteria for identifying problematic float wide-lane DD ambiguities, until a remaining set of potentially fixable float wide-lane DD ambiguities satisfies predefined validation criteria. For example, see the above discussions of the LAMBDA search process, the partial LAMBDA search process, and identifying and removing problematic ambiguity elements.

In some embodiments, method 800 further includes periodically determining an updated set of fixed wide-lane double-difference (DD) ambiguity values with respect to the reference receivers and the plurality of satellites, and determining updates to the determined satellite wide-lane bias values for the n satellites in accordance with updated set of fixed wide-lane DD ambiguity values. For example, as described above, computations by preprocessing module 320 are repeated or updated periodically, during successive time intervals sometimes called epochs.

In some embodiments of method 800, determining a satellite wide-lane bias value, $b_{WL}^s$, for a respective satellite includes determining a median satellite wide-lane bias value from a set of satellite wide-lane bias values, determining whether a corresponding variance meets predefined criteria, and in accordance with a determination that the variance meets the predefined criteria, setting the satellite wide-lane bias value, $b_{WL}^s$, to the determined median satellite wide-lane bias value. For example, over-range adjustment is handled for satellite WL biases by the measurement preprocessing module 36, the orbit solution module 38, or the clock solution module 44, or any combination of the foregoing modules.

In some embodiments, method 800 includes applying (814) an over-range adjustment to a respective satellite wide-lane bias value if the respective satellite wide-lane bias value meets predefined over-range adjustment criteria. For example, in some such embodiments, determining (812) a satellite wide-lane bias value, $b_{WL}^s$, for a respective satellite includes determining whether the satellite wide-lane bias value meets over-range adjustment criteria, and in accordance with a determination that the satellite wide-lane bias value meets the over-range adjustment criteria, adjusting the satellite wide-lane bias value by a predefined number of wide-lane cycles, and adjusting corresponding SD wide-lane ambiguity values by the predefined number of wide-lane cycles. For example, as explained above with respect to preprocessor satellite WL bias over-range handling by the measurement preprocessing module 36, when a respective satellite WL bias value falls outside a predefined range, such as (−2, 2), the satellite WL bias value is decreased by an amount represented by $$\text{round}(b_{WL\_MPP\_SYS}^s),$$

which is typically equal to 2 or −2, and an corresponding adjustment is made for each satellite s related ambiguity $N_{r,WL}^s$ by adding the same amount.

In some embodiments of method 800, determining (812) the initial satellite wide-lane bias value, $b_{WL}^s$, for each satellite s of the n satellites includes comparing the determined satellite wide-lane bias value for each satellite s of the n satellites with a corresponding satellite wide-lane bias value determined when generating orbit and clock corrections for the n satellites, and adjusting the determined satellite wide-lane bias value for a respective satellite by an integer number of wide-lane cycles when an absolute value of a difference between the determined satellite wide-lane bias value and the corresponding satellite wide-lane bias value exceeds a predefined threshold. For example, see the above discussion of over-range handling for satellite WL biases in the orbit solution module 38 and clock solution module 44.

In some embodiments, determining the satellite wide-lane bias value, $b_{WL}^s$, for each satellite s of the n satellites includes the setting the satellite wide-lane bias values for the n satellites such that a sum of the satellite wide-lane bias values for the n satellites is equal to zero.

In some embodiments, the plurality of satellites are GLONASS satellites, which each transmit satellite navigation signals on first and second frequencies, L1 and L2, wherein different ones of the GLONASS satellites transmit satellite navigation signals in different first and second frequency bands, L1 and L2, wherein each GLONASS satellite s transmits a first satellite navigation signal with a center frequency $f_{L_1}^s$ in the L1 band of $$f_{L_1}^s = 1602 \text{ MHz} + n^s \times 0.5625 \text{ MHz}$$

and a second satellite navigation signal with a center frequency $f_{L_2}^s$ in the L2 band of $$f_{L_2}^s = 1246 \text{ MHz} + n^s \times 0.4375 \text{ MHz}$$

where $n^s$ is a frequency channel number assigned to satellite s, and the frequency channel number assigned to each satellite has an integer value between −7 and +6, inclusive. In such embodiments, method 800 includes determining, for each reference receiver in at least a subset of the plurality of reference receivers, a wide-lane inter-frequency bias (IFB) coefficient $k_r$, and for each satellite for which measurements of satellite navigation signals are received from the reference receiver, an inter-frequency bias value corresponding to a product of the wide-lane inter-frequency bias (IFB) coefficient $k_r$ for the reference receiver multiplied by the frequency channel number assigned to satellite s. Furthermore, in such embodiments, the satellite wide-lane bias value, $b_{WL}^s$, for each satellite s of the n satellites is determined in accordance with the inter-frequency bias values determined for at least a subset of the reference receivers.

In another aspect, a system, such as satellite corrections generation system (e.g., 11 or 111), described above with respect to FIG. 1A, FIG. 1B or FIG. 3, includes a plurality of interconnected computer systems that are configured to, collectively, execute a plurality of navigation satellite correction modules, which causes the plurality of navigation satellite correction modules to perform method 800.

In yet another aspect, a non-transitory computer readable storage medium (e.g., memory or data storage device 124 of FIG. 1A, FIG. 1B or FIG. 3) stores one or more programs for execution by one or more processors of a plurality of interconnected computer systems. The one or more programs include instructions that when executed by the one or more processors of the system cause the system to perform method 800.

The WL bias filtering and NL bias filtering system are improved by supplemental or additional innovative filtering techniques to augment and produce timely and highly accurate correction data, such as WL bias per satellite, NL bias per satellite, code-phase bias per satellite to address transient conditions, temporary anomalies or fluctuations in the GNSS carrier signals and/or encoded modulation components, such as the course-acquisition code, and PN codes, code-phase, and differential code phase. The correction data can be transmitted or broadcast wirelessly to mobile GNSS receivers or rover GNSS receivers of subscribers of a correction service to apply to position, velocity, acceleration, motion, attitude and location estimation and navigation that require centimeter level or better position resolution (e.g., reduced or minimized error in position determination with respect to North, East and U dimensions) for percent-age availability (e.g., 99 percent or better) of the position resolution, subject to actual propagation, geographic, radio signal interference and other technical conditions.

WL Bias Filtering System

Figure 5A:
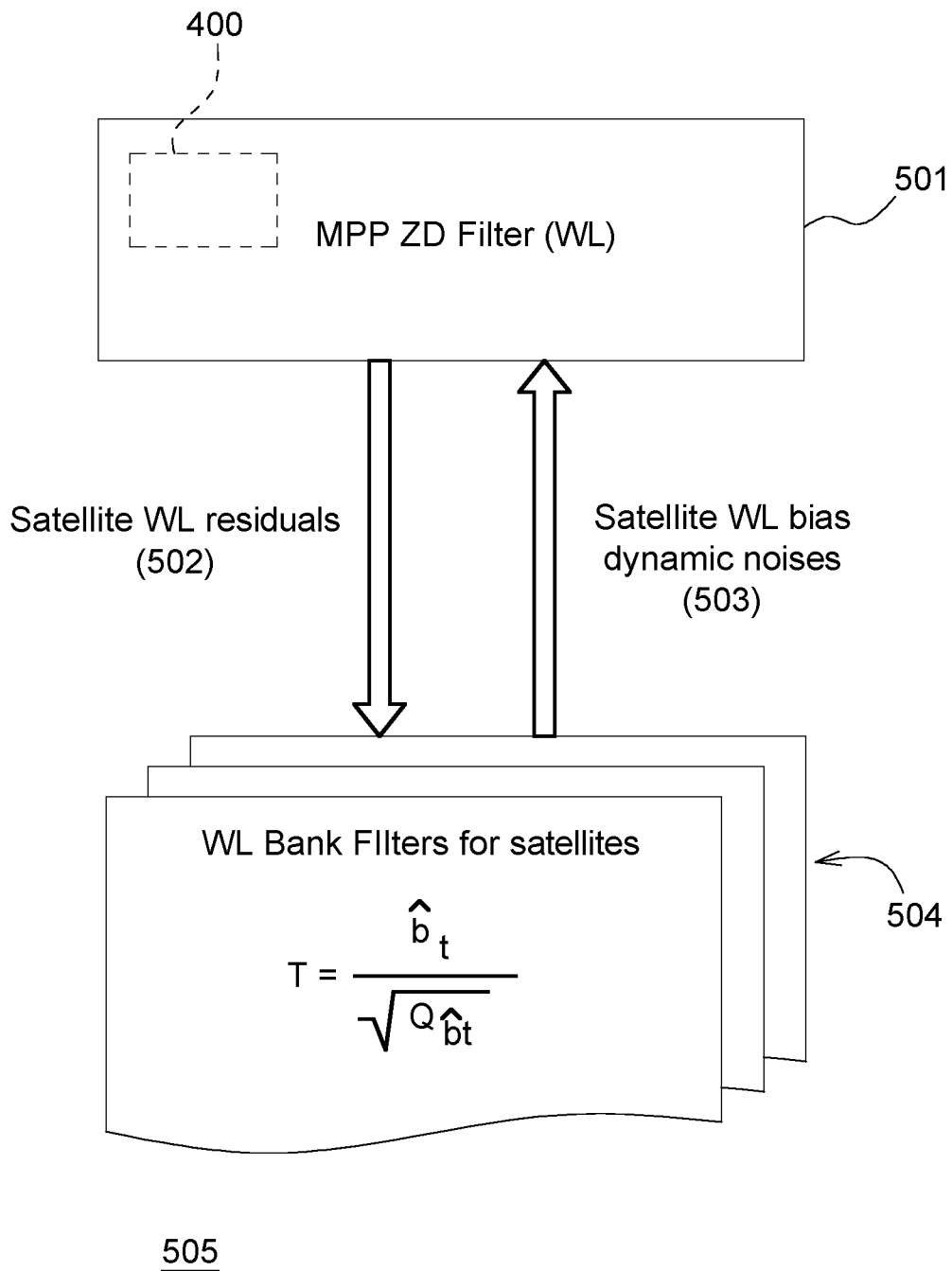
FIG. 5A is a block diagram of one embodiment of a WL filtering system.

In FIG. 5A, the WL (wide-lane) bias filtering system 505 comprises the main WL (wide-lane) ZD (zero-difference) filter (400, 501) and an additional or supplemental WL bias predictive filter (504) for each satellite (e.g., in view of within a reliable signal reception range, subject to any hardware data processing or memory limitations).

In one embodiment, the main WL ZD filter 501 may comprise an optional MPP ZD filter 400 of FIG. 4, as indicated by the dashed lines in FIG. 5A. The optional MPP ZD filter 400 of FIG. 5A may be configured to link to or communicate with a corresponding optional wide-lane estimator 37 (e.g., WL bias filter) illustrated in dashed lines in FIG. 4, where a bank or group of WL filters 504 may supplement the optional wide-lane estimator 37. For example, a bank or group of WL filters 504 is available for each satellite in view or within reliable signal reception range.

Cumulatively or separately, the WL bias filtering system 505 can replace, incorporate, link to, or communicate with, the WL ZD filter 400, alone or together with its corresponding optional WL estimator 37 (e.g., wide-lane bias estimator), in any of the drawings in the disclosure. In practice, each GNSS reference receiver has bank of supplemental WL bias predictive filters (504) and a bank of corresponding WL ZD filters (400, 501). Each WL ZD filter (400, 501) may comprise a predictive filter or first WL Kalman filter. Each supplemental WL bias predictive filter (504) may comprise a second WL Kalman filter. In the WL filtering system, the main WL ZD filter (400, 501) is coupled to the supplemental WL bias predictive filter (504) for communication of states, parameters or data. For instance, the main ZD filter or first WL Kalman filter provides WL residuals 502 (e.g., post-fit WL residuals) for a respective satellite to the supplemental WL bias predictive filter (504) for the respective satellite. In turn, the WL bias predictive filter 504 provides the dynamic noise 503 for one or more of the WL bias.

The WL bias for a satellite may be mapped to corresponding resolved DD integer ambiguities for the satellite or a cluster of satellites. Satellite wide-lane bias is not constant, but often changes slowly over time, such as within 0.05 cycles to 0.2 cycles (at WL frequency or bandwidth) deviation from the mean satellite wide-lane bias over a time period or series of epochs. However, under some conditions the satellite WL bias could change rapidly and/or with a greater deviation from the mean satellite WL bias because of external conditions outside the control of the receiver (e.g., GNSS mobile receiver and GNSS reference receiver); hence, there are two WL bias filtering modes in conjunction with the WL bias filtering system 505: (1) first WL filtering mode (e.g., conventional WL bias filtering mode) for slowly varying WL bias of any respective satellite and (2) a second WL filtering mode (e.g., time-variant WL bias filtering mode) for rapid and/or greater variations in WL bias of any respective satellite that may occur from time to time or in transient time periods. For any epoch or series of successive epochs, the two mutually exclusive filtering modes can be invoked individually and independently for any satellite within a constellation of satellites or that can be invoked individually and independently for a group of satellites within the constellation of satellites. In one embodiment, the first WL filtering mode (e.g., conventional WL bias filtering mode) is associated with an accompanying first set of Kalman filter constraints, parameters and states for the WL bias filtering system 505; the second WL filtering mode (e.g., time-variant WL bias filtering mode) is associated with an accompanying second set of Kalman filter constraints, parameters and filter states for the WL bias filtering system 505, which may comprise a pair of main WL ZD filter (400, 501) (e.g., first WL Kalman filter) and the supplemental WL bias predictive filter (504) (e.g., second WL Kalman filter) for each respective satellite.

Under the first WL filtering mode, in one configuration the main WL ZD filter (400, 501) assumes or receives verification that satellite bias changes slowly over time and/or the supplemental WL bias predictive filter (504) can verify that assumption or changes in that verification. Accordingly, in the first filtering WL mode (e.g., conventional WL bias mode), the main WL ZD bias filter or WL ZD filter (400, 501) applies a first WL tuned level of dynamic noise or first WL tuned range of dynamic noise based on the supplemental WL predictive filter's evaluation of WL residuals for the same satellite. Under a first example, the supplemental WL bias predictive filter (504) provides or outputs the first WL tuned level of dynamic noise, which may comprise a constant dynamic noise (e.g., $1e^{-8}$ watts or 10,000 picowatts) for wide-lane bias. Under a second example, the supplemental WL bias predictive filter (504) provides or outputs the first WL tuned range of dynamic noise, which may comprise a constant dynamic noise (e.g., approximately 5,000 picowatts to 15,000 picowatts) for wide-lane bias. The dynamic noise may be provided in the units of watts or dBm (decibel milliwatts). In one embodiment, the dynamic noise may be modeled as white noise with a Gaussian distribution.

However, under the second WL bias filtering mode (e.g., time-variant WL bias mode), the additional or supplemental WL bias predictive filter (504) may comprise a second Kalman filter (e.g., one-dimensional filter), or a residual WL bias filter to monitor the satellite residual WL bias to trigger/support application of second WL tuned dynamic noise (e.g., to replace the first WL tuned dynamic noise), where the second WL tuned dynamic noise is greater than the first WL tuned dynamic noise. The second WL tuned dynamic noise may comprise a dynamic noise (e.g., approximately $5e^{-6}$ watts or 5,000,000 picowatts) in the WL ZD bias filter (e.g., Kalman filter), for instance. Cumulatively with, or separately from, the selection of the second WL tuned dynamic noise, the additional or supplemental WL bias predictive filter (504) may comprise a second Kalman filter (e.g., one-dimensional filter), or a residual WL bias filter to monitor the satellite residual WL bias to trigger/support application of second WL tuned range of dynamic noise, where the second WL tuned range of dynamic noise is greater than the first WL tuned range dynamic noise.

The WL bias filtering system 505, first WL Kalman filter, or electronic data processor manages a transition between the first WL bias filtering mode and the second WL bias filtering mode (e.g., from the conventional WL bias filtering mode to time-variant WL bias filtering mode) based on the supplemental WL bias predictive filter's (504) (e.g., residual WL bias filter's) evaluating the satellite WL residuals for a particular satellite and generating a corresponding dynamic noise (e.g., first WL tuned dynamic noise or the second WL tuned dynamic noise). In one embodiment, the WL bias filtering system 505 applies the following equations for tuning or selection of WL dynamic noise and associated WL bias (filtering) modes.

The post-fit WL residuals (e.g., a component of $\varepsilon_{WL}^j$ in equation A8 or B2) of given satellites from all the receivers are fed into the WL bias filtering system 505 or the supplemental WL bias predictive filter (504) as measurements:

$$\hat{b}_{t+1} = \hat{b}_t \qquad (31)$$

$$Q_{\hat{b}_{t+1}} = Q_{\hat{b}_t} + q_{\hat{b}} \cdot \Delta t_{t,t+1} \qquad (32)$$

where $\hat{b}_t$ and $Q_{\hat{b}_t}$ are the satellite wide-lane residuals (e.g., WL residuals associated with resolved WL ambiguities, WL bias, or both for a given satellite) and the variance for a corresponding satellite, t and $\Delta t_{t,t+1}$ are the measurement time and interval of sampling, respectively, $q_{\hat{b}}$ is dynamic noise. The supplemental WL bias predictive filter (504) (e.g., residual WL bias filter) applies following test statistic or derived metric (T or $T_{WL}$) to determine whether the dynamic noise of the wide lane bias $q_{b_{WL_i}^j}$ is properly set or not (e.g., in the WL ZD filter (400, 501) or first WL Kalman filter):

$$T = \frac{\hat{b}_t}{\sqrt{Q_{\hat{b}_t}}} \qquad (33)$$

For example, if the WL bias predictive filter or electronic data processor determines that the derived metric or test statistic T (e.g., $T_{WL}$) in Eq 33 is greater than a specified threshold of the dynamic noise (e.g., first WL tuned dynamic noise or first WL tuned range of dynamic noise), the (a) the residual wide lane bias $\hat{b}_t$ is significant, and (b) it indicates that the first tuned dynamic noise $q_{b_{WL_i}^j}$ is set too small, and (c) the dynamic noise is required to increase (e.g., from a first tuned dynamic noise to a second tuned dynamic noise, or from a first tuned dynamic noise range to second tuned dynamic noise range) consistent with a transition from the first WL bias filtering mode (e.g., conventional WL bias filtering mode) to the second WL bias filtering mode (e.g., time-variant WL bias filtering mode).

Within the second WL bias filtering mode of the WL bias filtering system 505, the inflated scale could set be as $T^2$ (e.g., or bounded by a limit of 100 times the original scale)

to allow the WL bias to fluctuate with a greater deviation or limit from its mean WL bias over one or more epochs. For example, the revised dynamic noise may allow the WL bias to fluctuate with a greater deviation of 0.2 to 0.5 cycles (at the WL frequency or wavelength) from the mean WL bias of a particular satellite over one or more epochs. Further, the increase in the dynamic noise (e.g., of the first tuned dynamic noise) can be bounded with certain range (e.g., second tuned range of dynamic noise) such that the next dynamic noise could equal the previous dynamic noise multiplied by a suitable multiplier (e.g., 100) that is characteristic of the operational environment of the carrier signals and encoded modulation, such as any C/A and/or PN codes that modulate each carrier signal.

However, if the supplemental WL bias predictive filter (504) determines that the derived metric or test statistic T (e.g., $T_{WL}$) is less than the specified threshold of dynamic noise or the first tuned dynamic noise (e.g., approximately $1e^{-8}$ watts or 10,000 picowatts), the residual wide lane bias $\hat{b}_r$ is not significant, and it confirms that the previous dynamic noise $q_{b_{WL}^s}$ or first tuned dynamic noise (e.g., $1e^{-8}$ watts) or first tune range of dynamic noise is set properly; hence, the WL bias filtering system 505, such as the supplemental WL bias predictive filter (504) (e.g., second Kalman filter), WL ZD filter (400, 501), or both, can remain in the first WL bias filtering mode (e.g., conventional WL bias filtering mode).

The WL bias filtering system 505 is configured to determine whether to operate in a first wide-lane filtering mode with a corresponding first limited deviation (e.g., first WL threshold) of a next wide lane bias correction for a given satellite for a next epoch with respect to a previous mean of the WL bias from a series of previous successive epochs, or a second wide-lane filtering mode with a corresponding second limited deviation (e.g., second WL threshold) of a next wide lane bias correction for the given satellite for the next epoch, or a transient period thereafter, with respect to the previous mean that is greater than (outside the limits of) the first limited deviation (e.g., first WL threshold) for each corresponding satellite.

For each satellite within reception range, the supplemental WL bias predictive filter 504 (or the electronic data processor of the data processing center), is configured to determine a derived metric ($T_{WL}$) based on the WL residuals and their variance. Further, the supplemental WL bias predictive filter 504 is configured to provide to the WL ZD filter (400, 501), a second WL tuned dynamic noise (as a transition or the next setting for the next epoch) to replace the first WL tuned dynamic noise of the WL ZD filter (400, 501) (e.g., as the current setting for the current epoch and to transition from the first WL filtering mode to the second WL filtering mode) if the first WL tuned dynamic noise is greater than the derived metric, where the second WL tuned dynamic noise is greater than the first WL tuned dynamic noise and where the WL residuals associated with WL bias and corresponding resolved WL ambiguities pertain to a particular satellite.

For each satellite within reception range, the supplemental WL bias predictive filter 504 (or the electronic data processor of the data processing center), is configured to determine a derived metric ($T_{WL}$) based on the WL residuals and their variance. The supplemental WL bias predictive filter 504 is configured to provide to the WL ZD filter (400, 501), a first WL tuned dynamic noise (as maintenance of the next setting for the next epoch to remain in the first WL filtering mode) to maintain the first WL tuned dynamic noise of the WL ZD filter (400, 501) (as the current setting for the current epoch) if the first WL tuned dynamic noise is equal to or less than the derived metric, and where the WL residuals associated with WL bias and corresponding resolved WL ambiguities pertain to a particular satellite.

To the extent the WL bias filtering system 505, WL ZD filter (400, 501) (e.g., first Kalman filter), and the supplemental WL bias predictive filter (504) (e.g., residual WL bias filter or second Kalman filter) use the above test to transition between the first WL bias filtering mode and the second WL bias filtering mode made (e.g., from the conventional WL bias mode to time-variant WL bias mode), the technical approach has universal or general applicability. For example, the above test and technical approach can apply to various different operating conditions of the satellite and associated GNSS receiver on a satellite-by-satellite basis, including one or more of the following: (1) changes in transmit signal power of a satellite carrier signal, (2) changes in received signal-to-noise ratio of one or more satellite carrier signals, (3) interference to or fading of the satellite carrier signal, (4) change in or allocation of signal power to, between or among C/A code modulation, P1 (P(Y) code on L1) code modulation or P2 (P(Y) code on L2 modulation, (5) changes in the signal path of the transmit signal with the satellite, (6) switching to a redundant satellite transmitter on the same satellite, (7) changing of an active antenna or antenna array elements, or (8) switching to or activating a different satellite signal path of the satellite electronics with different thermal noise energy or a perceived satellite clock difference associated with the satellite signal path.

In an alternate embodiment, the transition between the WL filtering modes can be further managed by requiring not only the above test, but cumulatively additional factors including any of the following, which may be applied separately or cumulatively for any satellite: an observed material change per unit time in the signal to noise-ratio of carrier signals and/or an observed material change in the differential code bias between different code components, where the above additional factors can be measured in the measurement module or carrier phase measurement module of one or more reference receivers.

NL Bias Filtering System

Figure 5B:
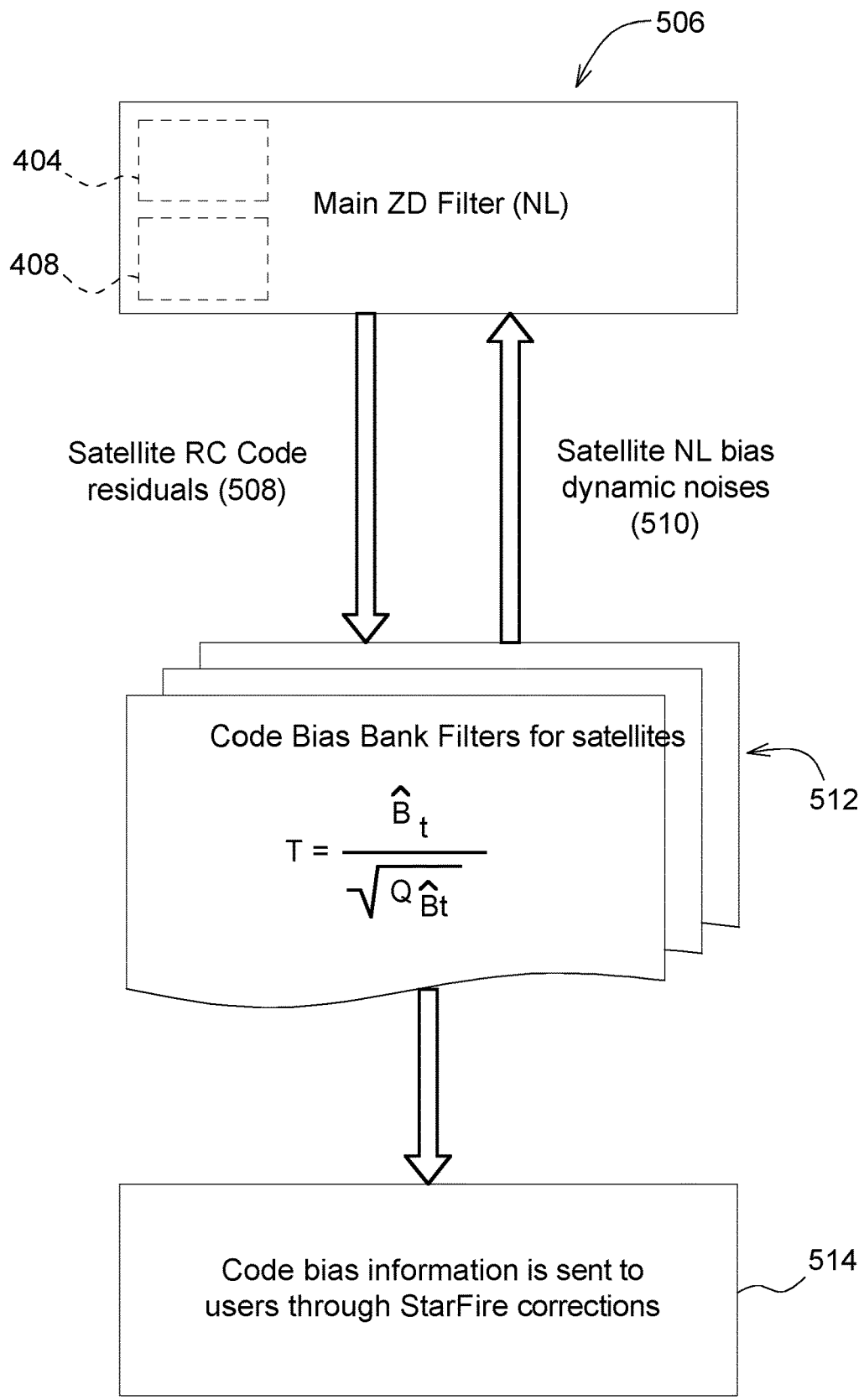
FIG. 5B is a block diagram of one embodiment of a NL filtering system.

In FIG. 5B, the NL (narrow-lane) bias filtering system 507 comprises a pair or set of a main NL (narrow-lane) ZD (zero-difference) filter (404, 408, 506) and a NL bias filter/code-phase bias filter 512 for each corresponding satellite. For example, the main NL ZD filter 506 is configured to communicate with a bank or group of code bias filters 512 for each satellite in view or within reliable signal reception range. In one embodiment, the main NL ZD filter 506 may comprise the orbit ZD filter 404, or the clock ZD filter 408, or both the orbit ZD filter 404 and the clock ZD filter 408. The orbit ZD filter 404 may be configured to link to or communicate with a corresponding optional narrow-lane estimator 39 (e.g., NL bias filter), illustrated in dashed lies in FIG. 4, where a bank or group of code bias filters 512 may supplement the optional narrow-lane estimator 39 for each satellite in view or within reliable signal reception range. Similarly, the clock ZD filter 408 may be configured to link to communicate with a corresponding optional narrow-lane estimator 43 (e.g., NL bias filter), illustrated in dashed lines in FIG. 4, where the bank or group of code bias filters 512 may supplement the optional narrow-lane estimator 39 for each satellite in view or within reliable signal reception range.

The clock solution module 44 and its clock ZD filter 408 uses the same measurements as the orbit solution module 38 and its orbit ZD filter 404, except the clock solution module 44 may operate a higher rate than the orbit solution module because the clock corrections tend to vary more quickly than orbit corrections. The orbit solution module 38 may operate an orbit refresh rate, orbit update rate, or orbit data processing clock rate that is less than the slow clock refresh rate, slow clock update rate, or slow clock processing clock rate and that is less than the low-latency clock refresh rate, the low-latency clock update rate and the low-latency processing clock rate. Further, while operating at slow clock refresh rate, slow clock update rate or slow clock processing clock rate, the clock solution module 44 can reference, access, rely on or leverage the orbit estimation results (of the orbit solution module 38), such as: (a) modeling and estimation of filter state variables, sensitivity coefficients of the orbit ZD filter (404), and (b) refining prior narrow-lane bias estimates for the epoch or a previous epoch, such as satellite narrow-lane bias, receiver narrow-lane bias, satellite narrow-lane phase bias, receiver narrow-lane phase bias, satellite narrow-lane code bias, and/or receiver narrow-lane code bias.

Cumulatively or separately, the NL bias filtering system 507 can replace, incorporate, link to, or communicate with the (NL) ZD filter (404 or 408), alone or together with its corresponding optional NL (bias) estimator (39 or 43), respectively, in any of the drawings in the disclosure. In practice, each GNSS NL bias filtering system comprises a NL bias predictive filter, a code phase bias filter, or both. The NL bias/code-phase bias filter 512 may be configured as a second NL Kalman filter. In the NL filtering system, the main NL ZD filter (404, 408, 506) is coupled to the NL bias filter/code-phase bias filter 512 for communication of states. parameters or data. For instance, the main ZD filter or first Kalman filter provides RC NL code residuals 508 for a respective satellite to the NL bias filter/code-phase filter 512 for the respective satellite. In turn, the NL bias filter/code phase filter 512 provides the dynamic noise 510 for one or more of the following biases: NL bias, the refraction-corrected (RC) NL (code) bias, and/or the code-phase bias.

The NL bias for a satellite may be mapped to corresponding resolved DD integer ambiguities for the satellite or a cluster of satellites. Satellite narrow-lane bias is not constant, but often changes slowly over time, such as within 0 cycles to approximately 0.2 cycles (at NL frequency or bandwidth) deviation from the mean satellite narrow-lane bias over a time period or series of epochs. However, under some conditions the satellite NL bias could change rapidly and/or with a greater deviation from the mean satellite NL bias, such as 0 to approximately 2 cycles (at the NL frequency or bandwidth) deviation from the mean NL bias over a time period or series of epochs because of external conditions outside the control of the receiver (e.g., GNSS mobile receiver and GNSS reference receiver); hence, there are two NL bias filtering modes: (1) first NL filtering mode (e.g., conventional NL bias filtering mode) for slowly varying NL bias of any respective satellite and (2) a second NL filtering mode (e.g., time-variant NL bias filtering mode) for rapid and/or greater variations in NL bias of any respective satellite that may occur from time to time or in transient time periods. For any epoch or series of successive epochs, the two mutually exclusive NL filtering modes can be invoked individually and independently for any satellite within a constellation of satellites or that can be invoked individually and independently for a group of satellites within the constellation of satellites. In one embodiment, the first NL filtering mode (e.g., conventional NL bias filtering mode) is associated with an accompanying first set of Kalman filter constraints, parameters and states; the second NL filtering mode (e.g., time-variant NL bias filtering mode) is associated with an accompanying second set of Kalman filter constraints, parameters and filter states.

Under the conventional NL bias filtering mode, the first main NL ZD filter (404, 408, 506) assumes or receives verification that satellite bias changes slowly over time from the NL bias filter/code-phase filter for the same particular satellite. In the first NL filtering mode the NL bias filter/code-phase bias filter 512 provides or outputs the first NL tuned level of dynamic noise to main NL bias filter or NL ZD filter (404, 408, 506) based on the NL bias filter/code-phase bias filter's evaluation of satellite RC code residuals. Under a first example, NL bias filter/code-phase bias filter 512 provides or outputs the first NL tuned level of dynamic noise, which may comprise a smaller and constant dynamic noise (e.g., $1e^{-7}$ watts or 100,000 picowatts) for narrow-lane bias. Under a second example, NL bias filter/code-phase bias filter 512 provides or outputs the first NL tuned range of dynamic noise for the NL bias. The dynamic noise may be provided in the units of watts or dBm (decibel milliwatts). In one embodiment, the dynamic noise may be modeled as white noise with a Gaussian distribution.

However, under the second NL bias filtering mode, the NL bias filter/code-phase bias filter 512 may comprise second NL Kalman filter, or a residual NL code-phase bias filter 512, to monitor the satellite RC code-phase residuals to trigger/support application of second NL tuned dynamic noise (e.g., to replace the first tuned dynamic noise), where the second NL tuned dynamic noise is greater than the first NL tuned dynamic noise. The second NL tuned dynamic noise (e.g., approximately $5e^{-5}$ watts) may comprise a dynamic noise, that is larger than the first NL tuned dynamic noise applicable in the NL ZD bias filter (e.g., first NL Kalman filter) or the NL bias filtering system 507. Cumulatively with, or separately from, the selection of the second NL tuned dynamic noise, the NL bias filter/code-phase filter may comprise a second Kalman NL filter (e.g., one-dimensional filter), or code-phase bias residual filter to monitor the satellite residual RC code phase to trigger/support application of second NL tuned range of dynamic noise, where the second NL tuned range of dynamic noise is greater than the first NL tuned range dynamic noise.

The NL bias filtering system 507, first NL Kalman filter, or electronic data processor manages a transition between the first NL bias filtering mode and the second NL bias filtering mode (e.g., from the conventional NL bias filtering mode to time-variant NL bias filtering mode) based on the supplemental NL bias filter/code-phase filter's evaluating the satellite refraction-corrected (RC) code-phase residuals for a particular satellite and generating a corresponding dynamic noise (e.g., first NL tuned dynamic noise or the second NL tuned dynamic noise). In one embodiment, the NL bias filtering system 507 applies the following equations for tuning or selection of NL dynamic noise and associated NL bias (filtering) modes:

The post-fit NL residuals (e.g., a component of $\varepsilon_{P_{RC}}^j$ in A15, A16 or residuals in C34) for a given satellites from all the receivers are fed into the NL bias filtering system 507, or the NL bias filter/code-phase filter, as measurements.

$$\hat{b}_{t+1} = \hat{b}_t \quad (N31)$$

$$Q_{\hat{b}_{t+1}} = Q_{\hat{b}_t} + q_{\hat{b}} \cdot \Delta t_{t,t+1} \quad (N32)$$

where $\hat{b}_t$ and $Q_{\hat{b}_t}$ are the satellite RC phase-code residuals (e.g., satellite NL bias residuals or any leading indicator of satellite NL bias) and the variance, t and $\Delta t_{t,t+1}$ are the measurement time and interval of sampling respectively, $q_{\hat{b}}$ is dynamic noise. The NL bias filter/code-phase filter applies the following derived metric or test statistic (T or $T_{NL}$) to determine whether the dynamic noise of the narrow lane bias $q_{b_{NL}{}^s}$ is properly set or not (e.g., in the main NL ZD filter (404, 408, 506) or first NL ZD filter (404, 408, 506)).

$$T = \frac{\hat{b}_t}{\sqrt{Q_{\hat{b}_t}}} \quad \text{(N33)}$$

For example, if the NL bias filter/code-phase filter determines that the derived metric or test statistic T (e.g., $T_{NL}$) in equation 57 is greater than a specified threshold of the dynamic noise (e.g., first NL tuned dynamic noise level or first NL tuned dynamic range), then: (a) the RC code-phase residual is significant, (b) it indicates that the dynamic noise $q_{b_{NL}{}^s}$ is set too small, and (c) the dynamic noise is required to increase consistent with a transition from the first NL filtering mode to the second NL filtering mode.

Alternately, the NL bias filter/code phase filter determines that the derived metric or test statistic T in equation 57 is greater than a specified threshold of the dynamic noise based on any material change or limit exceeded in the RC code-phase residual associated with the narrow-lane bias $b_{NL}{}^s$, such that the narrow-lane bias $b_{NL}{}^s$ may be subject to (future predicted) greater deviation from its mean narrow lane bias.

Within the second NL filtering mode (e.g., time-variant NL bias filtering mode), the inflated scale could set be as $T^2$ (e.g., or bounded by a limit of 100 times the original scale) to allow the NL bias to fluctuate with a greater deviation or limit from its mean NL bias over one or more epochs. For example, the revised dynamic noise may allow the NL bias to fluctuate with a greater deviation of 0 to approximately 2 cycles (at the NL frequency or wavelength) from the mean NL bias of a particular satellite over one or more epochs. Further, the increase in the dynamic noise (e.g., first NL tuned dynamic noise) can be bounded with certain range such that the next dynamic noise (e.g., second NL tuned dynamic noise) could equal the previous dynamic noise multiplied by a suitable multiplier (e.g., 100) that is characteristic of the operational environment of the signal-to-noise ratio of carrier signals and encoded modulation, such as any C/A and/or PN codes that modulate each carrier signal.

However, if the derived metric or test statistic T (e.g., $T_{NL}$) is less than the specified threshold of dynamic noise (e.g., $1e^{-7}$ watts or 10,000 picowatts), the RC code-phase residuals associated with the NL bias $q_{b_{NL}{}^s}$ have not changed significantly, which indicates or confirms that the previous dynamic noise (e.g., first NL tuned dynamic noise, such as $1e^{-7}$ watts) of the NL bias, $q_{b_{NL}{}^s}$ is set properly; hence, the NL bias filter (e.g., Kalman filter) or NL ZD filter (404, 408, 506) can remain in the first NL bias filtering mode (e.g., conventional NL bias filtering mode).

The data processing center or the NL bias filtering system 507 has bank of supplemental NL bias filter/code-phase bias and a bank of corresponding NL ZD filters (404, 408, 506). In one embodiment, the main NL ZD filter (404, 408, 506) comprises a predictive filter, such as first NL Kalman filter; the NL bias filter/code-phase bias filter 512 comprises a NL The NL bias filtering system 507 is configured to determine whether to operate in a first narrow-lane filtering mode with a corresponding first limited deviation (e.g., first NL threshold) of a next narrow-lane bias correction for a given satellite for a next epoch with respect to a previous mean of the NL bias from a series of previous successive epochs, or a second narrow-lane filtering mode with a corresponding second limited deviation (e.g., second NL threshold) of a next narrow-lane bias correction for the given satellite for the next epoch, or a transient period thereafter, with respect to the previous mean that is greater than (outside a limit of) the first limited deviation (e.g., first NL threshold) for each corresponding satellite.

For each satellite within reception range, the supplemental NL bias filter/code-phase filter (or the electronic data processor of the data processing center) is configured to determine a derived metric ($T_{NL}$) based on the refraction-corrected code residuals (e.g. RC code-phase bias residuals) and their variance. The NL bias filter/code-phase filter is configured to provide to the NL ZD filter, a second NL tuned dynamic noise (as a transition or the next setting for the next epoch to transition from the first NL filtering mode to the second NL filtering mode) to replace the first NL tuned dynamic noise of the NL ZD filter (as the current setting for the current epoch) if the first NL tuned dynamic noise is greater than the derived metric, where the second NL tuned dynamic noise is greater than the first NL tuned dynamic noise and where the RC code residuals associated with NL bias and corresponding resolved NL ambiguities pertain to a particular satellite.

For each satellite within reception range, determining, the supplemental NL bias filter/code-phase filter (or the electronic data processor of the data processing center), is configured to derive metric ($T_{NL}$) based on the refraction-corrected code residuals (e.g. RC code-phase bias residuals) and their variance. The NL bias filter/code-phase filter is configured to provide to the NL ZD filter, a first NL tuned dynamic noise (as the next setting for the next epoch) to maintain the first NL tuned dynamic noise of the NL ZD filter (as the current setting for the current epoch) if the first NL tuned dynamic noise is less than or equal to the derived metric, where the RC code residuals associated with NL bias and corresponding resolved NL ambiguities pertain to a particular satellite.

RC NL Code-Phase Residuals and Correction Signal Generation/Augmentation

The NL filtering system comprises a pair of main NL ZD filter (404, 408, 506) and a NL bias filter/code-phase bias filter 512 for each corresponding satellite. In one embodiment, the main NL ZD filter (404, 408, 506) comprises a predictive filter, such as first NL Kalman filter; the NL bias filter/code-phase bias filter 512 comprises a predictive filter, such as a second NL Kalman filter. In the NL filtering system, the main NL ZD filter (404, 408, 506) is coupled to the NL bias filter/code-phase bias filter 512 for communication of states or data. For instance, the main NL ZD filter (404, 408, 506) or first Kalman filter provides RC NL code residuals for a respective satellite to the NL bias filter/code-phase filter for the respective satellite. In turn, the NL bias filter/code-phase filter provides the dynamic noise (e.g., first NL tuned dynamic noise, second NL tuned dynamic noise, first NL tuned dynamic noise range, or second NL tuned dynamic noise range) for NL bias. Further, the NL bias filter/code phase filter can determine the contents of the correction signal based on the NL bias/filter code phase filter's evaluation of the refraction-corrected (RC) code-phase residuals.

In one embodiment, one or more GNSS constellations, such as GPS, GLONASS, GALILEO, BEIDOU and QZSS, can be integrated in one predictive filter (e.g., Kalman filter) related to updating and managing the narrow-lane float ambiguity variance-covariance matrix. The float ambiguity variance-covariance matrix update shall include receiver bias update for each GNSS constellation as set forth below:

$$Q_{\hat{N}_{NL}}^n = Q_{\hat{N}_{NL}}^{n-1} + \begin{pmatrix} 1 & \cdots & 1 \\ \vdots & \ddots & \vdots \\ 1 & \cdots & 1 \end{pmatrix} q_{b_r,NL} \cdot \Delta t_{n-1,n} \qquad (21)$$

where:
$Q_{\hat{N}_{NL}}^n$ is the residual satellite RC NL bias for the current epoch, current measurement interval, or current update of the predictive filter;
$Q_{\hat{N}_{NL}}^{n-1}$ is the residual satellite RC NL bias for the previous epoch, previous measurement interval, or previous update of the predictive filter;
$q_{b_{r,NL}}$ is the dynamic noise for NL receiver bias; and
$\Delta t_{n-1,n}$ is the measurement time or sampling interval of the previous epoch, previous measurement interval, or previous update of the predictive filter.

The satellite NL bias variance is also updated as follows:

$$Q_{b_{NL}^s}^n = Q_{b_{NL}^s}^{n-1} + q_{b_{NL}^s} \cdot \Delta t_{n-1,n} \qquad (22)$$

The dynamic noise $q_{b_{NL}^s}$ for satellite NL bias supports reliable and accurate estimation of the satellite NL bias. Further, the dynamic noise also has a significant impact on GNSS receiver navigation performance. If the dynamic noise is estimated (e.g., or set) to be too large, the rapid change of NL satellite bias, which includes both code and phase bias, can be reflected in the estimation. However, the NL bias accuracy could be degraded; hence, may be susceptible to degraded GNSS receiver navigation performance. If the dynamic noise is estimated to be (e.g., or set) too be too small, the estimated NL bias could be improperly biased, which would not reflect rapid change of satellite transmit power or fading, such as caused by GPS flex power of carrier signals. Further, the RC NL code may diverge from the true steady-state values in the GNSS receiver after initialization and resolution of the NL ambiguities. In order to optimally tune the dynamic noise for satellite NL bias, a bank of one-dimensional filters, which include one filter for each satellite can be configured to support adaptive estimation of satellite narrow-lane bias.

The residual refraction-corrected (RC) code-phase biases for any corresponding satellite exhibits a high degree of temporal correlation for short time spans. The RC code-phase biases for a respective satellite can be represented as a function of time for short periods of up to a few minutes. The same or similar assumptions support a Gauss Markov process for the systematic bias as following equations (55-56).

$$B_{t+1} = B_t \qquad (55)$$

$$Q_{B_{t+1}} = Q_B + q_B \cdot \Delta t_{t,t+1} \qquad (56)$$

where $\hat{B}_t$ and $Q_{\hat{B}_t}$ are the residual satellite RC code-phase bias and the variance, t and $\Delta t_{t,t+1}$ are the measurement time and interval of sampling respectively, $q_B$ is dynamic noise for RC code-phase bias. The NL bias filter/code-phase bias filter 512 determines the following derived metric or test statistic (T or $T_{NL}$) to determine whether the dynamic noise of the narrow lane bias $q_{b_{NL}^s}$ indicates augmentation of the correction signal with code-phase bias data for any respective satellite, or transmission or broadcast of such augmented signal to GNSS mobile receivers or rovers with correction service subscription:

$$T = \frac{\hat{b}_t}{\sqrt{Q_{\hat{b}_t}}} \qquad (57)$$

In one embodiment, post-fit RC NL code residuals (e.g., a component of $\varepsilon_{P_{RC}}^j$ in A15, A16 or residuals in C34) for any given satellite from a set or cluster of reference receivers (e.g., all reference receivers) are fed into the NL filtering system (e.g., NL bias/code-phase bias filter 512) as measurements to estimate residual satellite RC code-phase bias for the given satellite. The RC code-phase bias should be close to or approach zero in normal case in equation 55. For the correction signal augmentation or broadcast, the default dynamic noise of the code-phase bias or RC code phase bias $q_B$ could be set dynamic noise values such as (e.g., approximately $5e^{-5}$ watts or 50,000,000 picowatts), which is typically larger than the dynamic noise (e.g., of approximately $1e^{-7}$ watts or 100,000 picowatts) for narrow-lane bias $q_{b_{NL}^s}$. The dynamic noise may be provided in the units of watts or dBm (decibel milliwatts). In one embodiment, the dynamic noise may be modeled as white noise with a Gaussian distribution.

With respect to the phase-code bias, the derived metric or test statistic can be used to decide data processing and computer resource allocation related to any of the following phase-code bias correction parameters: (1) to determine phase-code bias for one or more respective satellites, (2) to determine phase-code bias or differential phase code bias for corresponding course acquisition code (C/A), PN code, P(Y) code, P(1) or P(2) that modulate on or more carriers signals of one or more respective satellites, (3) to incorporate phase-code bias data into the correction signal, and (4) to broadcast the phase-code bias data. Separately or cumulatively, the above phase-code bias correction parameters are not transmitted with the correction signal in a primary mode and transmitted to the correction signal in the secondary mode.

If NL bias filter/code-phase bias filter 512 determines that the derived metric or test statistic T (e.g., $T_{NL}$) in equation 57 is less than a threshold of dynamic noise (e.g., approximately $5e^{-5}$ watts), the residual RC NL code-phase bias $\hat{B}_t$ for a corresponding satellite is not significant, and it confirms that the previous dynamic noise $q_B$ (e.g., approximately $5e^{-5}$ watts) is set properly; hence, the NL bias filtering system 507 (e.g., Kalman filter) or NL ZD filter (404, 408, 506) can remain in the primary mode, in which the above phase-code bias correction parameters are not transmitted to rover or mobile GNSS stations that subscribe the correction service. Further, in the primary mode because the residual RC NL code bias is not significant or material, the residual satellite RC NL code bias is not incorporated into the correction signal. For instance, not determining the code-phase bias or code-phase bias correction parameters can reduce data processing requirements, energy consumption, and the required wireless bandwidth (e.g., satellite bandwidth) to transmit correction signals from a ground station to a communications satellite that repeats or retransmits the signals to rovers or mobile GNSS receivers that subscribe to a satellite correction service.

However, if the NL bias filter/code-phase bias filter 512 determines the derived metric or test statistic T (e.g., $T_{NL}$) is greater than the specified threshold, the residual RC code-phase bias $\hat{B}_t$ is significant; hence, it indicates that the dynamic noise $q_B$ (e.g., approximately $5e^{-5}$ watts) is set too small and is required to increase consistent with the secondary mode. Within the secondary mode, the inflated scale could set be as $T^2$ (e.g., or bounded by a limit of 100 times the original scale) to allow the code-phase bias (e.g., or RC code-phase bias) to fluctuate with a greater deviation or limit (e.g., typically measured in meters) from its mean code-phase vias (e.g., RC code-phase bias) over one or more epochs. For example, the increase in the dynamic noise can be bounded with certain range such that the next dynamic noise could equal the previous dynamic noise multiplied by a suitable multiplier (e.g., 100) that is characteristic of the operational environment of the carrier signals and encoded modulation, such as any C/A and/or PN codes that modulate each carrier signal. In the secondary mode when the derived metric or test statistic T (e.g., $T_{NL}$) is significant, the residual satellite RC code-phase bias in equation 55 from clock solution will be broadcast out with orbit, clock and WL/NL bias and are used by the rover as known parameters to help positioning and navigation in real time. The equation 57 is used to adaptively increase dynamic noise for the satellite narrow-lane bias state in orbit and clock solution. It also decides whether satellite code-phase bias are broadcast or not.

A first WL filter comprises a main WL ZD filter (400, 501) for a corresponding satellite and a second WL filter comprises a supplemental WL bias predictive filter (504) (e.g., residual WL bias filter) for the corresponding satellite. In one embodiment, the supplemental WL bias predictive filter (504) (e.g., residual WL bias filter) determines the operational dynamic noise level or range of the WL ZD filter (400, 501) or whether the WL ZD filter (400, 501) operates in a first filtering mode (e.g., conventional WL bias filtering mode or in a second filtering mode (e.g., time-variant WL bias filtering mode). In one embodiment, the WL ZD filter (400, 501) and the supplemental WL bias predictive filter (504) each comprise a Kalman filter. Typically, a bank of first WL ZD filters (400, 501) and supplemental WL bias predictive filters (504) are configured such that a pair of WL ZD filter (400, 501) and supplemental WL bias predictive filters (504) (e.g., residual WL bias filters) are available for each respective satellite.

A first NL filter comprises NL ZD filter (404, 408, 506) for a corresponding satellite and a second NL filter comprises a NL bias filter/code-phase filter (e.g., refraction corrected code residual NL bias filter) for the corresponding satellite. The NL bias filter/code-phase filter determines the dynamic noise level, constraint or parameter for the NL ZD filter (404, 408, 506) or whether the NL ZD filter (404, 408, 506) operates in a first NL filtering mode (e.g., conventional NL bias filtering mode) or in a second NL filtering mode (e.g., time-variant NL bias filtering mode). In one embodiment, both the NL ZD filter (404, 408, 506) and the NL bias/code-phase filter each comprise Kalman filters. Typically, a bank of first NL filters and second NL filters are configured such that a pair of a NL ZD filter (404, 408, 506) and a NL bias filter/code-phase filter are available for each respective satellite.

The NL bias filter/code-phase filter (e.g., RC code residual filter) monitors or evaluates the code-phase residuals that are provided by the main NL ZD filter (404, 408, 506) to the NL bias filter/code-phase filter (e.g., RC code residual NL filter). Further, the RC code residual filter can provide code-phase bias information to be incorporated or available for incorporation into the correction signal or correction data message for broadcast or wireless transmission the subscribers of mobile or rover GNSS receivers.

Wide lane or wide-lane carrier phase refers the combination or difference of carrier phase measurements of L1 and L2 signals, where the wide-lane wavelength results from the subtraction of the L1 and L2 carriers. An alternate wide-lane carrier phase may refer to the combination of L2 and L5 carrier phase signals, instead of the conventional wide-lane carrier phase of the L1 and L2 signals.

The narrow lane or narrow-lane refers to the combination or sum of carrier phase measurements of the L1 and L2 signals, where the narrow-land wavelength results from the addition of the L1 and L2 carriers. An alternate narrow-lane carrier phase may refer to the combination of L2 and L5 carrier phase signals, instead of the conventional narrow-lane carrier phase of the L1 and L2 signals.

Differential code bias includes any of the following: (1) a difference between pairs of code phases of the P1 and P2 carrier signals for a respective satellite or set of satellites of one more GNSS systems (e.g., GPS P1-GPS P2; GLONASS P1-GLONASS P2) for common epochs or sampling intervals; (2) a difference between pairs of P1 carrier and L1C1 carrier signals for a respective satellite or set of satellites of one or more GNSS systems (e.g., GPS P1-GPS L1C1 or P1-C1) for common epochs or sampling intervals; (3) a difference between pairs of code phases of the P2 carrier and L2C carrier signals for a respective satellite or set of satellites (e.g., GPS P2-GPS L2C1 or P2-C1) of one or more GNSS systems for common epochs or sampling intervals. P1 means the pseudo random noise code or P(Y) code on the L1 carrier; P2 means the pseudo random noise code P(Y) code on the L2 carrier; C1 means the course-acquisition code (C/A) code of the L1 carrier. Within the reference receiver (GNSS reference receiver), the baseband/IF processing module, the measurement module, or the code phase measurement module can support or facilitate determination of phase-code bias or differential code bias.

The received signal-to-noise ratios of any of the L1, L2 and L5 carrier signals of respective particular satellite can be used to detect whether that particular satellite employs flex power to redistribute energy or transmit power between or among different signal components to increase immunity to interference or protect against jamming. For example, the L1(P(Y)) and L2(P(Y)) signal components (or pseudorandom noise (PN) code on the L1 and L2 carriers) may have increases signal power that results in a corresponding decrease in the L1 (CA) or L1 carrier course acquisition code power. Within the reference receiver (e.g., GNSS reference receiver), the baseband/IF processing module, the measurement module or the carrier phase measurement module can support of facilitate the estimation of signal-to-noise ratios of one or more carrier signals.

In practice, the P1-C1 or P1-P2 differential code biases can be used to determine clock estimates (and orbit estimates) that are consistent with ionosphere-free linear combination of code observations provided by cross-correlation receiver.

In the data processing center, electronic data processor of the data processing center can use steps, shifts or discontinuities in the observed differential code bias alone, or together with steps, shifts, discontinuities or other rapid changes to the signal-to-noise ratio of certain carrier satellite signals (e.g., L2 (Y) or L5 P(Y)) reported by one or more reference receivers to detect potential discontinuities or required changes in the WL bias corrections or NL bias corrections. For example, as reported by one or more reference receivers, for any given satellite if the changes in the signal-to-noise ratio of the carrier signal exceeds a threshold change in signal-to-noise ratio, or if the changes in the differential code bias exceeds a threshold change in the differential code bias, or if both thresholds are exceeded, then in a time-variant WL bias mode the WL filter may adjust the WL filter bias that is provided for such satellite in the correction signal (e.g., in accordance with time-variant WL bias constraints of a Kalman filter) and in a time-variant NL bias mode the NL filter may adjust the NL filter bias the is provided for such satellite in the correction signal (e.g., in accordance with time-variant NL bias constraints of a Kalman filter). In contrast, in a conventional WL bias mode the WL filter may only allow lesser deviation, range or variation in the average or mean WL bias (e.g., in accordance with slowly varying WL bias constraints of a Kalman filter). Similarly, in the conventional NL bias mode the NL filter may only allow a lesser deviation, range or variation in the average or mean WL bias (e.g., in accordance with slowly varying NL bias constraints of a Kalman filter).

A position estimator or an ambiguity resolution engine estimates a wide-lane carrier phase ambiguity by determining the double-differenced wide-lane combination of the L1 and L2 carrier phase measurements of a reference station and a mobile receiver. The double differenced wide-lane carrier phase combination is generally associated a double-differenced residual. The double differenced wide-lane carrier phase is differenced with the double-differenced narrow-lane code phase combination to determine a wide-lane ambiguity residual. The wide-lane ambiguity residual can be averaged over time to provide resolve or provide an estimate of the wide-lane integer ambiguity. For example, the wide-lane integer ambiguity can be resolved through statistical analysis of the average (e.g., mean) of the RMS error in the double-differenced residual, where a reference noise covariance for code and carrier phase is provided (e.g., from a look-up table or a data storage device). After resolving the ambiguity, the double-differenced carrier phase measurements can be used to estimate a relative range or vector measurement between the reference station and the mobile receiver. In one embodiment, a predictive filter (e.g., Kalman filter) or relative position estimator can apply least-squares estimation technique or similar search algorithm is applied to the relative range or vector measurements to determine the relative positions of the mobile receiver with respect to the reference station or other reference coordinates, where such estimation can further be adjusted for refraction correction and atmospheric propagation.

Banks of WL filters comprise pairs of WL Zero Difference filter and a supplemental WL bias predictive filters (504) for each satellite. With the first bank, each WL ZD filter (400, 501) is associated with a different corresponding satellite. Each WL ZD filter (400, 501) is coupled to a corresponding supplemental WL bias predictive filter (504). The WL ZD filter (400, 501) provides or outputs the WL bias associated with ambiguity resolution of the WL ambiguities for a respective satellite. The WL ZD filter (400, 501) provides or outputs satellite WL bias residuals to the corresponding supplemental WL bias predictive filter (504) for a respective satellite. In turn, the supplemental WL bias predictive filter (504) provides satellite the estimated dynamic noise of a WL bias for a corresponding satellite to the WL ZD filter (400, 501).

In one embodiment, the supplemental WL bias predictive filter (504) comprises a predictive filter such as a Kalman filter. Similarly, the NL bias filter/code phase bias filter may comprise a predictive filter such as a Kalman filter. A Kalman filter generally uses summation of signals, delay and feedback to process measurement samples (e.g., WL residuals and/or RC code residuals) and to allow for noise and uncertainty. Here, for the WL estimations, for each given satellite, the Kalman filter receives measurement samples of satellite WL bias and satellite WL residuals and outputs the estimated dynamic noise of the satellite WL bias for a respective satellite (e.g., with a known satellite type and known satellite identifier). The WL bias filter or Kalman filter is configured: to generate or adjust the WL bias for a respective satellite in a correction signal to be in the time-variant WL mode that is subject to time-variant WL constraints, parameters and corresponding states or in the conventional WL mode that is subject to conventional WL constraints, parameters and corresponding states for a slowly varying WL bias.

In an alternate embodiment, the Kalman filter may enable or activate the first WL filtering mode (e.g., time-variant WL filtering mode, for a time period or a series of epochs) based on one or more of the following factors: (1) evaluation of a derived metric, which is based on WL residuals (e.g., WL bias residuals and/or WL ambiguity residuals) and its variance for each satellite, with respect to a dynamic noise threshold; (2) detection of discontinuities or rate of change per unit time in signal-to-noise ratio of one or more carriers of the GNSS system; (3) detection of discontinuities or rate of change per unit time in code bias or differential code bias of one or more encoded signals (e.g., PN signal modulating a carrier or course acquisition code modulating a carrier).

Dynamic noise in the determined or estimated WL bias for each respective satellite is based on one or more of the following: (a) measurement noise in the estimated WL bias observed by the WL bias filter or Kalman filter, (b) variation, range or limit of the WL bias about its average (mean) over one or more epochs or GNSS time over an extended time period, (c) variation, range or limit of the WL (mean) over one or more epochs or GNSS time over an extended period, where the distortion in observed WL bias measurements during rising or setting of a satellite from view of the reference receiver is eliminated, adjusted or compensated to avoid such distortion that would otherwise result from atmospheric propagation delays.

An epoch is a measurement time interval of the GNSS system, such as a time interval between sampling of phase measurements of the carrier phase signals or the code phase.

Each WL filtering system (e.g., WL ZD filter (400, 501)) can provide or estimate dynamic noise of a corresponding WL bias for a respective satellite. The estimated dynamic noise of the WL bias filter can replace a default dynamic noise or a reference dynamic noise that is stored in the WL bias filter, the WL ZD filter (400, 501) (e.g., which comprises a residual WL bias filter), or a data storage device of the receiver. The default dynamic noise may be based on empirical measurements, historical measurements, or the last measurement of the WL bias filter that was stored prior to turning off the receiver. In one embodiment, the default dynamic noise is selected to be aligned with the typical dynamic noise associated with operating in the conventional WL bias filtering mode, such as the first WL tuned dynamic noise.

In an alternate embodiment, for operating in the conventional WL bias filtering mode, the default dynamic noise may be based on a noise temperature or average operating noise temperature for a satellite system comprising a pair of a particular satellite and corresponding receiver at each carrier frequency to estimate the first WL tuned dynamic noise, where the noise temperature or average operating noise temperature depends upon noise contributions from background noise, atmospheric noise and receiver front-end noise.

In one configuration, the WL filter or Kalman filter provides the default dynamic noise or an estimated dynamic noise to the WL ZD filter (400, 501). During transient conditions where there are fluctuations in the signal to noise ratio of carrier, encoded signals or code phase shifts that would otherwise perturb or distort the WL bias corrections provided for the correction signal, the WL filtering system or WL ZD filter (400, 501) can decrease, increase or adjust the weight of WL bias that is estimated for one or more corresponding epochs (and otherwise headed for incorporation into the correction signal) to determine or limit an average or mean of the WL bias over time (e.g., over sequence of successive epochs) for a corresponding satellite based on the applicable dynamic noise for the conventional WL bias filtering mode, estimated dynamic noise for the time-variant bias filtering mode, or both.

Under a first technique, in the first filtering mode (e.g., conventional WL bias filtering mode), the WL filter or WL ZD filter (400, 501) can determine an associated respective limit, range, maximum limit, maximum range, or maximum variance of an average or mean of the WL bias for a corresponding satellite that is associated with the default dynamic noise or a lower level of dynamic noise. For example, the associated WL residuals in the WL ambiguities can form a parameter or indicator for adjustment of maximum range or maximum limit in the dynamic noise, such that WL bias above or below the maximum range or maximum limit is rejected for estimation of the average or mean of the WL bias in the WL ZD filter (400, 501).

For example, in the first WL filtering mode the WL bias filtering system 505 may apply Kalman constraints in the associated limit, lower limit, upper limit, maximum limit, maximum range or maximum variance of the average or mean of the WL bias to reject the determined or estimated WL bias that exceeds the limit, range or variance for purposes of determining the average or mean of the WL bias of a respective satellite for each epoch or corresponding time period. Therefore, the dynamic noise can be applied to enhance the accuracy of the WL bias of a respective satellite for each epoch or corresponding time period.

Under the first WL filtering mode, in the WL bias filtering system 505 or WL ZD filter (400, 501), a WL bias for corresponding satellite may be modeled as a constant WL bias that varies slowly over time for some epochs where discontinuities in the WL bias do not occur, or in the conventional WL bias mode. Similarly, in the WL bias filter and residual WL bias filter, the WL bias for a particular satellite may be modeled as a constant WL bias that varies slowly over time (E.g., WL bias varies within 0.1 to 0.2 cycles at WL frequency) for some epochs if the particular satellite does not support (e.g., dynamic) transmit power adjustment of the L1 or L2C carrier signals to compensate for interference. However, even if the particular satellite does not support transmit power adjustment, the particular satellite may have WL bias discontinuities or a change in WL bias per unit time that exceeds a threshold rate of change in WL bias per unit time because of switching of different signal paths, satellite transmitters or thermal variation within the hardware portions of any satellite.

More generally, in the second WL filtering mode (e.g., time-variant WL mode), the WL bias filter and supplemental WL bias predictive filter (504) (e.g., residual WL bias filter), the WL bias is modeled as a time-varying WL bias (e.g., varying up to approximately 0.3 to 0.5 cycles, inclusive, at WL frequency or wavelength), at least for transient intervals of one or more epochs, such as when the transmit power of a satellite is adjusted because of interference, switching to a redundant transmitter of satellite (e.g., with different hardware or thermal characteristics), or changing a signal path associated with a transmit antenna, or antenna array, of the satellite. During the second WL filtering mode or a transition to the second WL filtering mode from the first WL filtering mode, the supplemental WL bias predictive filter (504)

FIG. 9A is an illustrative chart comparing a relative signal-to-noise ratio versus time on a common time axis 902 for a satellite that transmits an L1 (P(Y)) signal 904 encoded with pseudo-random noise code (PN) and L1 CA signal 903 encoded with a coarse-acquisition code, where the correction signal can be applied to address such transitory changes in bias. The signal-to-noise ratio 901 (e.g., in decibels) is shown on the vertical axis. The signal-to-noise ratio 901 may be expressed as a carrier-signal-to-noise ratio, for instance. Time 902 (e.g., in 24 hour time increments and days) is indicated along the horizontal axis.

FIG. 9B is an illustrative chart comparing a relative signal-to-noise ratio versus time for a satellite that transmits L2 P(Y) signal 906 encoded with PN and L2C signal 905 on a common time axis 902, where the correction signal can be applied to address such transitory changes in bias.

FIG. 10A is an illustrative chart comparing a relative signal-to-noise ratio versus time for a satellite that transmits L1 (P(Y)) 904 or L2 P(Y) 906 signal encoded with PN and the L1 CA signal 903 encoded with the course-acquisition code on a common time axis 902, where the correction signal can be applied to address such transitory changes in bias.

FIG. 10B is chart comparing a relative signal-to-noise ratio versus time on a common time axis 902 for a satellite that transmits the L2 P(Y) signal 906 encoded with PN and the L2C signal 905, where the correction signal can be applied to address such transitory changes in bias.

FIG. 11A is an illustrative chart comparing a relative signal-to-noise ratio versus time on a common time axis 902 for a satellite that transmits L1 (P(Y)) signal 904 or L2 P(Y) signal 906 encoded with PN and the L1 CA signal 903 encoded with the course-acquisition code, where the correction signal can be applied to address such transitory changes in bias.

FIG. 11B is an illustrative chart comparing a relative signal-to-noise ratio versus time on a common time axis 902 for a satellite that transmits the L2 P(Y) 906 encoded with PN and the L2C 905 signal), where the correction signal can be applied to address such transitory changes in bias.

FIG. 12A is an illustrative chart that shows the differential code bias 910 for the P1 signal versus L1CA signal associated with changes in power of the carrier or encoded portions of the respective signals over time 912. The vertical axis illustrates the differential code bias 910 (e.g., in meters) and the horizontal axis indicates the time 912 on a military or 24 hour clock format. One illustrative example of estimated differential code bias 911 is shown in the solid line, while the raw differential code bias measurements 914 are shown as the points or dotted regions.

FIG. 12B is an illustrative chart that shows the differential code bias 916 for the P2 signal versus L2C signal associated with changes in power of the carrier or encoded portions of the respective signals over time 912. The vertical axis illustrates the differential code bias 910 (e.g., in meters) and the horizontal axis indicates the time 912 on a military or 24 hour clock format. One illustrative example of estimated differential code bias 911 is shown in the solid line, while the raw differential code bias measurements 916 are shown as the points or dotted regions.

Figure 13A:
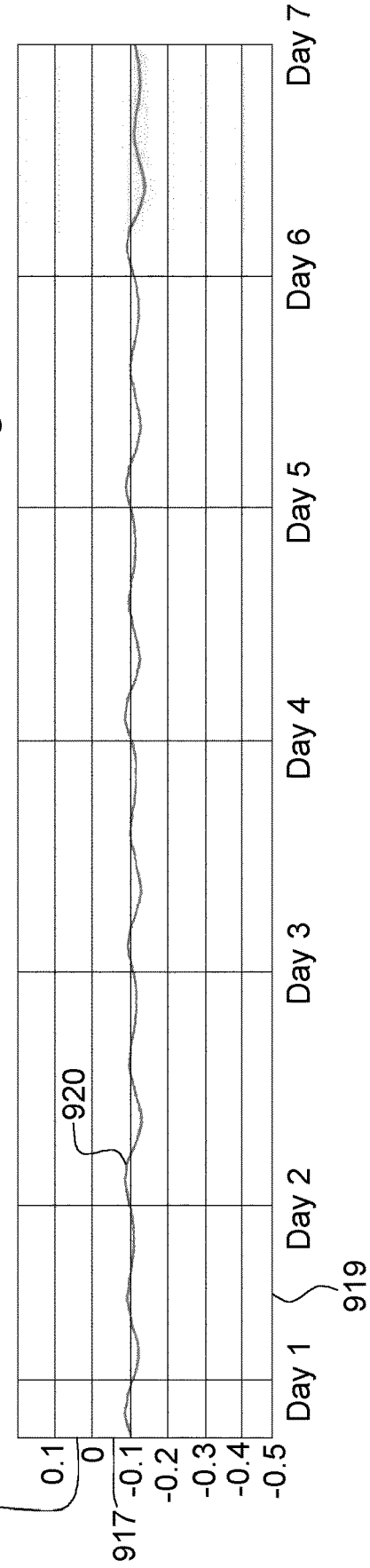
FIG. 13A illustrates the WL bias versus time for a WL filtering system that is operating in a first WL filtering mode.

FIG. 13A illustrates the WL bias estimate 920 versus time for a WL filtering system that is operating in a first WL filtering mode. The vertical axis shows the WL bias 917

(e.g., in cycles or fractional cycles at the WL frequency). Meanwhile, the horizontal axis shows time 919 in days.

Figure 13B:
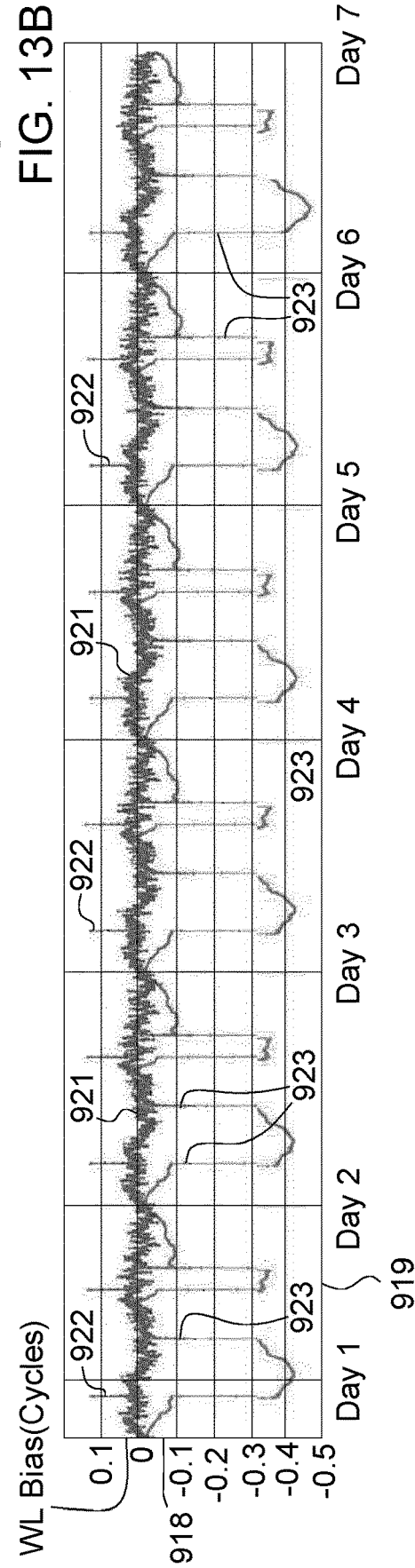
FIG. 13B illustrates the WL bias versus time and the WL residual versus time for a WL filtering system that is operating in a second WL filtering mode.

FIG. 13B illustrates the WL bias 923 (e.g., WL bias estimate) versus time 919 and the WL residual 921 versus time 919 for a WL filtering system that is operating in a second WL filtering mode. Similar to FIG. 13A, on the vertical axis FIG. 13B shows the WL bias 917 (e.g., in cycles or fractional cycles at the WL frequency). Note the spikes 922 (e.g., WL residual spikes or WL transient peaks) in the WL residual 921, which coincide with relatively rapid deviations (and corresponding nearly vertical slope as illustrated, at least for the time scale of FIG. 13B) in the WL bias 923 (e.g., WL bias estimate).

FIG. 14A illustrates the NL bias 918 versus time 919 for a NL filtering system (e.g., 507) that is operating in the first NL filtering mode. The vertical axis shows the NL bias 918 (e.g., in cycles or fractional cycles at the NL frequency). Meanwhile, the horizontal axis shows time 919 in days. The estimated NL bias 930 (e.g., in cycles or fractional cycles at the NL frequency or its corresponding NL wavelength) is illustrated over a time period of two days, for example.

FIG. 14B illustrates the NL bias 932 versus time 934 and the code-phase bias 932 versus time 934 for the NL filtering system (e.g., 507) that is operating in the second NL filtering mode. Similar to FIG. 14A, on the vertical axis FIG. 14B shows the NL bias 932 (e.g., in cycles or fractional cycles at the NL frequency) and code-phase bias (e.g., in meters). Note that the code-phase bias 937 (e.g., which can be expressed in meters) may provide a leading indicator (e.g., temporally leading indicator) or leading correlation/co-variance for coincident or later epochs that follow earlier changes in code-phase bias 937 with accompanying later changes in the estimated NL bias 935. As illustrated, the estimated NL bias (e.g., in cycles or fractional cycles at the NL frequency or its corresponding NL wavelength) is shown over a time period of two days, for example.

In an alternate embodiment, separate or cumulative with any other embodiments (e.g., of the NL bias filtering system 507), the WL bias filtering system 505, any of its constituent Kalman filters, may estimate the WL filter bias to fall within a limit or constraints based on the following Kalman filter states, factors and constraints: (1) one or more prior satellite WL biases during a sampling period, such as a lowest satellite WL bias value or highest WL bias value within a range of satellite WL biases during the sampling period, (2) a series of most recent WL bias values preceding a current WL bias value, (3) an average, mode, median, probability density function and/or mean of prior satellite WL bias during a sampling period of one or more epochs, (4) a difference, limit, upper limit, lower limit, maximum deviation, or maximum range between an estimated satellite WL bias and the last prior satellite WL bias, or the average or mean of prior satellite WL biases during a sampling period, (5) a maximum rate of change from an average or mean satellite WL bias or a satellite last WL bias, and/or (6) a revised limit that replaces the limit (previous limit) and that is commensurate with any increased dynamic noise threshold. Accordingly, in one embodiment the WL bias filtering system applies the above limits or constraints in estimation of WL bias values (e.g., in conjunction with transient conditions associated with power changes in carrier signals and encoded components, or code-phase bias changes).

In yet another alternate embodiment, separate or cumulative with any other embodiments, the WL bias filtering system 505, any of its constituent Kalman filters, may be constrained to a compensated WL bias or smoothed WL bias estimates that comprises a series interconnected and continuous polynomial segments (e.g., with maximum slope constraints or maximum curve constraints consistent with a historical record or (artificial intelligence) training of transient conditions associated with previous power changes in carrier signals and encoded components, or code-phase bias changes).

In still another alternate embodiment, separate or cumulative with any other embodiments, the WL bias filtering system 505, any of its constituent Kalman filters, may adjust or estimate a compensated WL bias (e.g., for transient conditions associated with power changes in carrier signals and encoded components, or code-phase bias changes) by reducing, increasing, capping, limiting or fixing the maximum rate of change per unit time of the observed WL bias for some time period (e.g., or number of epochs) after a discontinuity in the residual WL bias, is detected alone, or together in conjunction with one or more coextensive factors, such as temporally aligned discontinuity in carrier phase measurements at one or more reference receivers 130 that provide reference phase measurements to the data processing center 118.

In an alternate embodiment, separate or cumulative with any other embodiments, the NL bias filtering system 507, any of its constituent Kalman filters, may estimate the NL filter bias to fall within a limit or constraints based on the following Kalman filter states, factors and constraints: (1) one or more prior satellite NL biases during a sampling period, such as a lowest NL bias value or highest NL bias value within a range of NL biases during the sampling period, (2) a series of most recent satellite NL bias values preceding a current satellite NL bias value, (3) an average, mode, median, probability density function, and/or mean of prior satellite NL bias during a sampling period of one or more epochs, (4) a difference, limit, upper limit, lower limit, maximum deviation, or maximum range between an estimated satellite NL bias and the last prior satellite NL bias, or the average or mean of prior satellite NL biases during a sampling period, (5) a maximum rate of change from an average or mean satellite NL bias or a last satellite NL bias, and/or (6) a revised limit that replaces the limit (previous limit) and that is commensurate with any increased dynamic noise threshold. Accordingly, in one embodiment the NL bias filtering system 507 applies the above limits or constraints in estimation of NL bias values (e.g., in conjunction with transient conditions associated with power changes in carrier signals and encoded components, or code-phase bias changes).

In yet another alternate embodiment, separate or cumulative with any other embodiments, the NL bias filtering system 507, any of its constituent Kalman filters, may be constrained to a compensated NL bias or smoothed NL bias estimates that comprises a series interconnected and continuous polynomial segments (e.g., with maximum slope constraints or maximum curve constraints consistent with a historical record or (artificial intelligence) training of transient conditions associated with previous power changes in carrier signals and encoded components, or code-phase bias changes).

In still another alternate embodiment, separate or cumulative with any other embodiments, the NL bias filtering system 507, any of its constituent Kalman filters, may adjust or estimate a compensated NL bias (e.g., for transient conditions associated with power changes in carrier signals and encoded components, or code-phase bias changes) by reducing, increasing, capping, limiting or fixing the maximum rate of change per unit time of the observed NL bias for some time period (e.g., or number of epochs) after a discontinuity in the residual NL bias, is detected alone, or together in conjunction with one or more coextensive factors, such as temporally aligned discontinuity in carrier phase measurements at one or more reference receivers 130 that provide reference phase measurements to the data processing center 118.

In one embodiment, the electronic data processor 120 of the data processing center 118, or the clock solution module 44 (e.g., orbit/clock satellite bias quality module) is adapted to determining one or more quality indicators indicating the quality of GNSS satellite orbit solution, satellite clock, satellite wide-lane bias, and narrow-lane bias in accordance to the following equation:

$$Q = \frac{N_{sat} + N_{ref} + \sum_{i=1}^{N_{sat}} Q_i}{4}$$

Where
$N_{sat}$ is the number of satellites used
$N_{ref}$ is the number of reference sites used
$Q_i$ (Narrow Lane bias quality value) can be one of the following:
=0 (UNSURE_SAT_BIAS) if satellite bias is not ready to use
=1(POOR_SAT_BIAS) if satellite bias is poor and to be removed in partial fix
=2(GOOD_SAT_BIAS) if satellite bias is good to use for SD fix
=3(GREAT_SAT_BIAS) if satellite bias is excellent and can be used for reference satellite Further, in one configuration, the electronic processor 120 of the data processing center 118, or the clock solution module 44 (e.g., orbit/clock satellite bias quality module), or the correction manager 740 is configured to incorporate one or more of quality indicators into the correction signal for corresponding satellites.

Figure 15:
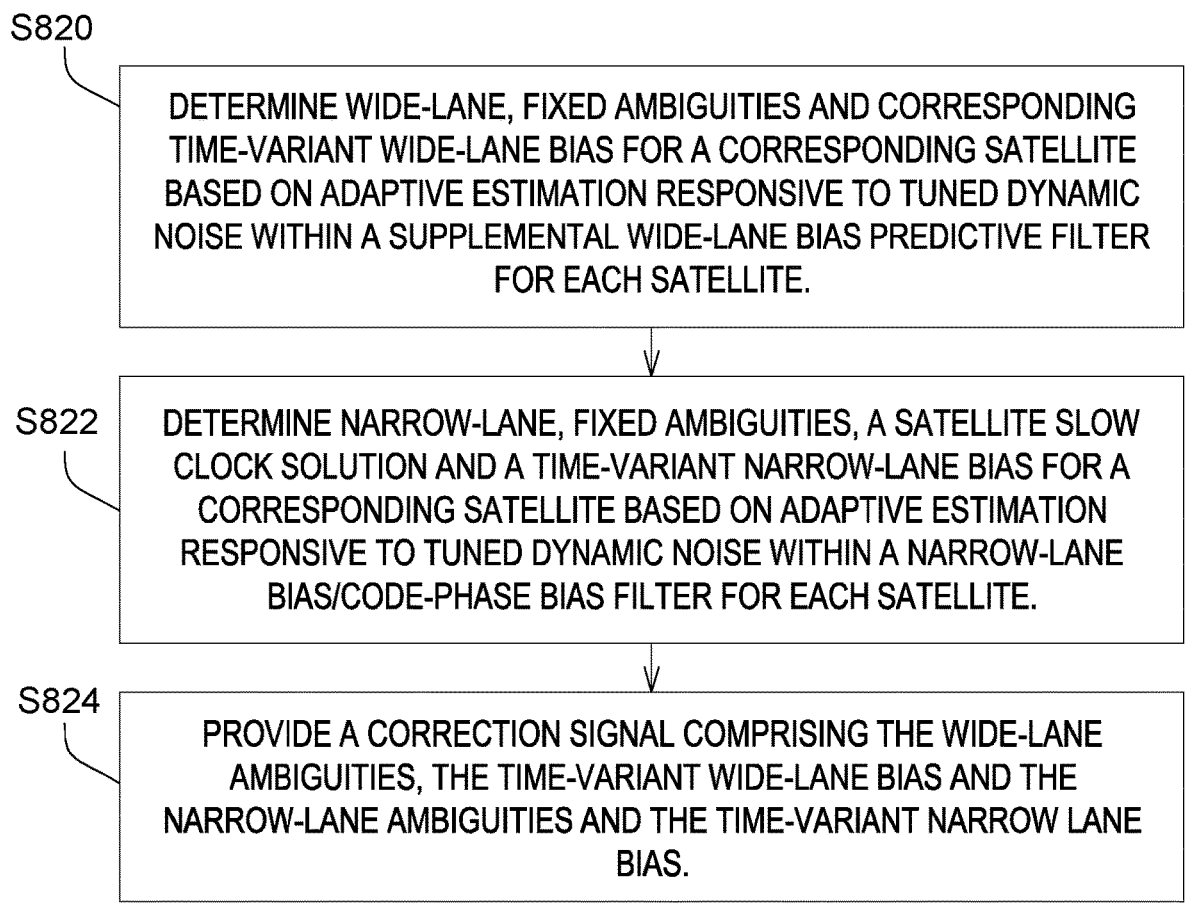
FIG. 15 is a flow chart of a first illustrative embodiment of a method for providing a global satellite differential correction signal, consistent with or in conjunction with any of the block diagrams referenced in the above drawings of this disclosure.

FIG. 15 illustrates flow chart from one embodiment of a method for providing a global satellite differential correction signal. The method starts in step S820 and comprises an improvement to providing a global satellite correction signal.

In step S820, the electronic data processor (e.g., 120), measurement pre-processing module 36, or one or more of its filters (400, 37, 501) determine wide-lane, fixed ambiguities and corresponding a time-variant wide-lane bias for a corresponding satellite based on adaptive estimation responsive to tuned dynamic noise within a supplemental wide-lane bias predictive filter 504 for each satellite. For example, the electronic data processor (e.g., 120), measurement pre-processing module 36, or one or more of its filters (400, 37, 501) determine the time-variant wide-lane bias in accordance with the following equation:

$$b_{WL}^s = -\left(\frac{f_{L_1}}{f_{L_1} + f_{L_2}} B_{L_1}^s + \frac{f_{L_2}}{f_{L_1} + f_{L_2}} B_{L_2}^s\right) + \left(\frac{f_{L_1}}{f_{L_1} - f_{L_2}} b_{L_1}^s - \frac{f_{L_2}}{f_{L_1} - f_{L_2}} b_{L_2}^s\right)$$

where $b_{WL}^s$ is satellite wide-lane bias (one per satellite for all receivers), $B_{L_1}^s$ is L1 satellite code bias, $B_{L_2}^s$ is L2 satellite code bias, $b_{L_1}^s$ is L1 satellite phase bias, $b_{L_2}^s$ is L2 satellite phase bias, $f_{L_1}$ is the L1 frequency, $f_{L_2}$ is the L2 frequency, and where both satellite and receiver wide-lane biases are not constant over time. Further, the time-variant wide lane bias can include an additional wide-lane inter-frequency bias for a corresponding satellite and receiver; particularly for the GLONASS GNSS constellation.

In certain configurations of step S820, the electronic data processor (e.g., 120), measurement pre-processing module 36, or one or more of its filters (400, 37, 501) determines the WL bias by setting or establishing a tuned dynamic noise for satellite WL bias, $b_{WL}^s$, of each corresponding satellite, applicable to a first bank of WL ZD filters as follows:

inputting post-fit, wide-lane residuals, of corresponding satellites to a second bank of supplemental WL bias predictive filters that comprise WL Kalman filters;

determining for each satellite in ones of the supplemental WL bias predictive filters, a variance, $Q_{\hat{b}_t}$, of the inputted wide-lane bias residuals at a corresponding measurement time (t); and estimating a second variance or next variance, $Q_{\hat{b}_{t+1}}$, associated with a sampling time (t+1) after the measurement time based on tuned dynamic noise, $q_{\hat{b}}$, consistent with a dynamic noise constraint (separately and independently determined for the WL Kalman filter for a respective satellite) defined by T ($T_{WL}$).

In step S822, the electronic data processor (e.g., 120); orbit solution module 38, or its filters (404, 39, 506); or the clock solution module 44, or its filters (408, 43, 506) determine narrow-lane, fixed ambiguities, a satellite slow clock solution and a time-variant narrow-lane bias for a corresponding satellite based on adaptive estimation on adaptive estimation responsive to tuned dynamic noise within a narrow-lane bias/code-phase bias filter(s) 512 for each satellite. For example, the electronic data processor (e.g., 120); orbit solution module 38, or its filters (404, 39, 506); or the clock solution module 44, or its filters (408, 43, 506) determine the time-variant narrow-lane code bias, $P_{r,RC}^s$, in accordance with the following:

$$P_{r,RC}^s = \frac{f_{L_1}^2}{f_{L_1}^2 - f_{L_2}^2} P_{r,L_1}^s - \frac{f_{L_2}^2}{f_{L_1}^2 - f_{L_2}^2} P_{r,L_2}^s$$

$$= D_r^s + B_{r,NL} - B_{NL}^s + \varepsilon_{P_{r,RC}^s}$$

where, $P_{r,L_1}^s$ is the narrow-lane L1 code bias for receiver r and satellite s, $P_{r,L_2}^s$ is the narrow-lane L2 code bias for receiver r and satellite s, $f_{L_1}$ is the L1 frequency, $f_{L_2}$ is the L2 frequency, $D_r^s$ (e.g., $D_{r,L_{i=1,2}}^s$) represents the common terms for any given frequency, $B_{r,NL}$ is receiver r narrow-lane lane code bias (one per receiver and constellation for all visible satellites), is $B_{NL}^s$ satellite s narrow-lane lane code bias, and $\varepsilon_{P_{r,RC}^s}$ are errors in the refraction-corrected, narrow-lane code bias, such as unmodeled errors.

In certain configurations of step S822, the electronic data processor (e.g., 120); orbit solution module 38, or its filters (404, 39, 506); or the clock solution module 44, or its filters (408, 43, 506) determine the NL bias by setting or establishing a tuned dynamic noise for satellite NL bias, $b_{NL}^s$, or satellite RC code-phase bias $\hat{B}_t$ of each corresponding satellite, applicable to a first bank of NL ZD filters as follows:

inputting refraction corrected code (NL) residuals, of corresponding satellites to a second bank of NL bias filters/code-phase filters that comprise NL Kalman filters;

determining for each satellite in ones of the NL bias filters/code-phase filters, a variance, $Q_{\hat{b}_t}$ of the inputted narrow-lane bias residuals at a corresponding measurement time (t); and estimating a second variance or next variance, $Q_{\hat{B}_{t+1}}$ associated with a sampling time (t+1) after the measurement time based on tuned NL dynamic noise, $q_{\hat{b}}$, or $q_{b_{NL}}$, consistent with a dynamic noise constraint (separately and independently determined for the NL Kalman filter for a respective satellite) defined by T ($T_{NL}$).

In step S824, the low latency clock module 752, a correction manager 740, or an electronic data processor 120 of the data processing center 118 provide a correction signal comprising the wide-lane ambiguities, the time-variant wide-lane bias and the narrow-lane ambiguities and the time-variant narrow lane bias.

Step S824 may be conducted in accordance with various procedures that may be applied separately or cumulatively. Under a first procedure, the low latency clock module 752, a correction manager 740, or an electronic data processor 120 of the data processing center 118 determines one or more quality indicators indicating the quality of GNSS satellite orbit solution, satellite clock, satellite wide-lane bias, and narrow-lane bias in accordance to the following equation:

$$Q = \frac{N_{sat} + N_{ref} + \sum_{i=1}^{N_{sat}} Q_i}{4}$$

where:
$N_{sat}$ is the number of satellites used;
$N_{ref}$ is the number of reference sites used; and
$Q_i$ (Narrow Lane bias quality value) can be one of the following:
=0 (UNSURE_SAT_BIAS) if satellite bias is not ready to use;
=1(POOR_SAT_BIAS) if satellite bias is poor and to be removed in partial fix;
=2(GOOD_SAT_BIAS) if satellite bias is good to use for SD fix; or
=3(GREAT_SAT_BIAS) if satellite bias is excellent and can be used for reference satellite.

Under a second procedure, the data processor 120, the low-latency clock module 752, or the correction manager 740 incorporates the quality indicators into the correction signal for one or more epochs or sampling intervals.

Under a third procedure, the data processor 120, the low-latency clock module 752, or the correction manager 740 incorporates the correction signal, alone or together with code-phase bias data or code bias data to compensate for one or more of the following conditions or states: (1) a first state where the time-variant wide-lane bias results from observed changes in in received signal-to-noise ratio or carrier-to-noise density ratio of an encoded L1 C/A or L2C (or L2C or L5) satellite signal of the satellite transmitter; (2) a second state where the time-variant narrow-lane bias results from observed changes in received signal-to-noise ratio or carrier-to-noise density ratio of an encoded L1 C/A or L2C (or L2C or L5) satellite signal of the satellite transmitter; and (3) a third state where the time variant wide-lane bias and the narrow-lane bias results from thermally dependent inter-frequency clock biases (e.g., different hardware signal paths in the satellite or different thermal environments of different transmitter signal paths within the satellite).

Figure 16:
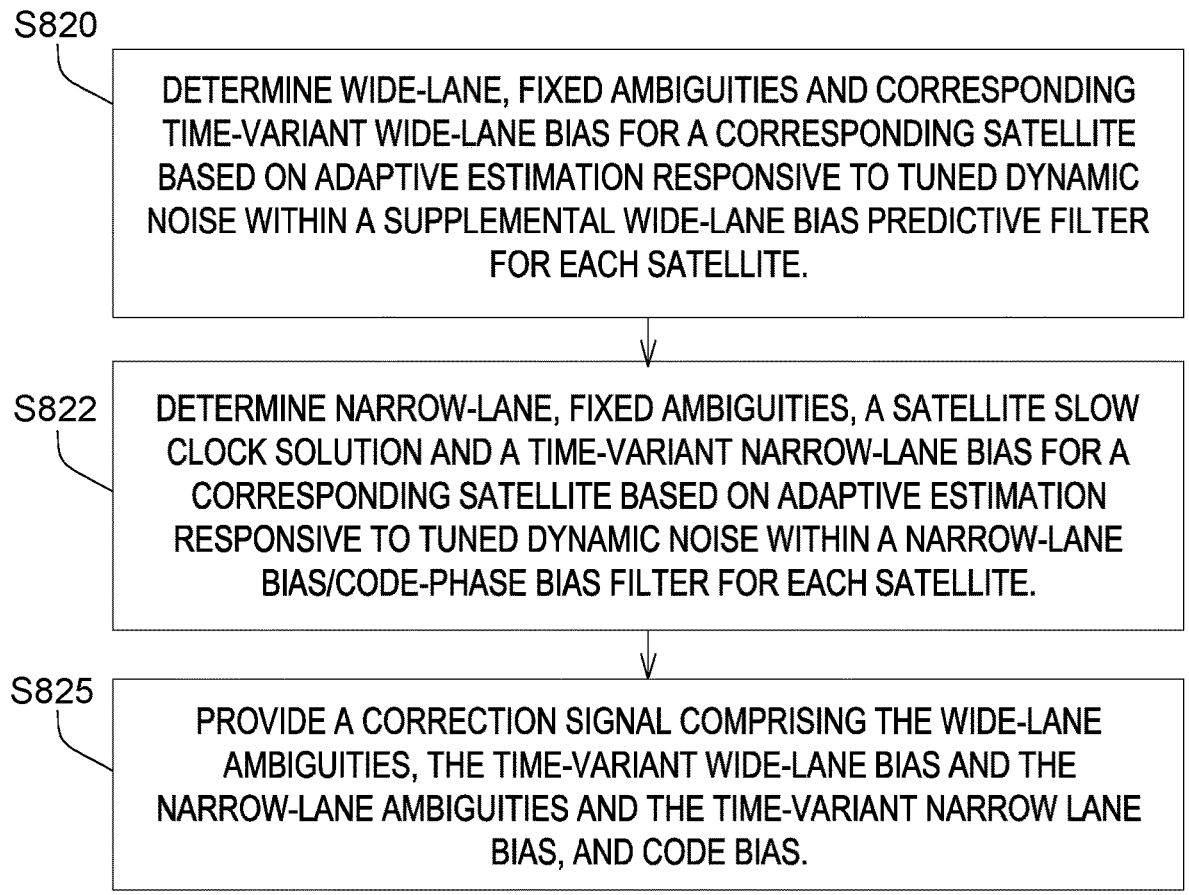
FIG. 16 is a flow chart of a second illustrative embodiment of a method for providing a global satellite differential correction signal, consistent with or in conjunction with any of the block diagrams referenced in the above drawings of this disclosure.

The embodiment of the method of FIG. 16 is similar to the embodiment of the method of FIG. 15, except step S824 is replaced with step S825 in FIG. 16. Like reference numbers in FIG. 15 and FIG. 16, or in any set of drawings, for that matter, indicate like elements or features.

In step S825, the low latency clock module 752, a correction manager 740, or an electronic data processor 120 of the data processing center 118 provide a correction signal comprising the wide-lane ambiguities, the time-variant wide-lane bias and the narrow-lane ambiguities and the time-variant narrow lane bias, and code bias (or code-phase bias). In general, as a practical matter, the code bias (of the pseudo-random noise code the encodes any carrier of a GNSS signal component) is or can be correlated to the phase bias (e.g., satellite clock bias components) of the corresponding carrier phase of the GNSS signal component, such as phase bias owing to or related to the flex power or changes in transmit power of the corresponding carrier phase of the GNSS signal component; hence, the term code-phase bias can be used to indicate such correlation throughout this disclosure.

Further, in alternate embodiments step S825 can be substituted for step S824 in any methods or flow charts in this disclosure.

The embodiment of the method of FIG. 17 is similar to the embodiment of the method of FIG. 15, except step S820 is replaced with step S821 in FIG. 17. Like reference numbers in FIG. 15 and FIG. 17, or in any set of drawings, for that matter, indicate like elements or features.

In step S821, the electronic data processor (e.g., 120), measurement pre-processing module 36, or one or more of its filters (400, 37, 501) determine wide-lane, fixed ambiguities and corresponding a time-variant wide-lane bias for a corresponding satellite based on adaptive estimation responsive to tuned dynamic noise within a supplemental wide-lane bias predictive filter 504 for each satellite: (A) where a wide-lane zero difference filter provides wide-lane residuals to the supplemental wide-lane bias predictive filter for a given satellite; and (B) where the supplemental wide-lane bias predictive filter provides the tuned dynamic noise (e.g., refined, tuned dynamic noise) based on the provided wide-lane residuals for the respective satellite to the wide-lane zero difference filter for the given satellite.

Further, in alternate embodiments step S821 can be substituted for step S820 in any methods or flow charts in this disclosure.

In an alternate embodiment of step S821, the determining of the wide-lane fixed ambiguities and wide lane bias per satellite comprises:
(A) establishing a pair of wide-lane zero difference filter and the supplemental wide-lane bias predictive filter for each satellite;
(B) providing, by the wide-lane zero difference filter 501, wide-lane residuals to the paired, corresponding supplemental wide-lane bias predictive filter for a given satellite; and
(C) providing, by the supplemental wide-lane bias predictive filter (e.g., 504), the tuned dynamic noise based on the provided wide-lane residuals for the respective satellite to the wide-lane zero difference filter for the given satellite, wherein the pair of the WL ZD filter 501 and the supplemental WL bias predictive filter (e.g., 504) for a given satellite comprise software instructions and/or Kalman filter logic structures associated with a pre-processing module 36 within the data processing center.

Figure 18:
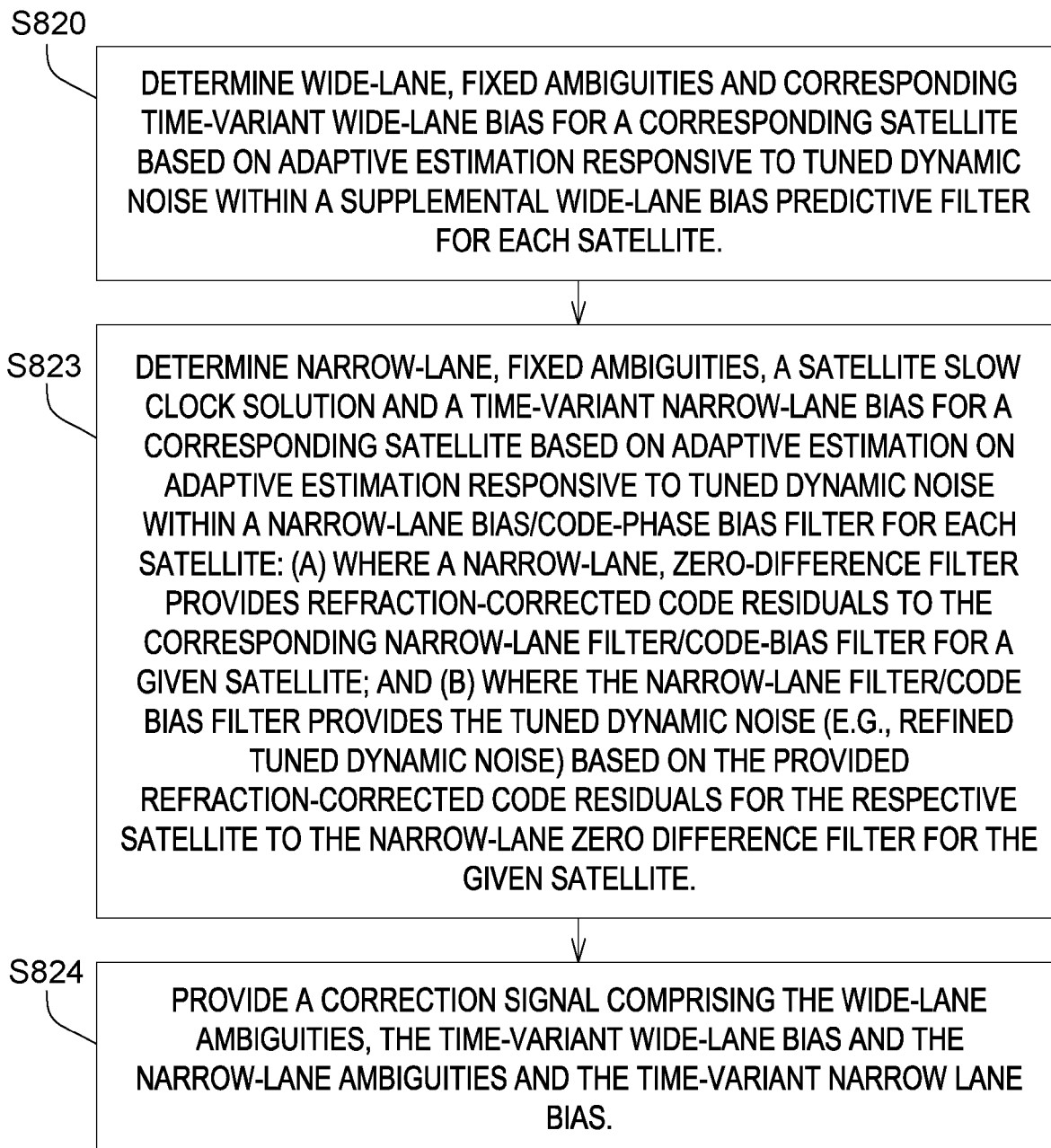
FIG. 18 is a flow chart of a fourth illustrative embodiment of a method for providing a global satellite differential correction signal, consistent with or in conjunction with any of the block diagrams referenced in the above drawings of this disclosure.

The embodiment of the method of FIG. 18 is similar to the embodiment of the method of FIG. 15, except step S822 is replaced with step S823 in FIG. 18. Like reference numbers in FIG. 15 and FIG. 18, or in any set of drawings, for that matter, indicate like elements or features.

In step S823, the electronic data processor (e.g., 120); orbit solution module 38, or its filters (404, 39, 506); or the clock solution module 44, or its filters (408, 43, 506) determine narrow-lane, fixed ambiguities, a satellite slow clock solution and a time-variant narrow-lane bias for a corresponding satellite based on adaptive estimation on adaptive estimation responsive to tuned dynamic noise within a narrow-lane bias/code-phase bias filter(s) 512 for each satellite: (A) where a narrow-lane, zero-difference filter provides refraction-corrected code residuals to the corresponding narrow-lane filter/code-bias filter for a given satellite; and (B) where the narrow-lane filter/code bias filter provides the tuned dynamic noise (e.g., refined tuned dynamic noise) based on the provided refraction-corrected code residuals for the respective satellite to the narrow-lane zero difference filter for the given satellite.

Further, in alternate embodiments step S823 can be substituted for step S822 in any methods or flow charts in this disclosure.

In an alternate embodiment of step S823, the determining of the narrow-lane fixed ambiguities and narrow-lane bias per satellite comprises:
  (A) establishing a pair of narrow-lane zero difference filter 506 and the supplemental narrow-lane bias predictive filter for each satellite;
  (B) providing, by the narrow-lane, zero-difference filter 506, refraction-corrected code residuals to the paired, corresponding narrow-lane filter/code-bias filter (e.g., 512) for a given satellite;
  (C) providing, by the narrow-lane filter/code bias filter (e.g., 512), the tuned dynamic noise based on the provided refraction-corrected code residuals for the respective satellite to the narrow-lane zero difference filter for the given satellite, wherein the pair of the NL ZD filter 506 and the narrow-lane bias filter/code bias filter for each satellite (e.g., the supplemental NL bias predictive filter 512) for a given satellite comprise software instructions and/or Kalman filter logic structures associated with an orbit solution module 38 or clock solution module 44 within the data processing center.

Figure 19:
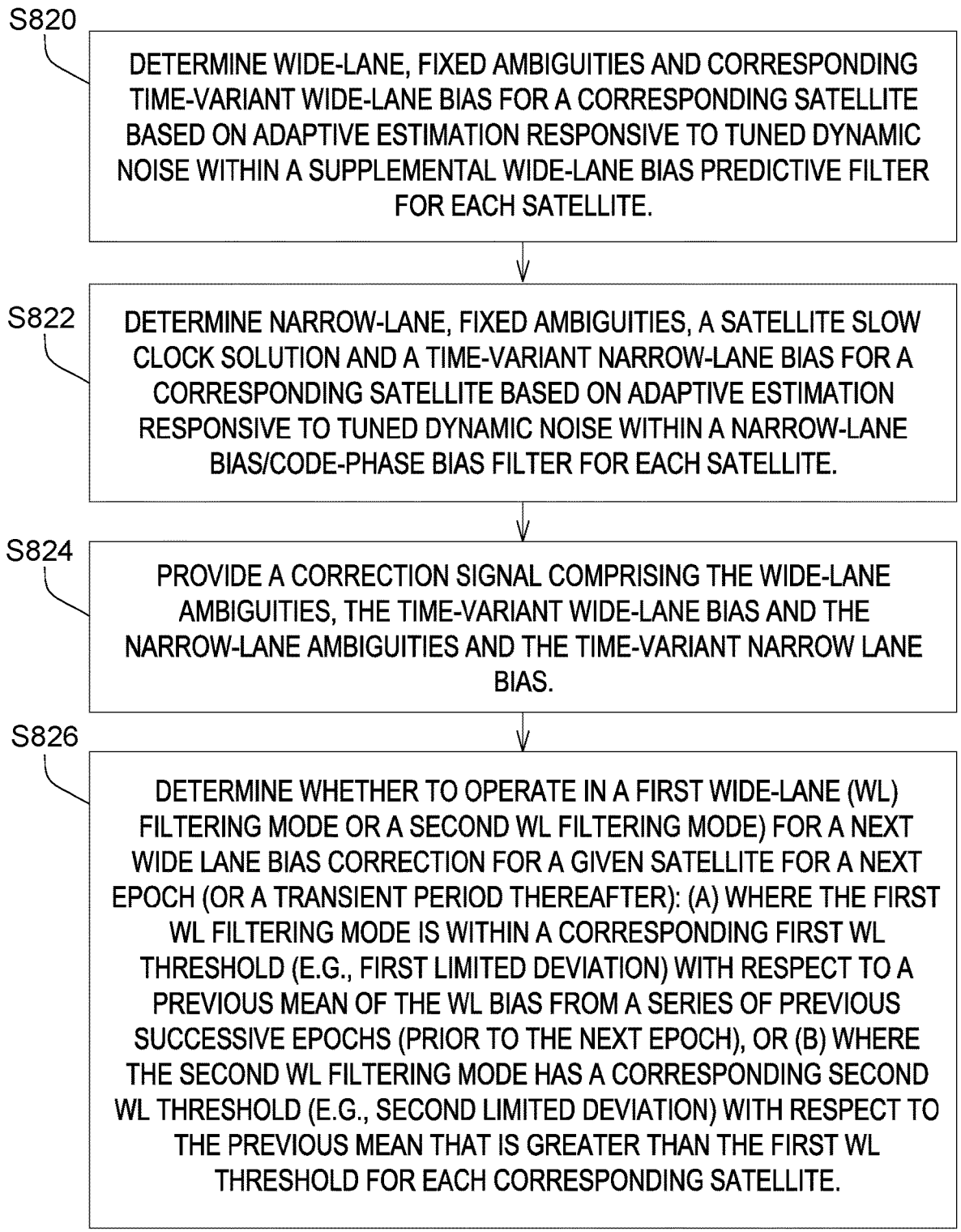
FIG. 19 is a flow chart of a fifth illustrative embodiment of a method for providing a global satellite differential correction signal, consistent with or in conjunction with any of the block diagrams referenced in the above drawings of this disclosure.

The embodiment of the method of FIG. 19 is similar to the embodiment of the method of FIG. 15, except step S826 is added in FIG. 19. Like reference numbers in FIG. 15 and FIG. 19, or in any set of drawings, for that matter, indicate like elements or features.

In step S826, the electronic data processor (e.g., 120), measurement pre-processing module 36, or one or more of its filters (400, 37, 501, 504) determine whether to operate in a first wide-lane (WL) filtering mode or a second WL filtering mode) for a next wide lane bias correction for a given satellite for a next epoch (or a transient period thereafter): (A) where the first WL filtering mode (of one or more of WL filters 400, 501, 504) is within a corresponding first WL threshold (e.g., first limited deviation) with respect to a previous mean of the WL bias from a series of previous successive epochs (prior to the next epoch), or (B) where the second WL filtering mode (of one or more of WL filters 400, 501, 504) has a corresponding second WL threshold (e.g., second limited deviation) with respect to the previous mean that is greater than the first WL threshold (e.g., first limited deviation) for each corresponding satellite.

Further, in alternate embodiments step S826 can be added in any methods or flow charts in this disclosure.

Figure 20:
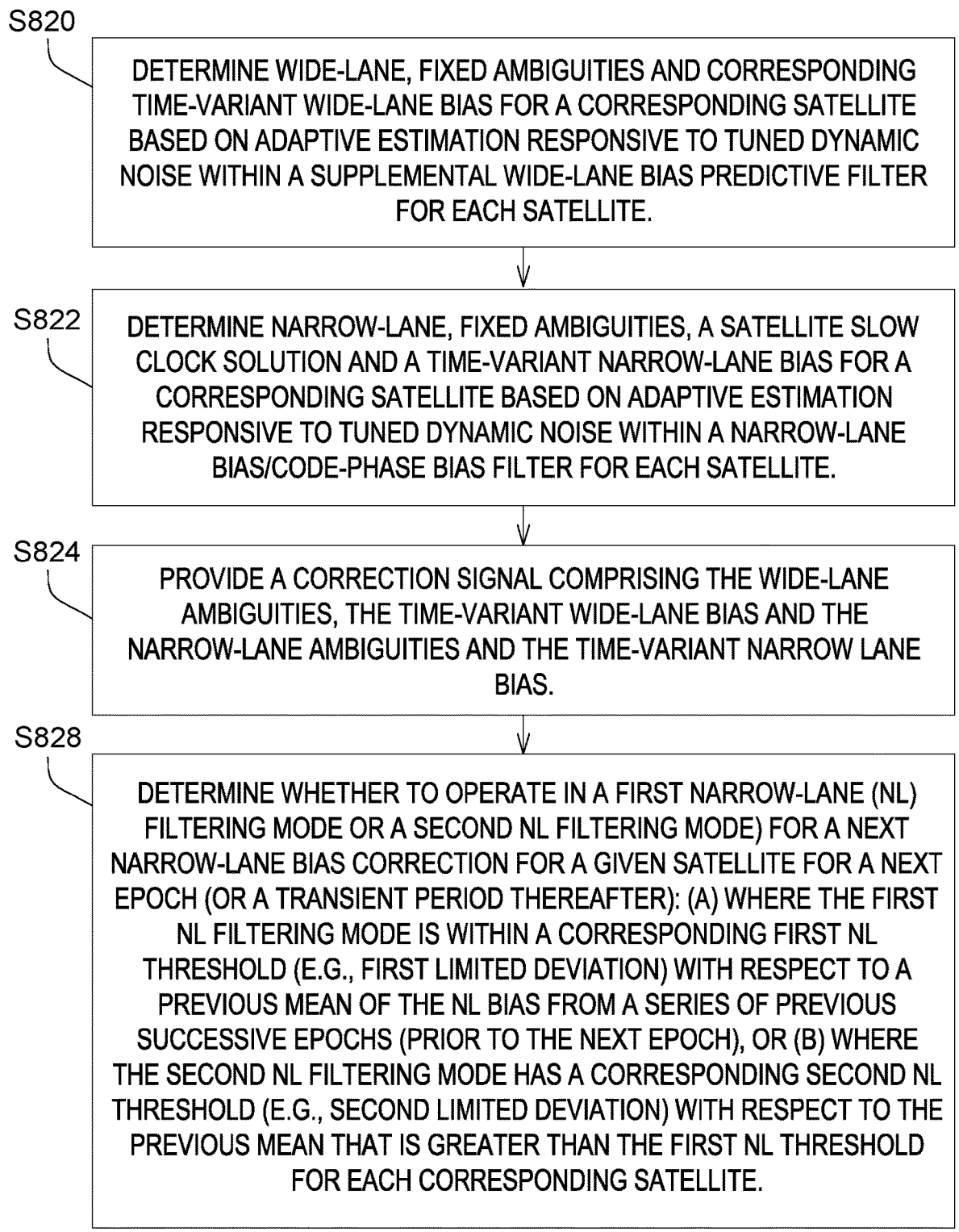
FIG. 20 is a flow chart of a sixth illustrative embodiment of a method for providing a global satellite differential correction signal, consistent with or in conjunction with any of the block diagrams referenced in the above drawings of this disclosure.

The embodiment of the method of FIG. 20 is similar to the embodiment of the method of FIG. 15, except step S828 is added in FIG. 20. Like reference numbers in FIG. 15 and FIG. 20, or in any set of drawings, for that matter, indicate like elements or features.

In step S828, the electronic data processor (e.g., 120); orbit solution module 38, or its filters (404, 39, 506); or the clock solution module 44, or its filters (408, 43, 506, 512) determine whether to operate in a first narrow-lane (NL) filtering mode or a second NL filtering mode) for a next narrow-lane bias correction for a given satellite for a next epoch (or a transient period thereafter): (A) where the first NL filtering mode (of one or more NL filters 408, 43, 506, 512) is within a corresponding first NL threshold (e.g., first limited deviation) with respect to a previous mean of the NL bias from a series of previous successive epochs (prior to the next epoch), or (B) where the second NL filtering mode (of one or more NL filters 408, 43, 506, 512) has a corresponding second NL threshold (e.g., second limited deviation) with respect to the previous mean that is greater than the first NL threshold (e.g., first limited deviation) for each corresponding satellite.

Further, in alternate embodiments step S828, can be added, separately or cumulatively with step S826, in any methods or flow charts in this disclosure.

Figure 21:
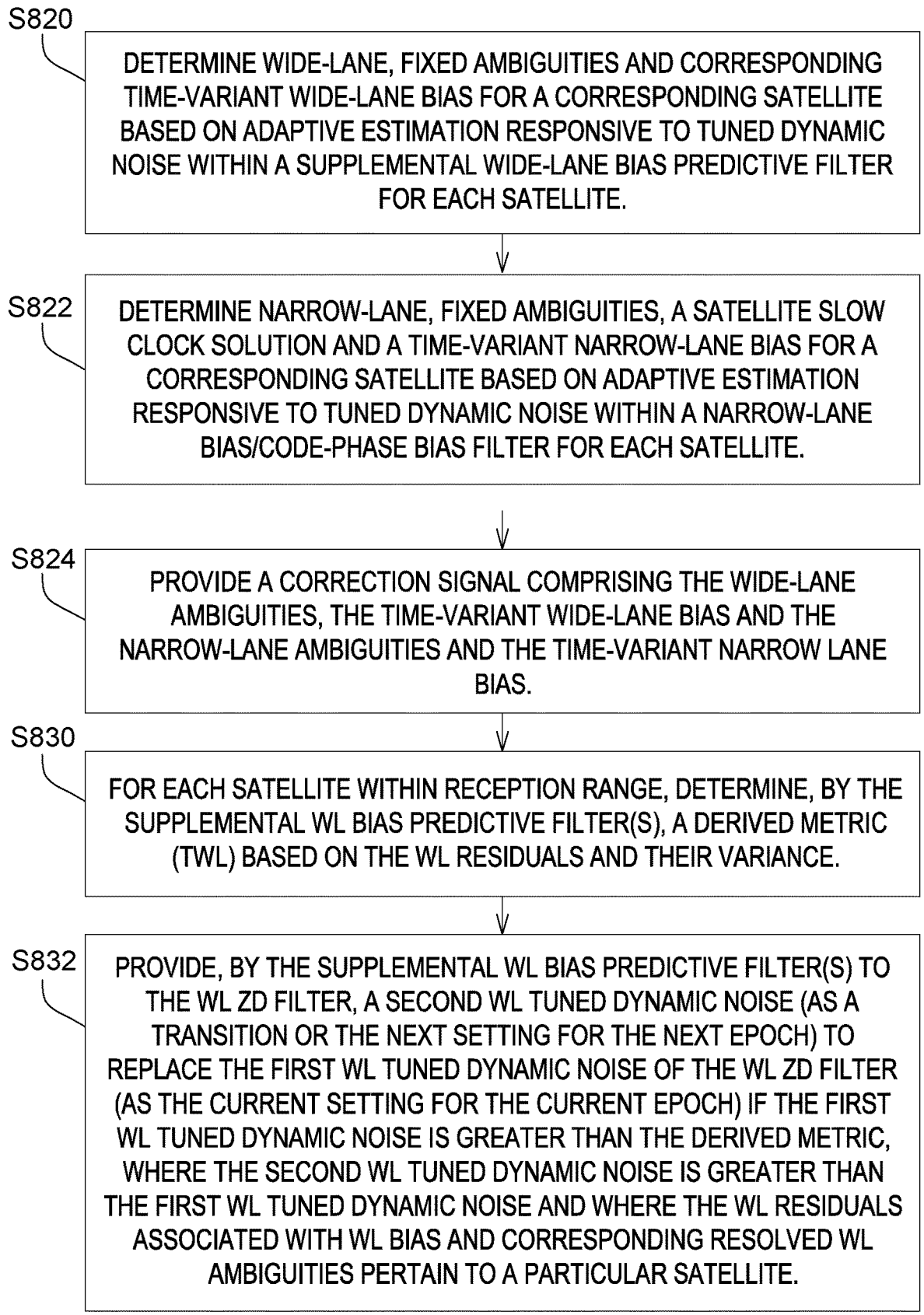
FIG. 21 is a flow chart of a seventh illustrative embodiment of a method for providing a global satellite differential correction signal, consistent with or in conjunction with any of the block diagrams referenced in the above drawings of this disclosure.

The embodiment of the method of FIG. 21 is similar to the embodiment of the method of FIG. 15, except steps S830 and S832 are added to FIG. 21. Like reference numbers in FIG. 15 and FIG. 21, or in any set of drawings, for that matter, indicate like elements or features.

In step S830, for each satellite within reception range, the supplemental WL bias predictive filter(s) determines, or is configured to determine, a derived metric ($T_{WL}$) based on the WL residuals and their variance.

In step S832, one or more of the supplemental WL bias predictive filters 504 provide, or are configured to provide, to the WL ZD filter 501, a second WL tuned dynamic noise (as a transition or the next setting for the next epoch) to replace the first WL tuned dynamic noise of the WL ZD filter 501 (as the current setting for the current epoch) if the first WL tuned dynamic noise is greater than the derived metric, where the second WL tuned dynamic noise is greater than the first WL tuned dynamic noise and where the WL residuals associated with WL bias and corresponding resolved WL ambiguities pertain to a particular satellite.

Further, in alternate embodiments steps S830 and S832 can be added in any methods or flow charts in this disclosure.

In another alternate embodiment, cumulatively or separately with step S830, one or more supplemental WL bias predictive filters 504 (e.g., or the electronic data processor 120 of the data processing center), determine, or are configured to determine, for each satellite within reception range, a derived metric ($T_{WL}$) based on the WL residuals and their variance. Further, cumulatively, or separately with step S832, one or more of the supplemental WL bias predictive filters 504 provide, or are configured to provide, to the WL ZD filter 501, a first WL tuned dynamic noise (as maintenance of the next setting for the next epoch) to maintain the first WL tuned dynamic noise of the WL ZD filter 501 (as the current setting for the current epoch) if the first WL tuned dynamic noise is equal to or less than the derived metric, and where the WL residuals associated with WL bias and corresponding resolved WL ambiguities pertain to a particular satellite.

Figure 22:
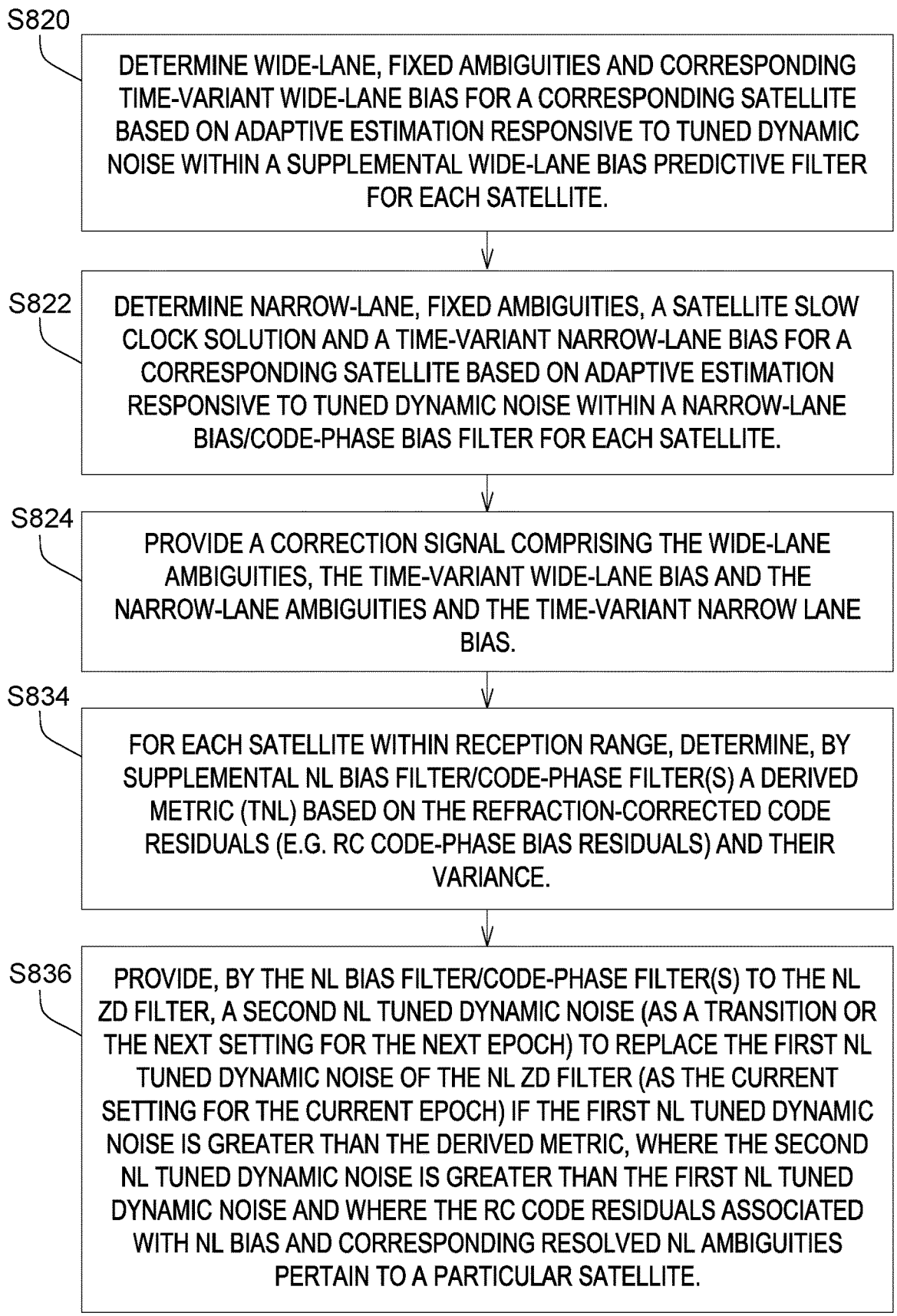
FIG. 22 is a flow chart of a eighth illustrative embodiment of a method for providing a global satellite differential correction signal, consistent with or in conjunction with any of the block diagrams referenced in the above drawings of this disclosure.

The embodiment of the method of FIG. 22 is similar to the embodiment of the method of FIG. 15, except steps S834 and S836 are added to FIG. 22. Like reference numbers in FIG. 15 and FIG. 22, or in any set of drawings, for that matter, indicate like elements or features.

In step S834, for each satellite within reception range, one or more supplemental NL bias filter/code-phase filter(s) 512 determine, or are configured to determine, a derived metric ($T_{NL}$) based on the refraction-corrected code residuals (e.g. RC code-phase bias residuals) and their variance. RC code residuals or RC code-phase bias residuals may be referred to as NL residuals, individually or collectively. In certain illustrative embodiments, supplemental NL bias predictive filters, like Kalman filters or extended Kalman filters, may be used to implement the NL bias filter/code phase filters.

Step S836 may be executed in accordance with various techniques or variations, that may be applied, separately or cumulatively, and in conjunction with the step S834 referenced above.

Under a first technique for executing step S836, one or more of the NL bias filter/code-phase filter(s) 512 provide, or are configured to provide, to the NL ZD filter 506, a second NL tuned dynamic noise (as a transition or the next setting for the next epoch) to replace the first NL tuned dynamic noise of the NL ZD filter 506 (as the current setting for the current epoch) if the first NL tuned dynamic noise is greater than the derived metric, where the second NL tuned dynamic noise is greater than the first NL tuned dynamic noise and where the RC code residuals associated with NL bias and corresponding resolved NL ambiguities pertain to a particular satellite.

Under a second technique for executing step S836, one or more the NL bias filter/code-phase filters 512 provide, or are configured to provide, to the NL ZD filter 506, a first NL tuned dynamic noise (as the next setting for the next epoch) to maintain the first NL tuned dynamic noise of the NL ZD filter 506 (as the current setting for the current epoch) if the first NL tuned dynamic noise is less than or equal to the derived metric, where the RC code residuals associated with NL bias and corresponding resolved NL ambiguities pertain to a particular satellite.

Under a third technique for executing step S836, one or more the NL bias filter/code-phase filters 512 provide, or are configured to provide, (e.g., to the NL ZD filter 506, to the low-latency clock module, or to the correction module 752) a code-phase bias (e.g., refraction-corrected code-phase bias) for incorporation into (or augmentation of) the correction signal if the first NL tuned dynamic noise is greater than the derived metric, where the RC code residuals associated with NL bias and corresponding resolved NL ambiguities pertain to a particular satellite. By selectively not incorporating or augmenting the correction signal with the code-phase bias under the third technique, wireless bandwidth or satellite channel bandwidth can be conserved, such as for increasing the maximum wireless communications channel (e.g., physical or virtual) throughput or maximum transmission rate of other correction data.

Under a fourth technique for executing step S836, one or more the NL bias filter/code-phase filters 512 provide, or optionally withhold, (or are configured to provide or optionally withhold, e.g., to the NL ZD filter 506, to the low-latency clock module, or to the correction module 752) a code-phase bias (e.g., refraction-corrected code-phase bias) that is not incorporated into the correction signal if the first NL tuned dynamic noise is less than or equal to the derived metric, where the RC code residuals associated with NL bias and corresponding resolved NL ambiguities pertain to a particular satellite.

Further, in alternate embodiments steps S834 and S836, can be added, separately or cumulatively with steps S830 and S832, in any methods or flow charts in this disclosure.

Figure 23:
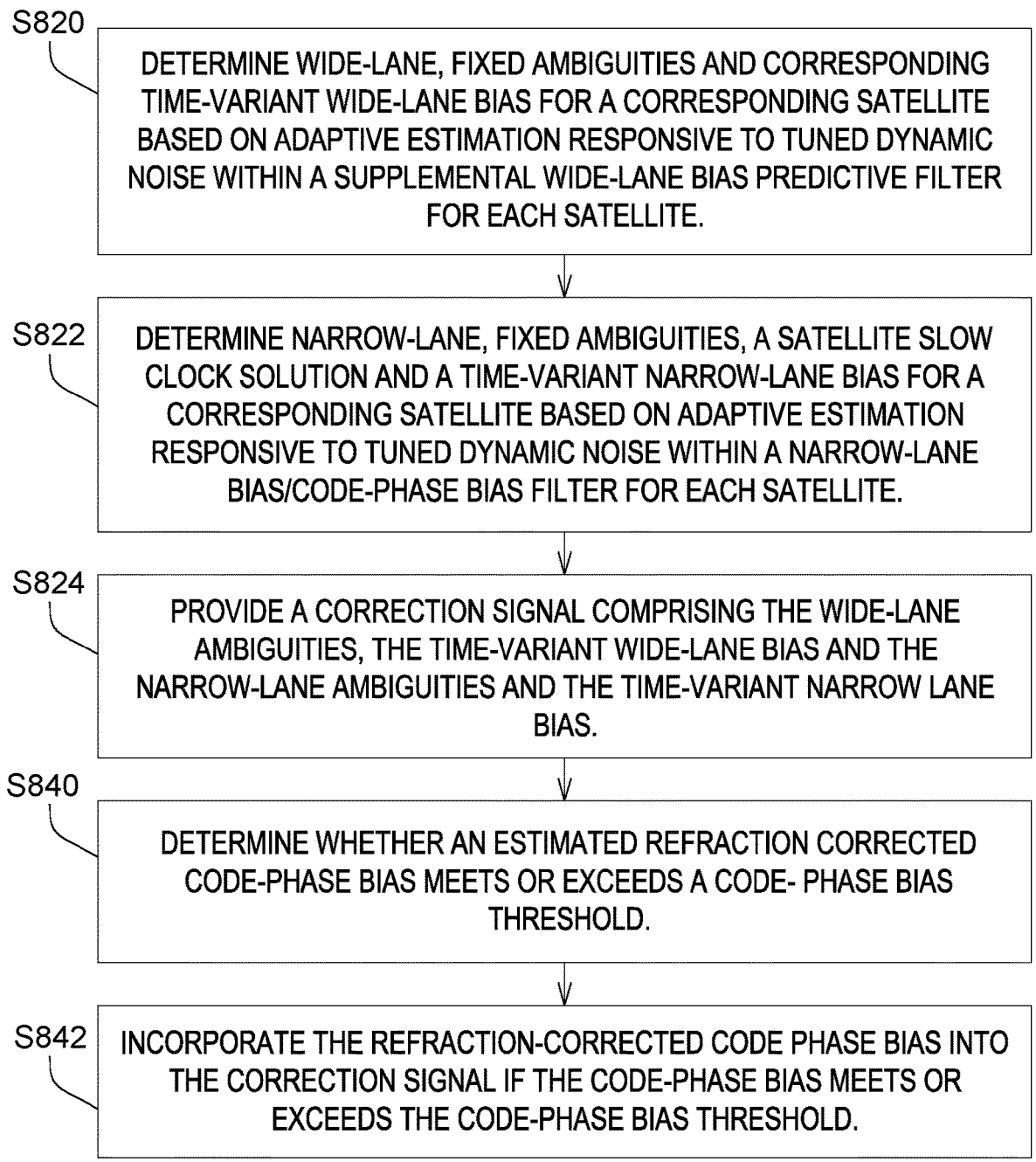
FIG. 23 is a flow chart of a ninth illustrative embodiment of a method for providing a global satellite differential correction signal, consistent with or in conjunction with any of the block diagrams referenced in the above drawings of this disclosure.

The embodiment of the method of FIG. 23 is similar to the embodiment of the method of FIG. 15, except steps S840 and S842 are added to FIG. 23. Like reference numbers in FIG. 15 and FIG. 23, or in any set of drawings, for that matter, indicate like elements or features.

In step S840, one or more of the NL bias filter/code-phase filter(s) 512 determine whether an estimated refraction corrected code-phase bias meets or exceeds a code-phase bias threshold. Further, the main NL ZD filter 506 applies satellite NL bias dynamic noise 510 associated with the code-phase bias meeting or exceeding the code-phase bias threshold to determine resolved or fixed NL ambiguities and associated NL bias and associated code bias or code-phase bias.

In step S842, the data processor 120, the low-latency clock module 752, or the correction manager 740 incorporates the refraction-corrected code bias or code-phase bias into the correction signal if the code-phase bias meets or exceeds the code-phase bias threshold.

In an alternate embodiment, step S840 and S842 can be collectively modified as follows: Firstly, in alternate step S840, the data processor 120, the low-latency clock module 752, or the correction manager 740 incorporates the refraction-corrected code bias into the correction signal if the code bias meets or exceeds the code bias threshold. Secondly, in alternate step S842, the data processor 120, the low-latency clock module 752, or the correction manager 740 incorporates the refraction-corrected code bias or code-phase bias into the correction signal if the code bias meets or exceeds the code bias threshold.

The foregoing description, for the purposes of explanation, has been described with reference to specific embodiments. However, the illustrative discussions above are not intended to be exhaustive or to limit the disclosure to precise forms disclosed. Many modifications and variations are possible in view of the above teachings. The embodiments were chosen and described in order to best explain the principles of the disclosure and its inventive and its practical applications, to thereby enable others skilled in the art to best utilize the disclosure and various embodiments with various modifications as are suited to the particular use contemplated.

The following is claimed:

1. A method for providing a global satellite differential correction signal, wherein the method comprises an improvement comprising:

receiving, by a carrier phase measurement module of a reference receiver, a plurality of carrier phase measurements of corresponding satellite signals transmitted from each satellite among a plurality of satellite;

determining, by an electronic data processing system of the reference receiver or a data processing center, wide-lane, fixed ambiguities and a corresponding time-variant wide-lane bias for a corresponding one of the satellite signals based on adaptive filter estimation responsive to tuned wide-lane dynamic noise within a wide-lane bias predictive filter for each satellite, where the wide-lane dynamic noise is modeled as white noise within one or more ranges of power;

determining, by the electronic data processing system of reference receiver or the data processing center, narrow-lane, fixed ambiguities, a satellite slow clock solution and a time-variant narrow-lane bias for a corresponding one of the satellite signals based on adaptive filter estimation responsive to tuned narrow-lane dynamic noise within a narrow-lane bias/code-phase bias filter for each satellite, where the narrow-lane dynamic noise is modeled as white noise within one or more ranges of power; where the satellite slow clock solution comprises a satellite clock correction at a respective update rate; where the narrow-lane bias/code-phase bias filter is configured to determine a time-variant, narrow-lane bias for a corresponding satellite based on narrow-lane code residuals for the corresponding satellite; and providing, by the data processing center, a correction signal for broadcast or wireless transmission to one or more rover receivers, the correction signal comprising the wide-lane ambiguities, the time-variant wide-lane bias and the narrow-lane ambiguities and the time-variant narrow lane bias, where the rover receiver is configured to estimate a precise position of the rover receiver based on the rover receiver, the correction signal, and its carrier phase measurements of the corresponding satellite signals.

2. The method according to claim 1 wherein the correction signal further comprises code bias or code-phase bias for one or more epochs from the narrow-lane bias/code-phase bias filter.

3. The method according to claim 1 wherein, in a preprocessor module of the clock and orbit estimation module within the data processing center, the determining of the wide-lane fixed ambiguities and wide lane bias per satellite are estimated by a pair of wide-lane zero difference filter and the supplemental wide-lane bias predictive filter for each satellite, further comprising:

providing, by the wide-lane zero difference filter, wide-lane residuals to the paired, corresponding supplemental wide-lane bias predictive filter for a given satellite;

providing, by the supplemental wide-lane bias predictive filter, the tuned wide-lane dynamic noise based on the provided wide-lane residuals for the respective satellite to the wide-lane zero difference filter for the given satellite.

4. The method according to claim 1 wherein, in a clock solution module of the clock and orbit estimation module within the data processing center, the determining of the narrow-lane fixed ambiguities and narrow-lane bias per satellite are estimated by a pair of a narrow-lane, zero-difference filter and the narrow-lane bias filter/code bias filter for each satellite, further comprising:

providing, by the narrow-lane, zero-difference filter, refraction-corrected code residuals to the paired, corresponding narrow-lane filter/code-bias filter for a given satellite;

providing, by the narrow-lane filter/code bias filter, the tuned narrow-lane dynamic noise based on the provided refraction-corrected code residuals for the respective satellite to the narrow-lane zero difference filter for the given satellite.

5. The method according to claim 1 further comprising:
determining whether to operate in a first wide-lane (WL) filtering mode with a corresponding first WL threshold that comprises a first limited deviation of a next wide lane bias correction for a given satellite for a next epoch with respect to a previous mean of the WL bias from a series of previous successive epochs, or a second wide-lane filtering mode with a corresponding second WL threshold that comprises a second limited deviation of a next wide lane bias correction for the given satellite for the next epoch, or a transient period thereafter, with respect to the previous mean that is greater than (or exceeds the limit of) the first WL threshold for each corresponding satellite.

6. The method according to claim 1 further comprising:
determining whether to operate in a first narrow-lane (NL) filtering mode with a corresponding first NL threshold that comprises a first limited deviation of a next narrow-lane bias correction for a given satellite for a next epoch with respect to a previous mean of the NL bias from a series of previous successive epochs, or a second narrow-lane filtering mode with a corresponding second NL threshold that comprises a second limited deviation of a next narrow-lane bias correction for the given satellite for the next epoch, or a transient period thereafter, with respect to the previous mean that is greater than (or exceeds the limit of) the first NL threshold for each corresponding satellite.

7. The method according to claim 1 further comprising:
for each satellite within reception range, determining, by supplemental WL bias predictive filter (or the electronic data processor of the data processing center), a derived metric ($T_{WL}$) based on the WL residuals and their variance;

providing, by the supplemental WL bias predictive filter to the WL ZD filter, a second WL tuned dynamic noise (as a transition or the next setting for the next epoch) to replace a first WL tuned dynamic noise of the WL ZD filter (as the current setting for the current epoch) if the first WL tuned dynamic noise is greater than the derived metric, where the second WL tuned dynamic noise is greater than the first WL tuned dynamic noise and where the WL residuals associated with WL bias and corresponding resolved WL ambiguities pertain to a particular satellite.

8. The method according to claim 1 further comprising:
for each satellite within reception range, determining, by supplemental NL bias filter/code-phase filter, a derived metric ($T_{NL}$) based on the refraction-corrected code residuals and their variance;

providing, by the NL bias filter/code-phase filter to the NL ZD filter, a second NL tuned dynamic noise (as a transition or the next setting for the next epoch) to replace a first NL tuned dynamic noise of the NL ZD filter (as the current setting for the current epoch) if the first NL tuned dynamic noise is greater than the derived metric, where the second NL tuned dynamic noise is greater than the first NL tuned dynamic noise and where the RC code residuals associated with NL bias and corresponding resolved NL ambiguities pertain to a particular satellite.

9. The method according to claim 1 further comprising:
for each satellite within reception range, determining, by supplemental WL bias predictive filter, a derived metric ($T_{WL}$) based on the WL residuals and their variance;

providing, by the supplemental WL bias predictive filter to the WL ZD filter, a first WL tuned dynamic noise (as maintenance of the next setting for the next epoch) to maintain the first WL tuned dynamic noise of the WL ZD filter (as the current setting for the current epoch) if the first WL tuned dynamic noise is equal to or less than the derived metric, and where the WL residuals associated with WL bias and corresponding resolved WL ambiguities pertain to a particular satellite.

10. The method according to claim 1 further comprising:
for each satellite within reception range, determining, by supplemental NL bias filter/code-phase filter, a derived metric ($T_{NL}$) based on the refraction-corrected code residuals (RC code residuals) and their variance;

providing, by the NL bias filter/code-phase filter to the NL ZD filter, a first NL tuned dynamic noise (as the next setting for the next epoch) to maintain the first NL tuned dynamic noise of the NL ZD filter (as the current setting for the current epoch) if the first NL tuned dynamic noise is less than or equal to the derived metric, where the RC code residuals associated with NL bias and corresponding resolved NL ambiguities pertain to a particular satellite.

11. The method according to claim 1 further comprising:

for each satellite within reception range, determining, by supplemental NL bias filter/code-phase filter, a derived metric ($T_{NL}$) based on the refraction-corrected code residuals (RC code-phase residuals) and their variance;

providing, by the NL bias filter/code-phase filter to the NL ZD filter, incorporating the code-phase bias into the correction signal if a first NL tuned dynamic noise is greater than the derived metric, where the RC code-phase residuals associated with NL bias and corresponding resolved NL ambiguities pertain to a particular satellite.

12. The method according to claim 1 further comprising:

for each satellite within reception range, determining, by supplemental NL bias filter/code-phase filter, a derived metric ($T_{NL}$) based on the refraction-corrected code residuals (RC code-phase residuals) and their variance;

providing, by the NL bias filter/code-phase filter to the NL ZD filter, not incorporating the code-phase bias into the correction signal if a first NL tuned dynamic noise is less than or equal to the derived metric, where the RC code-phase residuals associated with NL bias and corresponding resolved NL ambiguities pertain to a particular satellite.

13. The method according to claim 1 further comprising:

determining whether an estimated refraction-corrected code-phase bias meets or exceeds a code-phase bias threshold consistent with updates to the estimated code-phase bias based on residual satellite refraction-corrected code-phase bias over the measurement time and the variance over the measurement time; and incorporating the refraction-corrected code phase bias into the correction signal if the code-phase bias meets or exceeds the code-phase bias threshold.

14. The method according to claim 1 further comprising:

determining whether an estimated refraction corrected code bias meets or exceeds a code bias threshold, where the refraction-corrected, narrow-lane phase code diverges from steady state values in a receiver after initialization and resolution of narrow-lane ambiguities; and incorporating the refraction-corrected code bias into the correction signal if the code bias meets or exceeds the code bias threshold.

15. The method according to claim 1 further comprising:

determining one or more quality indicators indicating the quality of GNSS satellite orbit solution, satellite clock, satellite wide-lane bias, and narrow-lane bias in accordance with the following equation:

$$Q = \frac{N_{sat} + N_{ref} + \sum_{i=1}^{N_{sat}} Q_i}{4}$$

Where $N_{sat}$ is the number of satellites used $N_{ref}$ is the number of reference sites used $Q_i$ (Narrow Lane bias quality value) can be one of the following:

=0 (UNSURE_SAT_BIAS) if satellite bias is not ready to use

=1(POOR_SAT_BIAS) if satellite bias is poor and to be removed in partial fix

=2(GOOD_SAT_BIAS) if satellite bias is good to use for SD fix

=3(GREAT_SAT_BIAS) if satellite bias is excellent and can be used for reference satellite.

16. The method of claim 15 further comprising:

incorporating the quality indicators into the correction signal.

17. The method according to claim 1 wherein the time-variant wide-lane bias results from observed changes in in received signal-to-noise ratio or carrier-to-noise density ratio of an encoded L1 C/A or L2C (or L2C or L5) satellite signal of the satellite transmitter.

18. The method according to claim 1 wherein the time-variant narrow-lane bias results from observed changes in received signal-to-noise ratio or carrier-to-noise density ratio of an encoded L1 C/A or L2C (or L2C or L5) satellite signal of the satellite transmitter.

19. The method according to claim 1 wherein the time variant wide-lane bias and the narrow-lane bias results from thermally dependent inter-frequency clock biases.

20. The method according to claim 1 wherein the time-variant wide-lane bias is determined in accordance with the following equation:

$$b_{WL}^s = -\left(\frac{f_{L_1}}{f_{L_1} + f_{L_2}} B_{L_1}^s + \frac{f_{L_2}}{f_{L_1} + f_{L_2}} B_{L_2}^s\right) + \left(\frac{f_{L_1}}{f_{L_1} - f_{L_2}} b_{L_1}^s - \frac{f_{L_2}}{f_{L_1} - f_{L_2}} b_{L_2}^s\right),$$

where:

$b_{WL}^s$ is satellite widelane bias (one per satellite for all receivers), $B_{L_1}^s$ is L1 satellite code bias, $B_{L_2}^s$ is L2 satellite code bias, $b_{L_1}^s$ is L1 satellite phase bias, $b_{L_2}^s$ is L2 satellite phase bias, $f_{L_1}$ is the L1 frequency, $f_{L_2}$ is the L2 frequency, and where both satellite and receiver wide-lane biases are not constant over time.

21. The method according to claim 1 wherein the time-variant wide lane bias includes an additional wide-lane inter-frequency bias for a corresponding satellite and receiver.

22. The method according to claim 1 wherein the time-variant narrow-lane code bias, $P_{r,RC}^s$ is determined in accordance with the following:

$$P_{r,RC}^s = \frac{f_{L_1}^2}{f_{L_1}^2 - f_{L_2}^2} P_{r,L_1}^s - \frac{f_{L_2}^2}{f_{L_1}^2 - f_{L_2}^2} P_{r,L_2}^s = D_r^s + B_{r,NL} - B_{NL}^s + \varepsilon_{P_{r,RC}^s}$$

where:

$P_{r,L_1}^s$ is the narrow-lane L1 code bias for receiver r and satellite s, $P_{r,L_2}^s$ is the narrow-lane L2 code bias for receiver r and satellite s, $f_{L_1}$ is the L1 frequency, $f_{L_2}$ is the L2 frequency, $D_r^s$ (e.g., $D_{r,L_{i=1,2}}^s$) represents the common terms for any given frequency, $B_{r,NL}$ is receiver r narrow-lane lane code bias (one per receiver and constellation for all visible satellites), is $B_{NL}$ satellite s narrow-lane lane code bias, and $\varepsilon_{P_{r,RC}}^s$ are errors in the refraction-corrected, narrow-lane code bias, such as unmodeled errors.

23. The method according to claim 1 wherein the determining of the WL bias further comprises:

setting a tuned wide-lane dynamic noise for satellite WL bias, $b_{WL}{}^s$, of each corresponding satellite, applicable to a first bank of WL ZD filters by the following:

inputting post-fit, wide-lane residuals, of corresponding satellites to a second bank of supplemental WL bias predictive filters that comprise WL Kalman filters;

determining for each satellite in ones of the supplemental WL bias predictive filters, a variance, $Q_{\hat{b}_t}$, of the inputted wide-lane bias residuals at a corresponding measurement time (t); and estimating a second variance or next variance, $Q_{\hat{b}_{t+1}}$, associated with a sampling time (t+1) after the measurement time based on tuned wide-lane dynamic noise, $q_{\hat{b}}$, consistent with a dynamic noise constraint (separately and independently determined for the WL Kalman filter for a respective satellite) defined by $T(T_{WL})$.

24. The method according to claim 1 wherein the determining of the NL bias further comprises:

setting a tuned narrow-lane dynamic noise for satellite NL bias, $b_{NL}{}^s$, or satellite RC code-phase bias $\hat{B}_t$ of each corresponding satellite, applicable to a first bank of NL ZD filters by the following:

inputting refraction corrected code (NL) residuals, of corresponding satellites to a second bank of NL bias filters/code-phase filters that comprise NL Kalman filters;

determining for each satellite in ones of the NL bias filters/code-phase filters, a variance, $Q_{\hat{B}_t}$, of the inputted narrow-lane bias residuals at a corresponding measurement time (t); and estimating a second variance or next variance, $Q_{\hat{B}_{t+1}}$, associated with a sampling time (t+1) after the measurement time based on tuned NL dynamic noise, $q_{\hat{b}}$, or $q_{b_{NL}}{}^s$, consistent with a dynamic noise constraint (separately and independently determined for the NL Kalman filter for a respective satellite) defined by $T(T_{NL})$.

\* \* \* \* \*